(12) United States Patent
Kitts et al.

(10) Patent No.: US 10,869,077 B2
(45) Date of Patent: *Dec. 15, 2020

(54) SYSTEMS AND METHODS FOR WEB SPIKE ATTRIBUTION

(71) Applicant: ADAP.TV, Inc., Dulles, VA (US)

(72) Inventors: Brendan Kitts, Seattle, WA (US); Dyng Au, Seattle, WA (US); Michael Bardaro, Bellevue, WA (US); Sawin Lee, Seattle, WA (US); Alfred Lee, Seattle, WA (US)

(73) Assignee: ADAP.TV, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,283

(22) Filed: May 17, 2019

(65) Prior Publication Data
US 2019/0273961 A1 Sep. 5, 2019

Related U.S. Application Data

(63) Continuation of application No. 14/720,225, filed on May 22, 2015, now Pat. No. 10,334,299.
(Continued)

(51) Int. Cl.
*H04H 60/32* (2008.01)
*H04N 21/262* (2011.01)
(Continued)

(52) U.S. Cl.
CPC ... *H04N 21/26283* (2013.01); *G06Q 30/0242* (2013.01); *G06Q 30/0254* (2013.01);
(Continued)

(58) Field of Classification Search
None
See application file for complete search history.

(56) References Cited

U.S. PATENT DOCUMENTS

| 2008/0255904 A1* | 10/2008 | Park ..................... G06Q 30/02 705/14.45 |
| 2010/0153544 A1 | 6/2010 | Krassner et al. |

(Continued)

FOREIGN PATENT DOCUMENTS

| WO | 2009076456 A2 | 6/2009 |
| WO | 2012079033 A1 | 6/2012 |
| WO | 2013036957 A2 | 3/2013 |

OTHER PUBLICATIONS

International Search Report and Written Opinion issued in corresponding International Application No. PCT/US15/32254, dated Aug. 27, 2015 (10 pages).

*Primary Examiner* — William J Kim
(74) *Attorney, Agent, or Firm* — Bookoff McAndrews, PLLC

(57) ABSTRACT

Systems and methods are disclosed that measure web activity bursts after ad broadcasts that may be sent to multiple persons. One system uses a cookie-less/cookie-optional, anonymous/personal-identification-not-required, method for web-based conversion tracking that will work on broadcast media systems such as television, and could also be applied to measuring spikes from email, radio, and other forms of advertising where an episodic ad event is broadcast to multiple parties, and where responses occur in a batch after the broadcast.

20 Claims, 48 Drawing Sheets

Related U.S. Application Data

(60) Provisional application No. 62/032,947, filed on Aug. 4, 2014, provisional application No. 62/002,654, filed on May 23, 2014.

(51) Int. Cl.

| | |
|---|---|
| *G06Q 30/02* | (2012.01) |
| *H04N 21/2668* | (2011.01) |
| *H04N 21/234* | (2011.01) |
| *H04N 21/24* | (2011.01) |
| *H04N 21/442* | (2011.01) |
| *H04N 21/4782* | (2011.01) |
| *H04N 21/643* | (2011.01) |
| *H04N 21/81* | (2011.01) |
| *H04N 21/845* | (2011.01) |

(52) U.S. Cl.
CPC ..... *G06Q 30/0263* (2013.01); *G06Q 30/0272* (2013.01); *G06Q 30/0276* (2013.01); *G06Q 30/0277* (2013.01); *H04N 21/23418* (2013.01); *H04N 21/2407* (2013.01); *H04N 21/2668* (2013.01); *H04N 21/26241* (2013.01); *H04N 21/44213* (2013.01); *H04N 21/4782* (2013.01); *H04N 21/64322* (2013.01); *H04N 21/812* (2013.01); *H04N 21/8456* (2013.01)

(56) References Cited

U.S. PATENT DOCUMENTS

| | | |
|---|---|---|
| 2012/0047530 A1 | 2/2012 | Shkedi |
| 2013/0166375 A1* | 6/2013 | YoungLincoln ... G06Q 30/0246 |
| | | 705/14.45 |
| 2015/0237395 A1 | 8/2015 | Barney et al. |
| 2015/0302481 A1* | 10/2015 | Callahan ................. H04L 67/20 |
| | | 705/7.29 |
| 2017/0188094 A1 | 6/2017 | Ionescu |
| 2019/0130439 A1* | 5/2019 | Handrigan ......... G06Q 30/0256 |

* cited by examiner

```
76219121 | 30  | STY1 | 1 | WKBW | BUFFALO,NY     | 2 | 7/2/2008 6:05  | -5 | 8008768156 | -1 | WWW.WEBADDRESS.COM | -1 | 235   | 2
76219112 | 120 | STY2 | 1 | WKBW | BUFFALO,NY     | 2 | 7/2/2008 6:05  | -5 | 8008768156 | -1 |                    | -1 |  -1|0 | 3
76509063 | 30  | STY4 | 1 | WSBK | BOSTON,MA      | 2 | 7/4/2008 12:00 | -5 | 8005951927 | -1 | WWW.WEBADDRESS.COM | -1 |  0    | 4
76512444 | 60  | STY4 | 1 | WSBK | BOSTON,MA      | 2 | 7/4/2008 12:00 | -5 | 8005951927 | -1 | WWW.WEBADDRESS.COM | -1 | 197.4 | 4
76547095 | 120 | STY3 | 1 | KRON | SAN FRANCISCO,CA | 2 | 7/4/2008 20:00 | -8 | 8005938224 | -1 | WWW.WEBADDRESS.COM | -1 |  0    | 4
76506696 | 30  | STY4 | 1 | XHAB | BROWNSVILLE,TX | 2 | 7/5/2008 14:00 | -6 | 8005951927 | -1 | WWW.WEBADDRESS.COM | -1 | 188   | 4
76509047 | 30  | STY4 | 1 | WNUV | BALTIMORE,MD   | 2 | 7/5/2008 15:30 | -5 | 8005952118 | -1 |                    | -1 | 526.4 | 2
76509118 | 60  | STY4 | 1 | WTVZ | NORFOLK,VA     | 2 | 7/5/2008 16:00 | -5 | 8005953110 | -1 |                    | -1 | 310.2 | 2
76482379 | 120 | STY3 | 1 | WCSC | CHARLESTON,SC  | 2 | 7/5/2008 17:30 | -5 | 8005938224 | -1 |                    | -1 | 408.9 | 3
```

SAMPLE MEDIA PLAN DATA

*FIG. 1B*

"ENCODING ID", "MARKET", "RANK", "STATION", "CHANNEL", "AFFILIATE", "START DATE", "START TIME", "STOP DATE", "STOP TIME", "START SECOND", "STOP SECOND", "SECONDS", "PROGRAM", "ISCI-20", "CAMPAIGN", "ADVERTISER", "PRODUCT NAME", "MODULE CODE", "PHONE NUMBER", "LENGTH", "DONOVAN AGENCY ESTIMATE CODE", "DONOVAN AGENCY ADVERTISER CODE", "DONOVAN AGENCY PRODUCT CODE",
"0000708920", "BANGOR", "154", "WFVX", "022", "FOX", "20100714", "14:30:05", "20100714", "14:58:33", "0000000030", "0000001738", "00000 01835", "PAID PROGRAM", "PMSON001", "SON2010", "POSITEC USA", "SONICRAFTER", "1710", "9999999999", "1710", "XXXX","XXXX", "XXXX"

SAMPLE VERIFICATION DATA

*FIG. 1C*

KXLY SPOKANE Q2 ORDER - GRAVEDIGGER2000

| FROM PORTIA VENETO PROCEED MEDIA GROUP | TO KXLY SPOKANE | REVISION NOTES: | NO | DATE 6/5/2010 2:58 PM | ☐ PROCEED MEDIA GROUP |
|---|---|---|---|---|---|
| PHONE: 888-330-6975 x123 FAX: 206-682-1097 | PHONE: 345-456-6789 FAX: 345-456-9876 | | | ORDER ID 282 PAGE 1 OF 1 | |

CLIENT: VORICK INC.
PRODUCT: GRAVEDIGGER2000
MARKET: SPOKANE

SEPARATION BETWEEN SPOTS: 15

FLIGHT START DATE: 6/28/2010 5:00:00 AM
FLIGHT END DATE: 9/26/2010 4:59:00 AM

ESTIMATE COMMENTS: DO NOT RUN AS [1.3.1] RELIGIOUS, OR PAID PROGRAMMING. PLEASE OFFER MG WITHIN FLIGHT. FAIR & EQUAL ROTATION REQUIRED.

| ITEM NO. | DAYPART | PROGRAM | STATION GROSS | TFN | ROTA-TION | LENGTH | JULY 2010 6/28 | 7/5 | 7/12 | 7/19 | 7/26 | AUGUST 2010 8/2 | 8/9 | 8/16 | 8/23 | 8/30 | SEPTEMBER 2010 9/6 | 9/13 | 9/20 | TOTAL SPOTS | TOTAL COSTS |
|---|---|---|---|---|---|---|---|---|---|---|---|---|---|---|---|---|---|---|---|---|---|
| 3255 | M TU W TH F | 5:00AM-9:00AM | $300.00 | (800) 445-2999 | 100% | 60 | 4 | 4 | 4 | | | | | | | | | | | 12 | $3,600.00 |
| 3256 | M TU W TH F SA SU | 6:00AM-6:00PM | $110.00 | (800) 333-4434 | 100% | 120 | 20 | | | | 10 | | | | | | | | | 30 | $3,300.00 |
| 3257 | SU | 10:00AM-1:30PM | $280.00 | (800) 445-2999 | 100% | 60 | 1 | | | | | | | | | | | | | 1 | $280.00 |
| 3258 | SA SU | 1:00PM-6:00PM | $100.00 | (800) 445-2999 | 100% | 60 | 5 | 5 | 5 | 5 | 5 | | | | | | | | | 25 | $2,500.00 |
| 3243 | M TU W TH F SA SU | 11:00PM-2:00AM | $1,500.00 | (800) 445-2999 (800) 448-7888 | 50% 50% | 60 | 5 | 5 | 5 | 5 | 5 | 5 | 5 | 5 | 5 | 5 | 5 | 5 | 5 | 65 | $97,500.00 |
| 3245 | SA SU | 11:35P-12:35AM | $650.00 | (800) 445-2999 | 100% | 60 | 5 | 5 | 5 | 5 | 5 | 5 | 5 | 5 | 5 | 5 | 5 | 5 | 5 | 65 | $42,250.00 |
| | | | | | | TOTALS | 35 | 14 | 14 | 10 | 20 | 10 | 10 | 10 | 15 | 15 | 15 | 15 | | 142 | $143,350.00 |
| | | | | | | | $45,400.00 | | | | | $54,950.00 | | | | | $43,000.00 | | | | |

[1.3.1]

| PROGRAM | TFN | ISCI | LENGTH |
|---|---|---|---|
| GRAVEDIGGER2000 | (800) 445-2999 | PMSW0002 | 60 |
| GRAVEDIGGER2000 | (800) 446-7888 | PMSW0003 | 60 |
| GRAVEDIGGER2000 | (800) 333-4434 | PMSW0044 | 120 |

PROCEED MEDIA GROUP IS NOT RESPONSIBLE FOR ANY SPOTS THAT DO NOT RUN ACCORDING TO THESE INSTRUCTIONS. CREDIT NEEDED IF SPOTS AIR OUTSIDE PMG GUIDELINES.

PLEASE NOTIFY PROCEED MEDIA GROUP IMMEDIATELY IF ANY PROGRAMMING CHANGES OR PREEMPTIONS OCCUR.

PLEASE SIGN: _____ DATE: _____

SCAN AND EMAIL TO: PVENETO@PROCEEDMEDIAGROUP.COM OR FAX TO 206-682-1097. QUESTIONS OR CONCERNS: CALL PORTIA VENETO AT 888-330-6975 x123.

SAMPLE TRAFFIC INSTRUCTIONS

*FIG. 1D*

```
15552836 | 1 | 07/20/2008 13:30 | -5 | 59535 | V.32 | 635 | 25 | 4 | 8008195404 | WAXN | 330 | STY6 | | | JOHN SMITH | 15155 REDROAD CT | | CHARLOTTE | NC | 28273 | US | | | | | | | | | | | | | | | | 1.50 | Y | N
155567168 | 1 | 07/20/2008 13:31 | -5 | 60420 | V.32 | 282 | 25 | 4 | 6412622 | JSMITH@YAHOO.COM | 100.00 | 2.50 | | | | | | | | | | | | | | | | | | | | |
155533396 | 1 | 07/20/2008 13:31 | -5 | 52137 | V.32 | 270 | 25 | 5 | 8008195404 | WRNN | 330 | STY6 | | | | | | | | | | | | | | | | | | | | | | |
155595953 | 1 | 07/20/2008 13:32 | -5 | 66488 | V.32 | 913 | 25 | 6 | 8009874524 | HGTVC | 330 | STYC | | | JOE | SAMPLE | 189 FEATHER LIGHT WAY | | WINDSOR | ON | N9H2E6 | CA | | | | | | | | | | | | | | | 2.5 | .5 | N | N
155579765 | 1 | 07/20/2008 13:34 | -5 | 3104 | V.32 | 553 | 25 | 6 | 8008195404 | WAXN | 330 | STY6 | | | ERICA | TESTLASTNAME | 4814 TEST AVE | | CHARLOTTE | NC | 28205 | US | | | | | | | | | | | | | | 2.50 | 1.50 | Y | Y
155585913 | 1 | 07/20/2008 13:35 | -5 | 62707 | V.32 | 1441 | 25 | 6 | 8008195404 | WRNN | 330 | STY6 | | | AMANDA | JONES | 63 E. BLACKBOX STREET | | DOVER | NJ | 07801 | US | AMANDAJONES | 123 MAIN AVE | PORTLAND | ME | 04103 | US | 973 | 4429729 | ETESTLASTNAME@AOL.COM | 100.00 | 2.50 | 1.50 | Y | N
155540393 | 1 | 07/20/2008 13:35 | -5 | 76294 | V.32 | 81 | 25 | 4 | 8008195404 | WRNN | 330 | STY6 | | | | | | | | | | | | | | | | | | | | | 25.00 | 2.50 | 1.50 | Y | N
155585919 | 1 | 07/20/2008 13:36 | -5 | 67793 | V.32 | 1356 | 25 | 2 | 8008195404 | WAXN | 330 | STY6 | | | JOHN | DOE | 921 TASSO AVE | | KANNAPOLIS | NC | 28083 | US | | | | | | | | | | | | | | | | | | 25.00 | 2.50 | 1.50 | N | N
155585943 | 1 | 07/20/2008 13:37 | -5 | 68040 | V.32 | 103 | 25 | 4 | 8008195404 | WRNN | 330 | STY6 | | | JANE | DOE | | | | | | | | | | | | | | | | | | | | | | | |
155540442 | 1 | 07/20/2008 13:38 | - 5 | 50392 | V.32 | 365 | 300 | 4 | 8008195404 | WAXN | 330 | STY6 | | |
```

SAMPLE CALLCENTER DATA

FIG. 1E

```
09032000009MLH9AH-EC|02/01/2009 00:00|-7|WWW.SAMPLEWEBSITE.COM|UNASSIGNED|JANE|DOE|1234 MAIN ST||BALTIMORE|MD|21224|US|JOHN|DOE|4321 MAIN AVE||BALTIMORE|MD|21224|US|410|3827626|JANEDOE_1234@HOTMAIL.COM|100.00|2.50|1.50|Y|N
09032000141MT2QAH-EC|02/01/2009 00:01|-7|WWW.SAMPLEWEBSITE.COM|CA-1|JANE|DOE|1234 MAIN ST||WASHINGTON|MO|63090|US|||||||100.00|2.50|1.50|Y|N
09032000146MN95AH-EC|02/01/2009 00:01|-7|WWW.SAMPLEWEBSITE.COM|CA-1|JANE|DOE|1234 MAIN ST||STONE MOUNTAIN|GA|30083|US|678|4997605|JANEDOE_1234@HOTMAIL.COM|100.00|2.50|1.50|Y|Y
09032000236MLH9AH-EC|02/01/2009 00:02|-7|WWW.SAMPLEWEBSITE.COM|CA-1|JANE|DOE|1234 MAIN ST||WEST DES MOINES|IA|50266|US|515|2746587|JANEDOE_1234@HOTMAIL.COM|25.00|2.50|.50|N|N
09032000758MKSRAH-EC|02/01/2009 00:07|-7|WWW.SAMPLEWEBSITE.COM|CA-1|JANE|DOE|1234 MAIN ST||BALTIMORE|MD|21201|US|||||25|0|1|N|N
09032000857538ER-EC|02/01/2009 00:08|-7|WWW.SAMPLEWEBSITE.COM|CA-2|JANE|DOE|1234 MAIN ST||BALTIMORE|MD|21201|US|||||25|0|1|Y|Y
09032001051MKSRAH-EC|02/01/2009 00:10|-7|WWW.SAMPLEWEBSITE.COM|UNASSIGNED|JANE|DOE|1234 MAIN ST||BALTIMORE|MD|21201|US|||||100.00|2.50|1.50|Y|N
09032001213MKSRAH-EC|02/01/2009 00:12|-7|WWW.SAMPLEWEBSITE.COM|UNASSIGNED|JANE|DOE|1234 MAIN ST||BALTIMORE|MD|21201|US|410|3827626||100.00|2.50|10.50|Y|N
09032001344538ER-EC|02/01/2009 00:13|-7|WWW.SAMPLEWEBSITE.COM|UNASSIGNED|JANE|DOE|1234 MAIN ST||LANCASTER|CA|93534|US||||9405051|JANEDOE_1234@HOTMAIL.COM|100.00|2.50|10.50|Y|N
09032001719417SERER-EC|02/01/2009 00:17|-7|WWW.SAMPLEWEBSITE.COM|UNASSIGNED|JANE|DOE|1234 MAIN ST||FRESNO|CA|93650|US|559|2928228|JANEDOE_1234@HOTMAIL.COM|30.00|2.50|1.50|Y|N
```

SAMPLE E-COMMERCE DATA

*FIG. 1F*

```
00001893 | 02/14/2009 00:00 | 0 | 119.80 | 39.90 | 0.00 | 0.00 | 159.70 | N | N | 830 | 107633251 | 00001893 | JIM | DOE | 260 TRIAL DR | | BLOOMINGDALE | GA | 31302-4058 | US | 912 | 6755172 | | 00001893 | JOHN | DOE | 260 TRIAL DR | | BLOOMINGDALE | GA | 31302-4058 | US | 912 | 555172 |
00001894 | 02/14/2009 00:00 | 0 | 149.70 | 55.80 | 0.00 | 0.00 | 205.50 | N | N | 830 | 107633256 | 00001894 | JANE | DOE | 114 TEST DR | | SPRINGFIELD | GA | 31329-4642 | US | 912 | 00001894 | JANE | DOE | 406 BILLINGADDRESS AVE | | GUYTON | GA | 31312-4538 | US | 912 | 5559332 |
```

SAMPLE ORDER DATA

FIG. 1G

```
85189|JOHN|DOE|111 TEST
WAY|SEATTLE|WA|91045|35|M|D|1|1|0|0|1|1|0|323|23|234|1|5|1|1|1|1|0|1|0|1|1|0|1|1|1|43|Y|7|0|||||1|
0|32|||0|1|1|1|0|7|X|||||0|1||0||||1|1|1||0|||0|0|1|
85189|JANE|SMITH|111 TEST
WAY|SEATTLE|WA|91045|35|M|D|1|1|0|0|1|1|0|323|23|234|1|5|1|1|1|1|0|1|0|1|1|0|1|1|1|43|Y|7|0|||||1|
0|32|||0|1|1|1|0|7|X|||||0|1||0||||1|1|1||0|||0|0|1|
```

SAMPLE CONSUMER DATA ENRICHMENT

*FIG. 1H*

"03072010", "0035", "WABC", "ABC", "FPB", "0060", "SYNDICATED", "LOST", "", "LIVE TOGETHER, DIE ALONE", "", "", "DRAMA", "JACK BENDER", "", "NAVEEN ANDREWS", "HENRY IAN CUSICK", "EMILIE DE RAVIN", "MICHAEL EMERSON", "MATHEW FOX", "JORGE GARCIA", "JACK AND SAYID DEVISE A PLAN TO CONFRONT THE OTHERS AND GET WALT BACK; EKO AND LOCKE FIGHT OVER THE DECISION ABOUT THE BUTTON AND THE HATCH", "", "CLOSED CAPTIONED", "ESP. PART 1 OF 2", "", "IN STEREO", "", "", "14", "V"
"03072010", "0135", "WABC", "ABC", "FPB", "0115", "MOVIE", "SPLICED", "", "", "*+", "2002", "HORROR", "GAVIN WILDING", "", "CANADA", "RON SILVER", "LIANE BALABAN", "DREW LACHEY", "MELISSA REPKA", "", "A TEENAGER WATCHES A SCARY MOVIE, THEN REALIZES THE DEFORMED KILLER FROM THE FILM IS STALKING HER", "", "", "R", "ADULT LANGUAGE, ADULT SITUATIONS, VIOLENCE", ",",
"03072010", "0330", "WABC", "ABC", "FPB", "0030", "SYNDICATED", "STORM STORIES", "", "", "", "", "", "WEATHER", "JIM CANTORE", "", ";", ",", "TRUE ACCOUNTS OF LIFE-THREATENING, WEATHER-RELATED EVENTS", "", "CLOSED CAPTIONED", "", "", ",", "", "IN STEREO", "", ",", "PG", "",
"03072010", "0400", "WABC", "ABC", "FPB", "0030", "INSTRUCTIONAL", "RON HAZELTON'S HOUSECALLS", "", ",", ",", "EDUCATIONAL", ",", "RON HAZELTON", ",", "REDEFINING AN OVERSIZED LIVING ROOM INTO TWO MORE LIVABLE SPACES USING KNEE WALLS AND COLUMNS; BLENDING A HARDWOOD FLOOR", "", "CLOSED CAPTIONED", "", "", "IN STEREO", "", "G", "",
"03072010", "0430", "WABC", "ABC", "FPB", "0030", "SYNDICATED", "STORM STORIES", "", "", "", "", "", "WEATHER", "JIM CANTORE", "", ",", ";", ",", "TRUE ACCOUNTS OF LIFE-THREATENING, WEATHER-RELATED EVENTS", ",", "CLOSED CAPTIONED", ",", "", "IN STEREO", "", "PG", "",
"03072010", "0500", "WABC", "ABC", "FPB", "0060", "SPECIAL", "ROAD TO GOLD: AN ACADEMY PREVIEW", ",", ",", ",", "ENTERTAINMENT", "", "SANDY KENYON", ",", ",", ",", "A PREVIEW OF THE OSCARS PRESENTATION", "", "CLOSED CAPTIONED", "", "IN STEREO", "", ",", "PG", ",

SAMPLE GUIDE DATA

FIG. 1I

| RUNTIME | PROPERTY | PRODUCT PURCHASED KEY | ZIP CODE | NET CUSTOMER VALUE | PANELIST ID | AGE IN TWO YEAR INCREMENTS-1ST INDIVIDUAL ID | BUSINESS OWNERS@ HOME INDICATOR ID | CHARITABLE GIVING SCORE ID | CHILD NEAR HIGH SCHOOL GRADUATION IN HHID |
|---|---|---|---|---|---|---|---|---|---|
| 1899-12-30 14:30:00.000 | CRT5 | 400 | 97152 | $100.00 | 10101 | 18 | NULL | 83 | NULL |
| 1899-12-30 11:00:00.000 | TRUTV | 400 | 87152 | $37.00 | 10102 | 17 | NULL | 43 | NULL |
| 1899-12-30 11:00:00.000 | TRUTV | 400 | 48313 | $321.00 | 10104 | NULL | NULL | 45 | NULL |
| 1899-12-30 06:00:00.000 | WWJ | 400 | 73737 | $12.31 | 10105 | 19 | NULL | 46 | NULL |
| 1899-12-30 16:30:00.000 | LP1 | 400 | 97152 | $19.95 | 10106 | 12 | NULL | 21 | NULL |
| 1899-12-30 11:30:00.000 | REELZ | 400 | 87152 | $119.32 | 10114 | 24 | NULL | 94 | NULL |
| 1899-12-30 06:30:00.000 | FOOD | 400 | 78252 | $37.15 | 10112 | 21 | NULL | 42 | NULL |
| 1899-12-30 09:30:00.000 | KTV | 400 | 48313 | $231.11 | 10110 | 17 | NULL | 94 | NULL |
| 1899-12-30 08:30:00.000 | WDCA | 400 | 73737 | $901.11 | 10108 | 18 | NULL | 69 | NULL |

*FIG. 1J*

| CLUSTER ID | COLLEGE GRADUATE ID | CONGRESSIONAL DISTRICT ID | DWELLING TYPE ID | EDUCATION -1ST INDIVIDUAL ID |
|---|---|---|---|---|
| 15 | NULL | 6 | 2 | 3 |
| 16 | NULL | NULL | 2 | NULL |
| 41 | NULL | 4 | 2 | NULL |
| 1 | NULL | 10 | 2 | 2 |
| 4 | NULL | 2 | 2 | 2 |
| 29 | NULL | 17 | 2 | 3 |
| 23 | NULL | 7 | 2 | NULL |
| 22 | NULL | 41 | 2 | 1 |
| 7 | NULL | 5 | 2 | 1 |

*FIG. 1J CONTINUED*

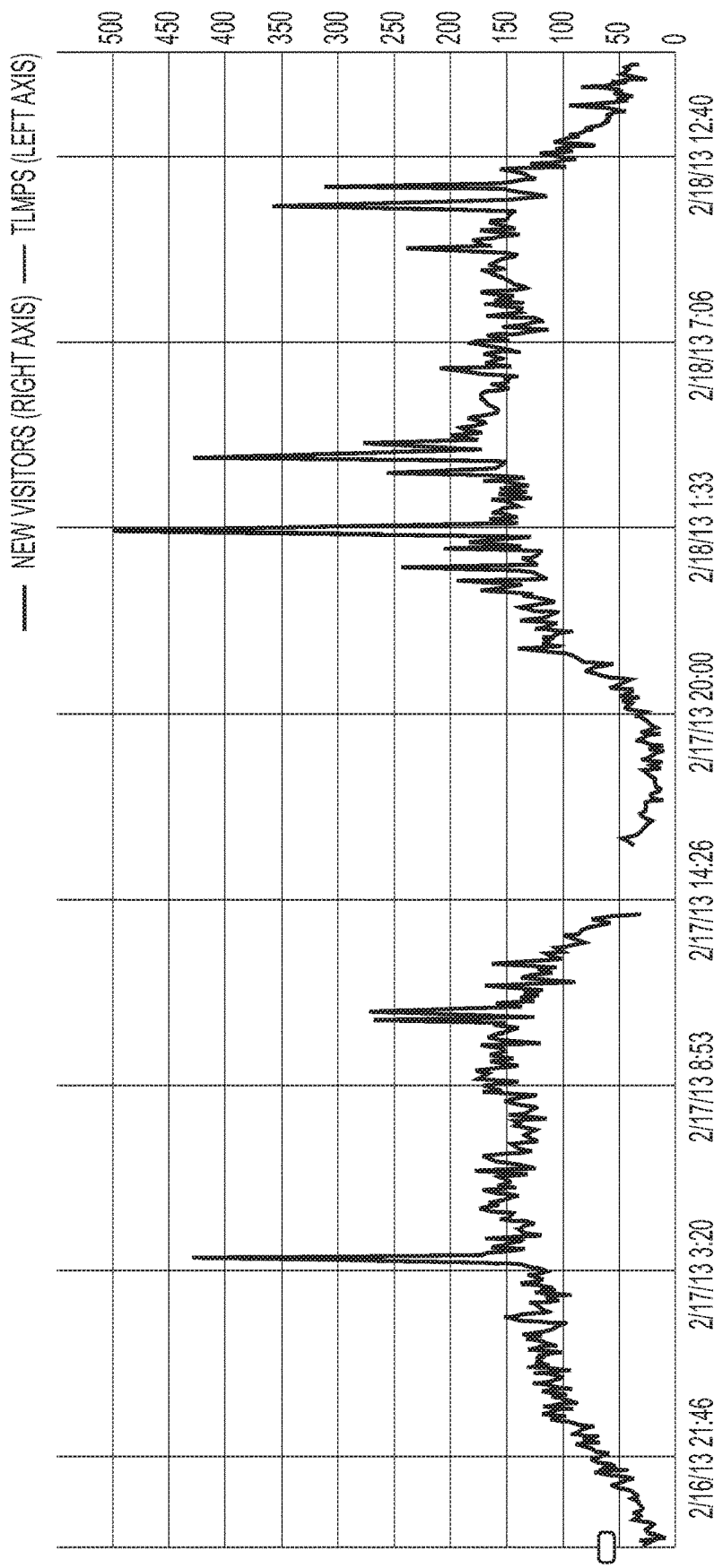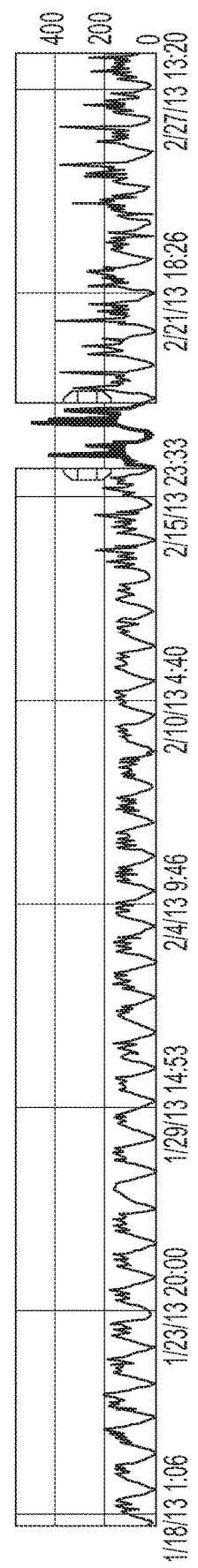
FIG. 3D

FIG. 19

HOME > WEB SPIKE > WEB ATTRIBUTION AIRING SUMMARY

| SOURCE NAME | | | ATTRIBUTION MEASURE AND PARAMETERS | EMAIL SIGNUPS (90.19% / 100%) - 12/19/2014 - JOBID: 83 AGG: NATL |
|---|---|---|---|---|
| START DATE | 10/1/2014 | | END DATE | 11/14/2014 |
| SUMMARIZE BY | DAY PART | | MARKET | NATIONAL |
| MINIMUM IMPRESSIONS | 0 | | MINIMUM AIRINGS | 0 |
| AIRING SOURCE | COMPETITIVE DATE, MONITOR PLUS | | MATCH FAILURE | PROGRAM MATCH FAILURE, STATION M |

| | TRATIO | IMPRESSIONS ACTUAL | IMPRESSIONS BEST | DELTA ACTUAL | WPM ACTUAL |
|---|---|---|---|---|---|
| WEEKDAY - DAYTIME | 0.2852 | 8,472,722 | 8,513,692 | 1,519.48 | 149.82 |
| WEEKDAY - PRIME | 0.2764 | 9,539,132 | 9,672,851 | 1,016.98 | 109.20 |
| WEEKDAY - EARLYFRINGE | 0.2874 | 10,767,901 | 10,820,501 | 1,262.67 | 96.49 |
| WEEKEND - PRIME | 0.2989 | 3,032,183 | 3,032,183 | 286.13 | 89.27 |
| WEEKEND - EARLYFRINGE | 0.2613 | 3,374,859 | 3,374,859 | 233.30 | 71.87 |
| WEEKEND - DAYTIME | 0.2373 | 3,754,036 | 3,754,036 | 266.86 | 65.53 |
| WEEKEND - LATEFRINGE | 0.3911 | 3,679,130 | 3,679,130 | 239.10 | 61.31 |
| WEEKDAY - LATEFRINGE | 0.2699 | 856,142 | 856,142 | 13.34 | 15.05 |
| WEEKEND - MORNING | 0.1603 | 193,719 | 193,719 | 2.48 | 11.99 |
| WEEKDAY - MORNING | 0.1729 | 347,553 | 347,553 | -1.09 | -2.87 |
| WEEKDAY - OVERNIGHT | 0.2020 | 118,879 | 118,879 | | |

*FIG. 22*

HOME > WEB SPIKE > WEB ATTRIBUTION AIRING SUMMARY

| | TRATIO | IMPRESSIONS ACTUAL | IMPRESSIONS BEST | DELTA ACTUAL | WPM ACTUAL |
|---|---|---|---|---|---|
| 10 AM | 0.1626 | 459,789 | 500,759 | 172.51 | 380.90 |
| 7 PM | 0.2095 | 1,808,431 | 1,861,031 | 455.40 | 246.31 |
| 11 AM | 0.3048 | 1,257,828 | 1,257,828 | 210.76 | 162.69 |
| 9 AM | 0.2310 | 902,966 | 902,966 | 112.70 | 159.39 |
| 3 PM | 0.2827 | 2,496,273 | 2,496,273 | 448.18 | 146.89 |
| 10 PM | 0.2676 | 4,106,939 | 4,106,939 | 510.12 | 133.56 |
| 2 PM | 0.2851 | 1,946,370 | 1,946,370 | 263.96 | 132.21 |
| 8 PM | 0.2798 | 3,627,538 | 3,694,289 | 505.58 | 124.85 |
| 1 AM | 0.3682 | 1,313,320 | 1,313,320 | 117.89 | 91.65 |
| 12 PM | 0.3145 | 3,463,043 | 3,453,043 | 402.36 | 88.25 |
| 6 PM | 0.2990 | 3,948,517 | 3,948,517 | 340.08 | 88.16 |
| 1 PM | 0.2152 | 1,700,489 | 1,700,489 | 175.87 | 81.74 |
| 5 PM | 0.2819 | 4,981,769 | 4,981,769 | 358.48 | 67.72 |
| 4 PM | 0.3098 | 3,404,043 | 3,404,043 | 342.02 | 64.15 |
| 9 PM | 0.2912 | 4,836,838 | 4,903,806 | 287.40 | 61.81 |
| 12 AM | 0.3985 | 2,068,998 | 2,068,998 | 107.77 | 48.07 |
| 11 PM | 0.2796 | 1,152,954 | 1,152,954 | 26.79 | 21.28 |
| 8 AM | 0.1424 | 175,155 | 175,155 | 2.72 | 11.88 |
| 7 AM | 0.2065 | 278,765 | 278,765 | -0.74 | -2.43 |
| 6 AM | 0.1232 | 87,352 | 87,352 | -0.59 | -10.83 |
| 3 AM | 0.2020 | 118,879 | 118,879 | | |

FIG. 23

HOME > WEB SPIKE > WEB ATTRIBUTION AIRING SUMMARY

| | TRATIO | IMPRESSIONS ACTUAL | IMPRESSIONS BEST | DELTA ACTUAL | WPM ACTUAL |
|---|---|---|---|---|---|
| VH1 | 0.2766 | 2,042,818 | 2,042,818 | 397.32 | 303.62 |
| LIFE | 0.3069 | 921,538 | 921,538 | 265.86 | 249.93 |
| TLC | 0.4225 | 3,811,086 | 3,811,086 | 674.74 | 194.56 |
| FOOD | 0.2443 | 1,258,813 | 1,258,813 | 219.53 | 174.88 |
| DFH | 0.2398 | 1,216,717 | 1,444,006 | 245.85 | 136.04 |
| MTV | 0.3732 | 8,059,221 | 8,059,221 | 1,313.27 | 106.83 |
| MTV2 | 0.3039 | 7,269,732 | 7,269,732 | 568.35 | 88.45 |
| ADSM | 0.3728 | 4,845,722 | 4,845,722 | 418.99 | 84.64 |
| AFAM | 0.4505 | 2,612,685 | 2,612,685 | 174.03 | 78.81 |
| TBS | 0.3951 | 1,012,597 | 1,012,597 | 106.62 | 77.99 |
| CMT | 0.2366 | 3,047,441 | 3,047,441 | 203.82 | 54.57 |
| GAC | 0.2657 | 1,496,369 | 1,496,369 | 74.33 | 50.34 |
| NAN | 0.4631 | 2,140,199 | 2,140,199 | 68.87 | 31.01 |
| COM | 0.2619 | 2,863,830 | 2,863,830 | 81.97 | 30.46 |
| FXX | 0.2251 | 1,334,273 | 1,334,273 | 27.93 | 15.92 |
| VH1C | 0.1583 | 151,700 | 151,700 | -10.91 | -48.09 |
| FOXB | -0.2939 | 21,738 | 21,738 | -5.26 | -160.35 |
| MGM | -0.3583 | 29,777 | 29,777 | -6.02 | -186.47 |

*FIG. 24*

HOME > WEB SPIKE > WEB ATTRIBUTION AIRING SUMMARY

| | TRATIO | IMPRESSIONS ACTUAL | IMPRESSIONS BEST | DELTA ACTUAL | WPM ACTUAL |
|---|---|---|---|---|---|
| TCL - SURPRISE HOMECOMING | 0.4471 | 212,398 | 212,398 | 164.83 | 949.30 |
| VH1 - T.I. & TINY: THE FAMILY HUSTLE | 0.3312 | 253,822 | 253,822 | 133.85 | 735.39 |
| VH1 - MADEA'S FAMILY REUNION | 0.2855 | 122,619 | 122,619 | 47.70 | 596.00 |
| GAC - FLIPPIN' RVs | 0.3090 | 59,467 | 59,467 | 26.59 | 457.37 |
| LIFE - THE SURROGATE | 0.2869 | 308,083 | 308,083 | 153.83 | 457.37 |
| FOOD - CUTTHROAT KITCHEN | 0.2308 | 568,622 | 568,622 | 210.98 | 366.81 |
| TLC - I DIDN'T KNOW I WAS PREGNANT | 0.4245 | 440,884 | 440,884 | 107.56 | 342.83 |
| LIFE - TRUE TORI | 0.2871 | 202,638 | 202,638 | 75.32 | 325.97 |
| DFH - HOARDING: BURIED ALIVE | 0.3143 | 202,753 | 202,753 | 54.53 | 307.98 |
| MTV - ARE YOU THE ONE? | 0.3499 | 696,230 | 696,230 | 260.39 | 286.53 |
| DFH - SECRETLY PREGNANT | 0.3475 | 89,439 | 89,439 | 38.56 | 274.48 |
| VH1 - LOVE & HIP HOP: HOLLYWOOD | 0.2369 | 1,380,243 | 1,380,243 | 204.92 | 272.19 |
| TLC - SAY YES TO THE DRESS | 0.4326 | 886,540 | 886,540 | 253.88 | 260.55 |
| DFH - MY MOM IS OBSESSED | 0.3164 | | 66,751 | 17.34 | 259.76 |
| MTV2 - BOY MEETS WORLD | 0.3388 | 243,006 | 243,006 | 62.03 | 259.72 |
| TLC - SAY YES TO THE DRESS: ATLANTA | 0.4459 | 329,701 | 329,701 | 58.77 | 254.66 |
| DFH - UNTOLD STORIES OF THE E.R. | 0.3165 | 97,772 | 97,772 | 26.99 | 215.04 |

FIG. 25

HOME > WEB SPIKE > WEB ATTRIBUTION AIRING SUMMARY

| | TRATIO | IMPRESSIONS ACTUAL | IMPRESSIONS BEST | DELTA ACTUAL | WPM ACTUAL | ACQUISITIONS ACTUAL | COST ACTUAL | CPM ACTUAL |
|---|---|---|---|---|---|---|---|---|
| ORIGINAL - MALE & FEMALE - REMEMBER THY NAME :30 | 0.1283 | | 3,779,436 | 153.15 | 40.52 | 18.72 | 20,655.00 | 5.47 |
| FEMALE - REMEMBER THY NAME :30 | 0.1491 | | 15,188,419 | 438.61 | 28.88 | 53.03 | 70,408.90 | 4.64 |
| FEMALE - DIVORCE :15 | 0.1454 | | 19,829,959 | 530.21 | 26.74 | 65.08 | 36,727.65 | 1.85 |
| MALE - REMEMBER THY NAME :30 | 0.4301 | | 16,935,263 | 452.09 | 26.70 | 55.00 | 61,136.25 | 3.61 |
| ORIGINAL - FEMALE - DIVORCE :15 | -0.3746 | | 4,464,923 | 76.28 | 17.08 | 9.21 | 5,865.00 | 1.31 |
| MALE - CAR :15 | 0.3918 | | 16,058,789 | 204.63 | 12.74 | 25.95 | 23,050.30 | 1.44 |

COSTACTUAL IS THE SPOT COST FOR THE TV COMMERCIAL AS PROCESSED BY TELEVISION RECONCILIATION SYSTEMS AND AS BILLED TO THE ADVERTISER. COSTACTUAL CAN TAKE SEVERAL WEEKS TO BE MATCHED UP TO THE AIRINGS, AND SO IN THE MEAN-TIME PREDICTED COST CAN BE USED IF THIS IS NOT PRESENT

THESE PARTICULAR AIRING DO NOT HAVE ACTUAL IMPRESSION AVAILABLE AS YET. AS A RESULT IT USES PREDICTED IMPRESSIONS

ISCI CODE THAT IDENTIFIES TELEVISION AD CREATIVE, ALONG WITH A MORE FRIENDLY DESCRIPTION. NOTE THAT SOME OF THE CREATIVES ARE 15 SECONDS AND OTHERS ARE 30 SECONDS

FIG. 26

SYSTEMS AND METHODS FOR WEB SPIKE ATTRIBUTION

CROSS-REFERENCE TO RELATED APPLICATIONS

This application is a continuation of and claims the benefit of priority to U.S. application Ser. No. 14/720,225, filed on May 22, 2015, which claims the benefit of priority to U.S. Provisional Patent Application No. 62/002,654, entitled "Web Spike Attribution," filed on May 23, 2014, and U.S. Provisional Patent Application No. 62/032,947, entitled "Systems and Methods for Web Spike Attribution," filed on Aug. 4, 2014, which are incorporated herein by reference in their entireties.

TECHNICAL FIELD

Various embodiments of the present disclosure relate generally to web-based conversion tracking on broadcast media systems.

BACKGROUND

Cookies, IP addresses, or other methods to track a person from their interaction with an ad to their conversion have been used. However, television effects are notoriously difficult to measure. Unlike online advertising, there are no cookies to enable tracking of a user between a television advertisement view and an action. This has left television with critical problems with the ability to measure and optimize airings, which results in a large number of irrelevant and poorly targeted ads. The present disclosure addresses this problem and presents experimental findings and solutions.

SUMMARY OF THE DISCLOSURE

According to certain embodiments, methods are disclosed for web spike attribution. One method includes receiving, at a server, one or more heterogeneous sources of media data, the media data including television viewing event; receiving, at the server, web activity data, the web activity data including a time period during the television viewing event and a time period prior to the television viewing event; and measuring, by the server, a delta web response due to the television viewing event based on the web activity data during the television viewing event and the web activity data at a time period prior to the television viewing event.

According to certain embodiments, systems are disclosed for teaching a television targeting system to reach product buyers. One system includes a data storage device storing instructions; and a processor configured to execute the instructions to perform a method including: receiving one or more heterogeneous sources of media data, the media data including television viewing event; receiving web activity data, the web activity data including a time period during the television viewing event and a time period prior to the television viewing event; and measuring a delta web response due to the television viewing event based on the web activity data during the television viewing event and the web activity data at a time period prior to the television viewing event.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1B depicts exemplary data feeds of one or more media agencies of media plan data, according to exemplary embodiments of the present disclosure;

FIG. 1C depicts exemplary data feeds of one or more media agencies of media verification data, according to exemplary embodiments of the present disclosure;

FIG. 1D depicts exemplary data feeds of one or more media agencies of trafficking/distribution data, according to exemplary embodiments of the present disclosure;

FIG. 1E depicts exemplary data feeds of call center data of one or more call centers, according to exemplary embodiments of the present disclosure;

FIG. 1F depicts exemplary data feeds of e-commerce data of one or more e-commerce data vendors, according to exemplary embodiments of the present disclosure;

FIG. 1G depicts exemplary data feeds of order data of one or more data order processing/fulfillment providers, according to exemplary embodiments of the present disclosure;

FIG. 1H depicts exemplary data feeds of consumer data enrichment of one or more audience data enrichment providers from one or more data bureaus, according to exemplary embodiments of the present disclosure;

FIG. 1I depicts exemplary data feeds of guide data of one or more guide services, according to exemplary embodiments of the present disclosure;

FIG. 1J depicts exemplary data feeds of panel data of one or more panel data enrichment providers, according to exemplary embodiments of the present disclosure;

FIGS. 3A-3E depict web activity versus television advertisement airings during a national campaign, according to exemplary embodiments of the present disclosure;

FIG. 19 depicts a graphical representation of a step involved in selecting a web spike attribution report in a graphical user interface, according to exemplary embodiments of the present disclosure;

FIG. 22 depicts a screenshot of a web spike media performance report using daypart as a dimension, according to exemplary embodiments of the present disclosure;

FIG. 23 depicts a screenshot of a web spike media performance report using hour as a dimension, according to exemplary embodiments of the present disclosure;

FIG. 24 depicts a screenshot of a web spike media performance report using network as a dimension, according to exemplary embodiments of the present disclosure;

FIG. 25 depicts a screenshot of a web spike media performance report using program as a dimension, according to exemplary embodiments of the present disclosure;

FIG. 26 depicts a screenshot of a web spike media performance report using creative as a dimension, according to exemplary embodiments of the present disclosure;

DETAILED DESCRIPTION OF EMBODIMENTS

Figure 1A:
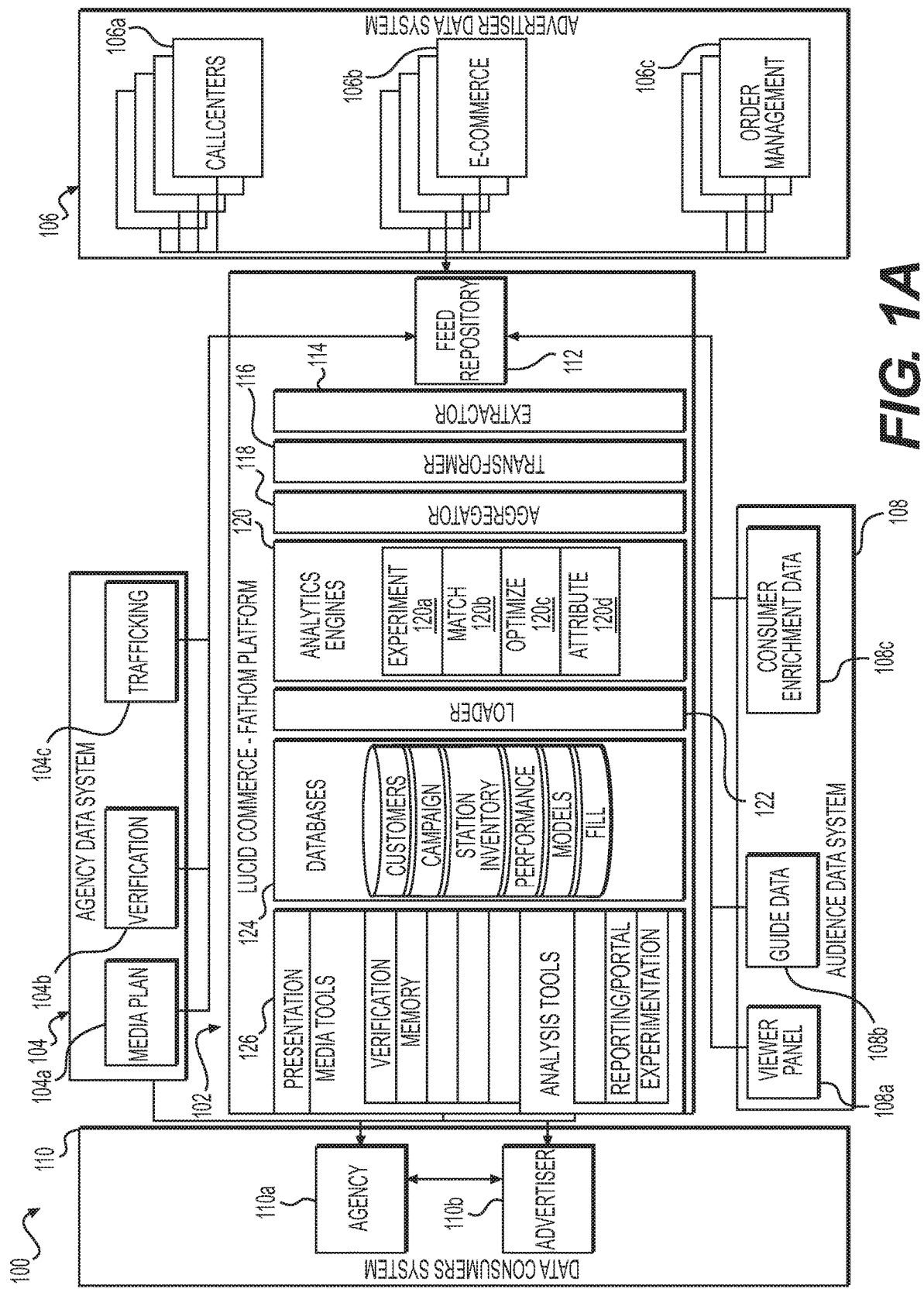
FIG. 1A depicts an exemplary analytics environment and an exemplary system infrastructure for modeling and detailed targeting of television media, according to exemplary embodiments of the present disclosure.

The present disclosure relates to the measuring of web activity bursts after an ad broadcast is presented to multiple people. The system of the present disclosure may use a cookie-less/cookie-optional, anonymous/personal-identification-not-required method for web-based conversion tracking that may work on broadcast media systems, such as television. Additionally, such systems and methods may also be applied to measuring spikes from email, radio, and other forms of advertising where an episodic advertisement event is broadcast to multiple parties, and where responses occur in a batch after the broadcast.

The present disclosure uses a short latency effect to provide a measurement for television campaigns. The present disclosure provides: (1) a description of algorithms that attribute web activity to television airings without the need for training and/or parametric assumptions; (2) a description of how the attributed web response can be used in a TV ad targeting system to automatically target TV ads to the most responsive media; (3) a demonstration of the above in a live advertiser television campaign; and (4) a quantified amount of TV activity that was correctly identified using experimentation. All of the above shows that web spike response may be workable as a conversion tracking signal for television.

As described in detail below, by aligning web activity with TV broadcasts in time and space and applying some signal processing techniques, it may be possible to measure web activity bursts that peak about 13 seconds after traditional TV ad broadcasts. Using this effect, it may be possible to deploy a web-based TV conversion tracking system that will both work today on existing TV systems, and could be used for future IP-connected TV systems. Thus, enabling real-time optimization of television ad targeting.

Various examples of the present disclosure will now be described. The following description provides specific details for a thorough understanding and enabling description of these examples. One skilled in the relevant art will understand, however, that the present disclosure may be practiced without many of these details. Likewise, one skilled in the relevant art will also understand that the present disclosure may include many other related features not described in detail herein. Additionally, some understood structures or functions may not be shown or described in detail below, so as to avoid unnecessarily obscuring the relevant description.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description Section.

The systems and method of the present disclosure allow for the receiving and processing of TV (media) related data and consumer related data from a plurality of different data sources and of a variety of different data types and formats. Based on the received data, the systems and methods may build a model that may be used to estimate a probability of reaching a particular set of persons. The estimated probability may then be used to determine a value associated with buying an advertisement spot within a television program for the advertisement.

System Architecture

Any suitable system infrastructure may be put into place to receive media related data to develop a model for targeted advertising for television media. FIG. 1A and the following discussion provide a brief, general description of a suitable computing environment in which the present disclosure may be implemented. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, multi-processor systems, microprocessor-based or programmable consumer electronics, set-top boxes, network PCs, minicomputers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. In a distributed computing environment, program modules may be located in both local and remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Use of the system of FIG. 1A may involve multiple initial steps of setting up data feeds that can be used to receive data for building one or more models as described herein for evaluating television programs, estimating ad effectiveness, and estimating ad response.

One step may be to setup data feeds with one or more media agencies, which may ensure the collection of all the data about what media is being purchased, running, and trafficked to stations. This may also ensure that there is an accurate representation of the available television media. This step may include setting up data feeds for one or more of: media plan data (e.g., as shown in FIG. 1B), which may include data that is produced by media buyers purchasing media to run in the future; media verification data (e.g., as shown in FIG. 1C), which may include data that is generated by third-party verification services; and/or trafficking/distribution data (e.g., as shown in FIG. 1D), which may include sample trafficking instructions and/or order confirmations sent to TV stations; media response data which is the response of viewers to the TV ad, captured either through web activity, phone activity or other responses; TV schedule guide data which comprises data on upcoming program airings, TV set top box data which comprises a record of viewing activity from set top box subscribers; TV panel data which comprises a record of viewing activity from television viewers.

Media plan data may include a station a commercial will run on, an advertiser, topic information, a media cost associated with the purchase, a phone number, and/or a web address that is associated with the commercial for tracking purposes.

Third-party verification services may watermark commercials and monitor when the media was run across all TV stations. The data generated by third-party verification services may be used to verify that a media instance that was purchased for an advertisement spot was actually displayed on TV.

The sample trafficking instructions and/or order confirmation may include a product that was purchased, and instructions that a station is to use when displaying a commercial.

Another step may be to setup data feeds with one or more call centers, which may ensure there is accurate data about callers that called into specific phone numbers. This step may include receiving a call center data feed (e.g., as shown in FIG. 1E). Call center data may include any data associated with phone responses to phone numbers displayed in a commercial.

Yet another step may be to setup one or more data e-commerce vendor data feeds. E-commerce data feeds may be setup to receive recurring data feeds with a vendor and/or internal system of an advertiser that records orders that come in from an advertiser's website (e.g., as shown in FIG. 1F). E-commerce data may include orders that came in on an advertiser's website, customer information, and/or a time, volume, and/or substance of the orders. Another step may be to set up one or more web activity feeds with a vendor and/or internal system of an advertiser that records web activity corresponding to TV broadcasts.

Another step may be to setup one or more data order processing/fulfillment data feeds. Data order processing/fulfillment data feeds may be setup to receive recurring data feeds with order vendor and/or internal system that physically handles the logistics of billing and/or fulfillment. This step may ensure an accounting of subsequent purchases, such as subscriptions and for returns/bad debt, etc., and may ensure accurate accounting for revenue. This step may also include receiving data from a series of retail Point of Sale ("PoS") systems (e.g., as shown in FIG. 1G). Order data may include a purchase record, subsequent purchases, debt collection information, and return information.

Another step may be to setup one or more audience data enrichment data feeds with one or more data bureaus. This step may ensure that callers, web-converters, and/or ultimate purchasers have their data attributes appended to their record in terms of demographics, psychographics, behavior, etc. (e.g., as shown in FIG. 1H). Examples of data bureaus may include Experian, Acxiom, Claritas, etc. This data may include attributes about consumers from the various data bureaus, such as demographics, psychographics, behavioral information, household information, etc.

Yet another step may be to setup one or more data feeds with one or more guide services. This step may ensure that forward looking guide service data is ingested into the system. This data may be programming based on what is going to run on television for the weeks ahead (e.g., as shown in FIG. 1I). This upcoming media may be scored to determine which of this media should be purchased. Program guide data may include data related to a future run of programming, such as a station, time, program name, program type, stars, and general text description.

Another step may be to setup one or more data feeds for panel data enrichment. Data related to purchasers of products on television, set top box viewer records, and/or existing panels may be received as a data feed and appended to an advertiser's purchaser data mentioned above (FIG. 1J). Panel data enrichment may include viewer/responder data, such as demographic, psychographic, and/or behavioral data.

In another step, all of the underlying data may be put into production. For example, all of the data feeds setup from steps one through seven may be loaded into an intermediate format for cleansing, adding identifiers, etc. Personally Identifiable Information ("PII") may also be split and routed to a separate pipeline for secure storage. As shown in FIG. 1A, an analytics environment 100 may include a media processing system 102, an agency data system 104, an advertiser data system 106, an audience data system 108, and a processed media consumer system 110.

At the next step, media plan data 104a, verification data 104b, and/or trafficking data 104c of the agency data system 104 may be received at a data feed repository 112 of the media processing system 102. Further, call center data 106a, e-commerce data 106b, and/or order management data 106c of advertiser data system 106 may be received at the data feed repository 112. Additionally, viewer panel data 108a, guide data 108b, and/or consumer enrichment data 108c of the audience data system 108 may be received at the data feed repository 112. After one or more of data feeds are received by the feed repository 112, data may be extracted from the data feeds by extractor 114 of media processing system 102.

At another step, business logic/models may be run for matching responses and orders to media ("attribution"). In this step, the data extracted from the data feeds has been ingested into the system at the most granular form. Here, the phone responses may be matched up to media that generated it. The e-commerce orders may be matched using statistical models to the media that likely generated them. As shown in FIG. 1A, transformer 116, aggregator 118, and analytics engine 120 of the media processing system 102 may process the aggregated data of the data feeds. Analytics engine 120 may include various sub-engines, such as experiment engine 120a, match engine 120b, optimize engine 120c, and/or attribute engine 120d, to perform various analytical functions.

At yet another step, the analyzed data may be loaded into databases. For example, the data may have already been aggregated and/or final validation of the results may have been completed. After this, the data may be loaded by loader 122 into one or more databases 124 for use with any of the upstream media systems, such as data consumers system 110. These include the ability to support media planning through purchase suggestions, revenue predictions, pricing suggestions, performance results, etc. One or more databases 124 may include customers database 124, campaign database 124, station inventory database 124, performance database 124, models database 124, and/or PII database 124.

At another step, the analyzed data may be used by presentation module 126. In this step, all of the data may be accessible to the operators of various roles in the media lifecycle. This may include graphical tools for media planning (where the targeting in this application primarily fits), optimization, billing, trafficking, reporting, etc.

The above-described system may be used to gather, process, and analyze TV related data. This data may then be used to identify certain available media instances, or advertisement spots, that an advertiser may purchase to display an advertisement. As will be described in further detail below, advertisement spots, also referred to as media instances, may be evaluated and scored to assist an advertiser in choosing which media instance to purchase.

Web Spike Alignment

As mentioned above, a short latency effect exists between television broadcasts and web searches. For example, after a Super Bowl ad for a movie, there may be an increase amount of searches for the movie seconds after the ad airs. These web spikes may be used as an attribution system for measuring the impact of any particular advertisement. These measurements may be used to optimize an ad targeting system.

Robust algorithms may attribute web activity to television airings without the need for training and/or parametric assumptions. This "model-less" may allow the system and method to work in a robust manner and capture complex effects from the ads being tracked. Performance analyses may use the attributed web activity to identify the best performing ads. The attributed web response may then be used to create a feedback loop which will enable an ad targeting system to automatically target ads to the most responsive media.

The present disclosure, as discussed in detail below, may perform the following steps. In a first step, the method may align web activity with advertising events in time and space. Then, the method may filter the web activity to a subset. In an optional step, a parameter space may be automatically searched to find the best combination of exclusion window, time grain, measure. Next, a measurement of a delta web response observed after each airing may be performed by subtracting background activity using one or more of various methods. This may effectively measure a residual change in web activity that is different from background activity. Then, the delta web response may be attributed to the airing. In an optional step, performance reports may be created for different ads, including various parameters, such as creative, days, hours, networks, programs, and so on. Finally, in another optional step, the performance information may be fed back into a targeting system, which then optimizes its ad targeting.

In the following example, an advertiser may be running advertising and may be maintaining a website. The advertiser may use the systems and methods disclosed herein to measure an impact of the advertisement airings on their website.

$I(m(t_1,z_1,G))$ may be the impressions associated with a media airing at time $t_1$, time zone $z_1$ and geography G. $w(t2,z_2,G)$ may be a web traffic metric, such as new visitors, at time $t_2$, time zone $z_2$, and geography G. The time zones may be represented as a number of hours to add from Greenwich Mean Time ("GMT"). In this scenario, the web servers may be located in a particular time zone, such as $z_2$.

The input to the system may be a set of media airings (M) and a set of web measurements (W), as represented by the following formulas:

$M=\{m(t_1,z_1,G)\}; W=\{w(t_2,z_2,G)\}$

The system may then generate a set of attributed airings with the same cardinality or lower as the original media events, as shown by the following formula:

AttributedAirings=$\{(m,\Delta w,I,wpi)\}$

Where, $\Delta w$ may be the web activity due to ad m, I may be the impressions from the ad, and wpi may be $\Delta w/I$, which may be the web response per impression due to the ad airing.

In order to align web activity and ad broadcasts, the media airings may be mapped to the same time zone. The mapping may ensure that a media activity and web activity both occurred at the same time. Then, the web activity may be bucketed into the same geographic G and time buckets t for both web traffic and television airings.

Local broadcasts have well-defined times and time zones. For example, a local broadcast may be Abilene, Tex., which has a single time zone of "Central Time."

National broadcasts may be recorded separately from local broadcasts. National media airings may span multiple times zones, and therefore, may require different logic to operate. For example, the logic to operate may differ based on whether the network is a live feed network or a dual feed network.

Live feed networks may have a single video stream that runs at the same universal time in all geographies. These types of airings may all be recorded using a designated time zone, such as "Eastern Time."

Dual feed networks may re-broadcast east coast programming at the same local time for west coast programming. For example, dual feed networks may air at 8 pm Eastern Time, and then the dual feed network may air a program again on at 8 pm Pacific Time, which is effectively 3 hours shifted in universal time. Thus, two events may occur in a universal time. For these broadcast, it may be needed to create a "Ghost Airing" that is a copy of the national airing, but with impressions scaled to West Coast population and East Coast airing by its proportion of population.

From the above, several airings may effectively be occurring in different local geographies. These airings may be aggregated to create a special national geography. The special geography G=National may sum both local and national broadcasts so that there is capturing of all broadcast activity.

Upon obtaining the above discussed information, the media and web activity may be aligned in time and analyzed for impact.

The sum of all web activity across all geographies may be defined as W(T, G), and the sum of all media activity across all geographies in the same time-zone may be defined as I(M(T, G)), which may be calculated with the following formulas:

$$W(T, G) = \sum_{t \in T} w(t, z_2, G)$$

$$I(T, G) = \sum_{t-(z_2-z_1) \in T} I(M(t-(z_2-z_1), z_1, G))$$

Figure 2:
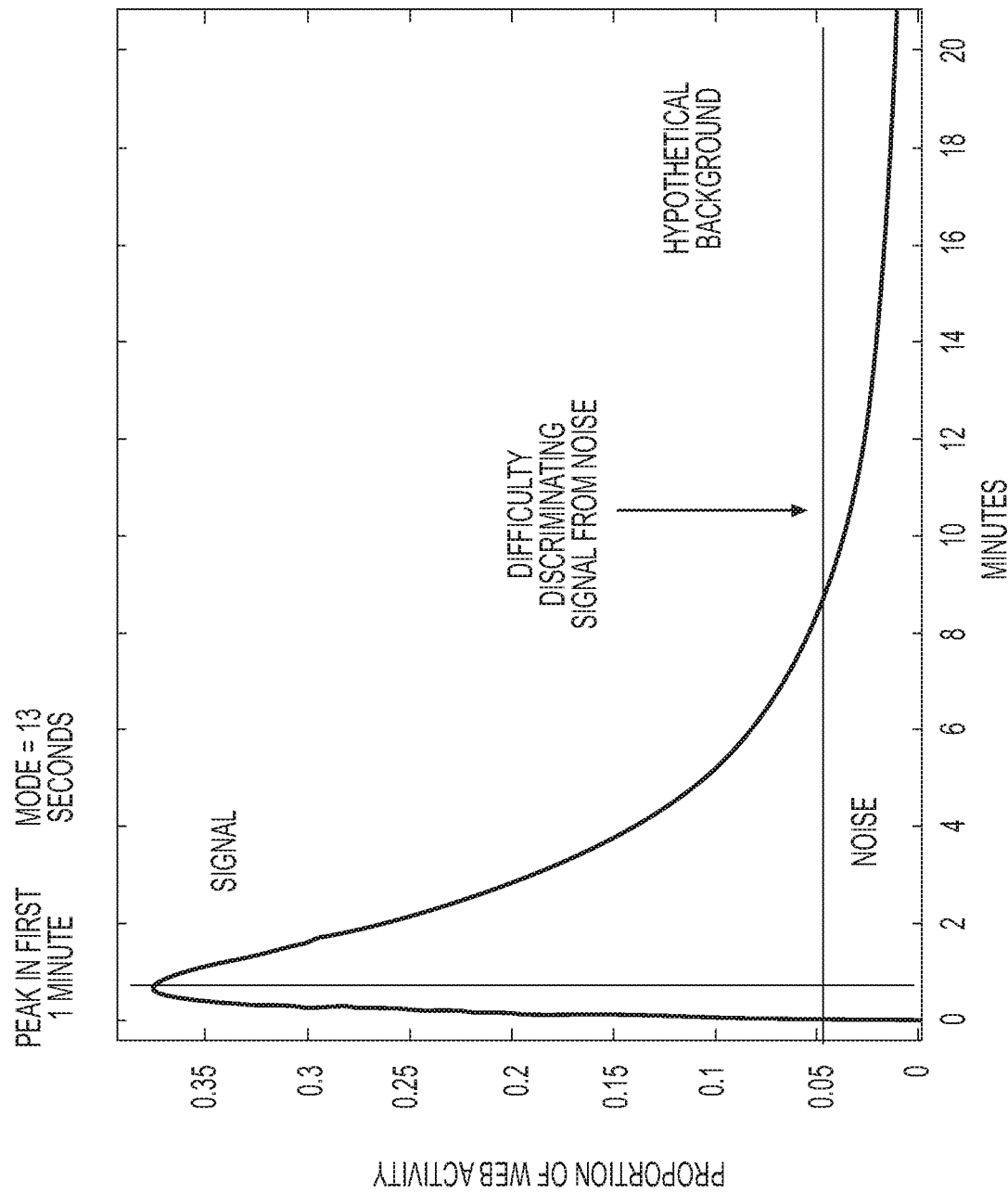
FIG. 2 depicts a graph of web activity in response to a TV advertisement, according to exemplary embodiments of the present disclosure.

After aligning the web activity with airing, it may be possible to characterize the shape of a web response curve. In one example, Lewis and Reiley (2013)'s Super Bowl Yahoo Search data was used, which shows search queries for a brand-name every 10 seconds after a 30 second Super Bowl commercial aired for the same brand. A log-normal distribution was used to fit the data (KS*=0.10; $\upsilon$=5.2322; $\sigma$=1.2102; as shown in Table 1 below). From a parameterized curve, as shown in FIG. 2, TV searches may occur rapidly after exposure to a TV ad. The peak response activity occurs just 13 seconds after the end of the ad.

In comparison, after seeing a display ad for a retailer on a website, there is a peak for searching the same retailer's name at 23 seconds after exposure. Therefore, TV ads seem to drive faster response relative to display ads. These times may be influenced by an amount of content on web pages hosting display ads, auto-completions on search engines, and other factors, and thus, numbers may not be definitive, but merely provide some guidance as to the approximate time-scale involved.

As shown above in FIG. 2, a Log-Normal fits to Yahoo searches received after the start of a Super Bowl commercial with the dashed lines showing 1 and 6 minute marks. Measurement regimes capture the peak activity which is within the first minute as this carries the highest signal-to-noise ratio. After 6 minutes 50% of activity has been recorded and signal-to-noise begins to drop significantly.

Table 1, as shown below, provides a Log-Normal that fits to Super Bowl data including descriptive statistics. As shown below, a Kolmogorov-Smirnov ("KS") statistic may provide a good fit.

TABLE 1

| Statistic Type | Seconds between Display Ad and Search on featured Brand | Seconds between start of Super Bowl Ad and Search on featured Brand |
| --- | --- | --- |
| KS | 0.07377 | 0.10356 |
| Mode | 21.62 s | 43.27 s |
| Mean | 136.96 s | 389.35 s |
| Stdev | 213.21 s | 710.06 s |
| Sigma | 1.1094 | 1.2102 |
| Mu | 4.3044 | 5.2322 |
| Skew | 8.4431 | 11.537 |
| Kurtosis | 246.78 | 562.26 |

Applying Filters to Improving Signal-to-Noise

Super Bowl search data may present a statistical argument that web effects from T may be visible on very large broadcasts. It may be shown that buying N small airings, each at 1/N the price, would have to contend with the same degree of noise, but with 1/N the media effect strength, and only a square root of N gain in t-test power. Thus, it may be a net loss to execute more, smaller airings, even with the same media budget. However, Super Bowl airings may be economically infeasible for most advertisers. It may be possible that a $4 million dollar TV spot and a $400 spot have a similar level of signal detection through various techniques for increasing signal-to-noise ratios.

Several practical steps may be taken to improve the signal-to-noise ratio on small TV campaigns. Super Bowl ads cost $34.80 per thousand impressions and/or CPM, where-as the national TV media CPM average was only $6.60 based in 2012. Therefore, small TV spots may buy about 5 times more impressions for the same budget, which also increases signal amplitude.

One way to improve signal-to-noise ratio may be to use geographic areas G, if a TV advertisement is run in only a small number of geographic areas at higher media weight. Then, for a far less expensive campaign, a higher weight may be applied per capita without incurring the cost of a national campaign.

Another way to improve signal-to-noise ratio may be to localize effects temporally. About 13 seconds after the end of a commercial broadcast, signal-to-noise ratio is at its maximum. At that time, more visitors on the site may be newly arrived due to the recent TV airing than background. The time window may need to be fine enough to sample this high signal-to-noise region of a curve. For example, the difference between a 30 second sampling window and 1 day is a 1,800× reduction in signal mean. Therefore, localization in time with short time windows may be critical for achieving a temporary signal-to-noise superiority.

Yet another way to improve signal-to-noise ratio noise may be to eliminate robotic activity. Bots tend to produce large volumes of traffic and may completely mask human activity. Methods for eliminating bot activity may vary. Bots may be designed to avoid detection, and one good method may to use a system, such as Google Analytics, to capture and extract data, since this may be supported by Google's bot filtration systems.

Another way to improve signal-to-noise ratio noise may be to measure the targeting of the television ads. "Targetedness" measures how well an advertisement matches the audience. Untargeted ads may produce almost no lift at all. Targeted impressions, rather than simply viewers, may be used to estimate more reliable web spike results.

Another way to improve signal-to-noise ratio noise may be to filter to subsets of traffic that have a higher prevalence of television behavior that is sought to be isolated. Real-time responses to a TV ad may occur from people watching the broadcast live, and tend to require a tablet or mobile device. Traffic may be more likely to visit the homepage, rather than a deep-linked page, and the activity may likely be from new visitors who have not been on the site before. By focusing on this class of traffic more organic background activity may eliminated, which may leave a higher signal-to-noise ratio for the TV generated traffic. A list of the filters are below:

After aligning web activity with advertising events in time and space, the system and method of the present disclosure may apply one or more filters. While the web effects from a TV advertisement, may be small and/or require a very large broadcast, it may be possible to measure TV effects even on small airings by accounting for a signal-to-noise ratio. Filtering the web activity may be down in through one or more processes, as described below.

One process may use geographic areas. For example, if a TV advertisement is run in geographic areas at a high media weight, then for a relatively low spend, it may be possible to produce detectible effects. Another process may localize the effects temporally. The spike curve shape may be exponential with a sharp peak followed by a rapid decline. Therefore, within 5 minutes of a broadcast, signal to noise ratio is greatest. Measurements within 10 minutes, 20 minutes, and 1 day later may have very poor signal to noise ratios. Accordingly, localization in time may be used to achieve a temporary signal-to-noise superiority.

Another process may be to apply signal filters to remove as much background noise as possible. Immediate real-time responses to a TV ad may occur from people watching the broadcast live, and usually with a computing devices, such as a smart phone and/or a tablet. Traffic may be more likely to visit the homepage, rather than a deep-linked page. Additionally, the activity may be from new visitors who have not been on the website before. By focusing on this class of traffic, background organic activity may be eliminated, and thus, leaving a very high signal to noise ratio. A list of filters to be applied to the web activity is presented below:

New Cookie Filter: Filtering for visitors who have been assigned a cookie for the first time. This may eliminate traffic of non-web spike visitors who have visited the site before, and thus, may increase the magnitude of the web spike compared to background activity Homepage Requests Filter: Filtering for visitors who are requesting the homepage, rather than a deep-linked page. As mentioned above, web-spike visitors may be more likely to navigating to the homepage of the website for the first time in response to an advertisement. This filter may help to eliminate repeat purchase traffic of non-web spike visitors.

NULL Referrer Requests Filter: Filtering for website requests with NULL Referrer, which are requests where the visitor is not known to have navigated from a search engine, deep-link, or another method. The NULL Referrer Requests Filter may filter for web-spike visitors who have directly typed the URL into their web browser to access the site for the first time.

Mobile and Tablet User-Agents Filter: Filtering for requests in which the User-Agent is a mobile or tablet user agent string. Requests from mobile or table users may have a much greater response to television ads.

Time Filter: Filtering for a web traffic's server clock time that was measured within 5 minutes of the broadcast appropriately adjusted for time zone. Web traffic's server clock time may also be aggregated within 1 minute or less of a broadcast appropriately adjusted for time zone.

Geography Filter: Filter for a web traffic's IP originated from the same geography as the TV broadcast.

Web Spike Alignment Example Embodiment

Presented below is a live TV advertisement that has been analyzed. A live advertisement may be analyzed to determine if web spike responses may be detected on very small airings. The data is from a live TV campaign that ran from Feb. 11, 2013 to Jul. 9, 2013 with 35,296 airings. The airings were detected using digital watermarks. The average spot cost was $143 per airing, which is less than Super Bowl airings costs.

Figure 3A:
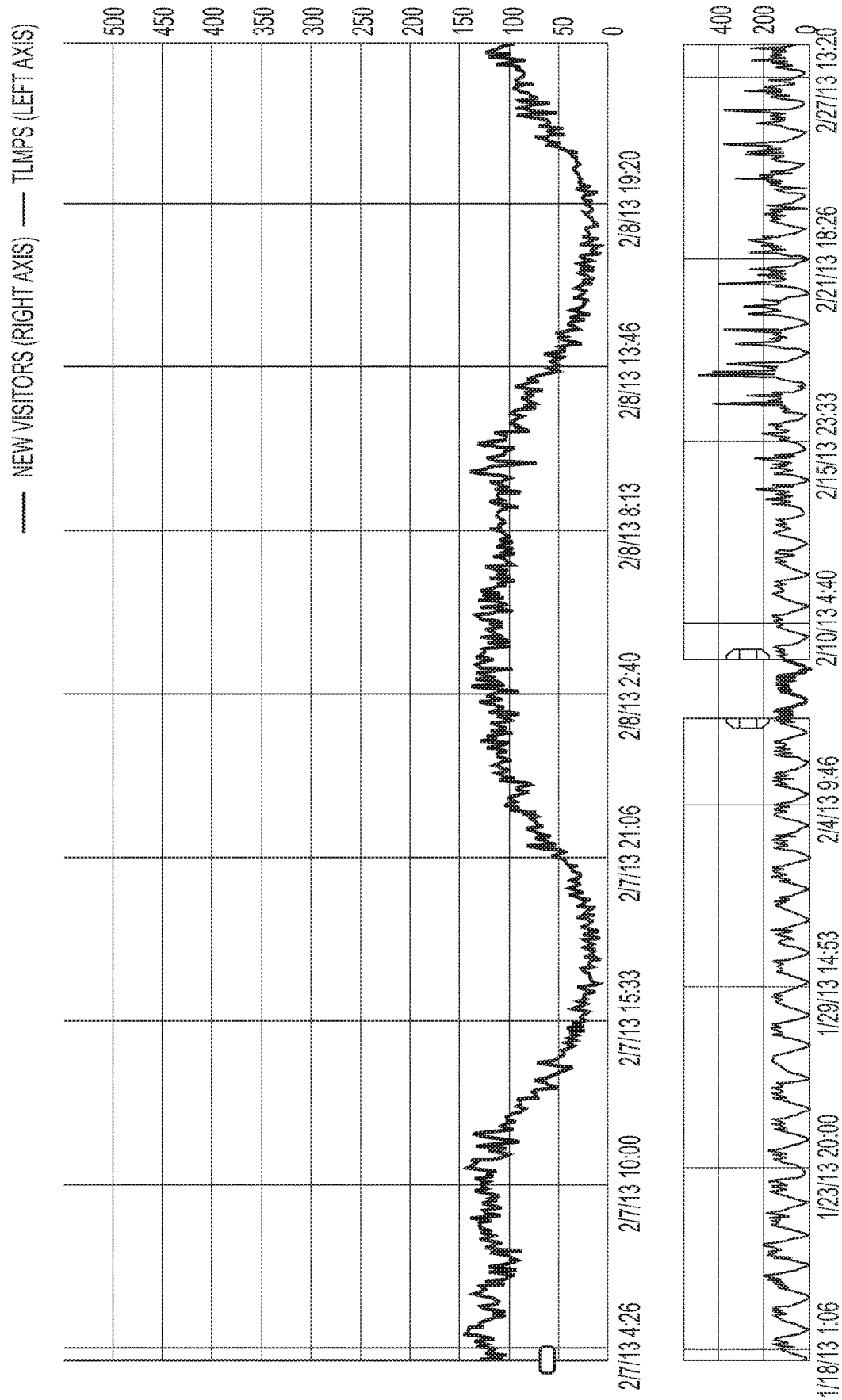
Figure 3B:
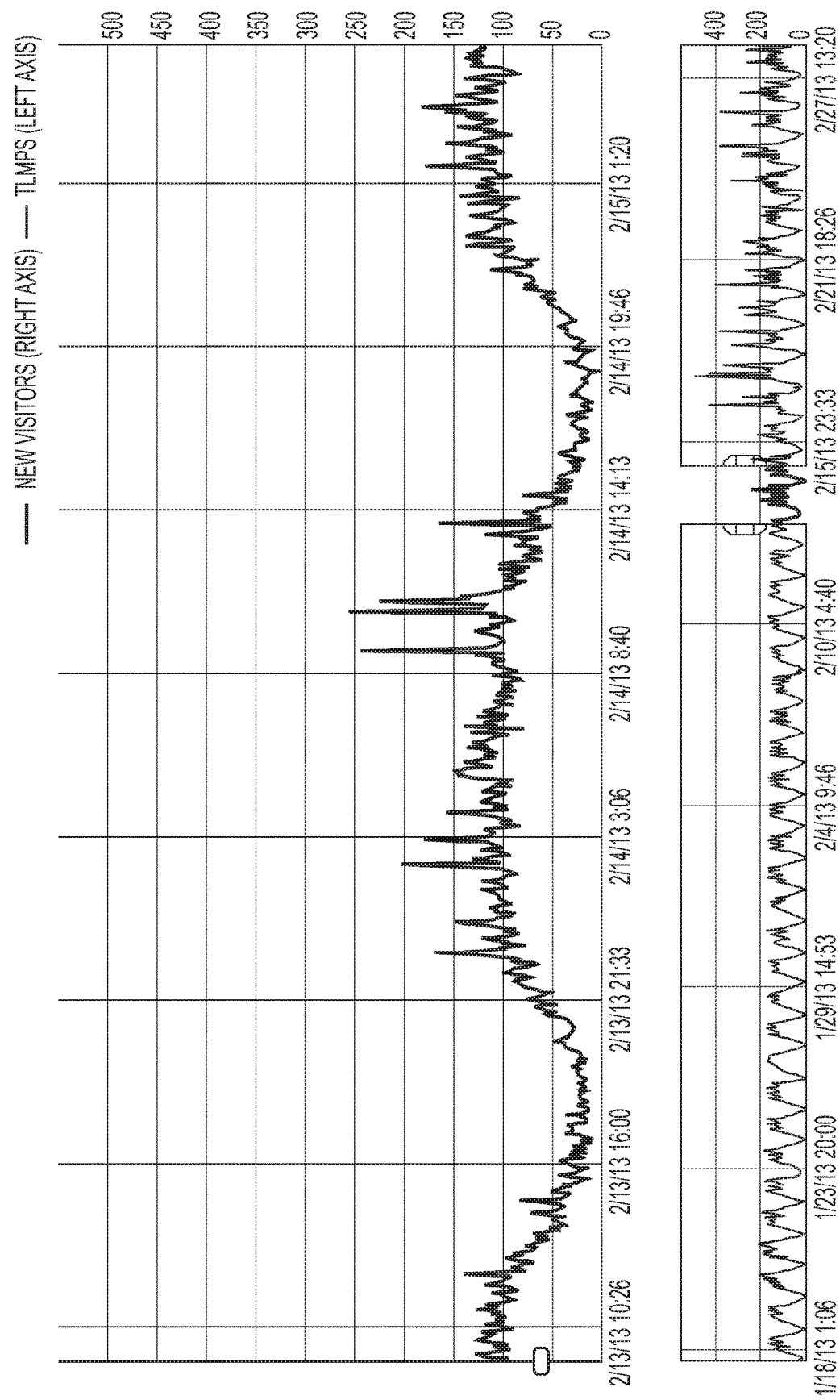
Figure 3C:
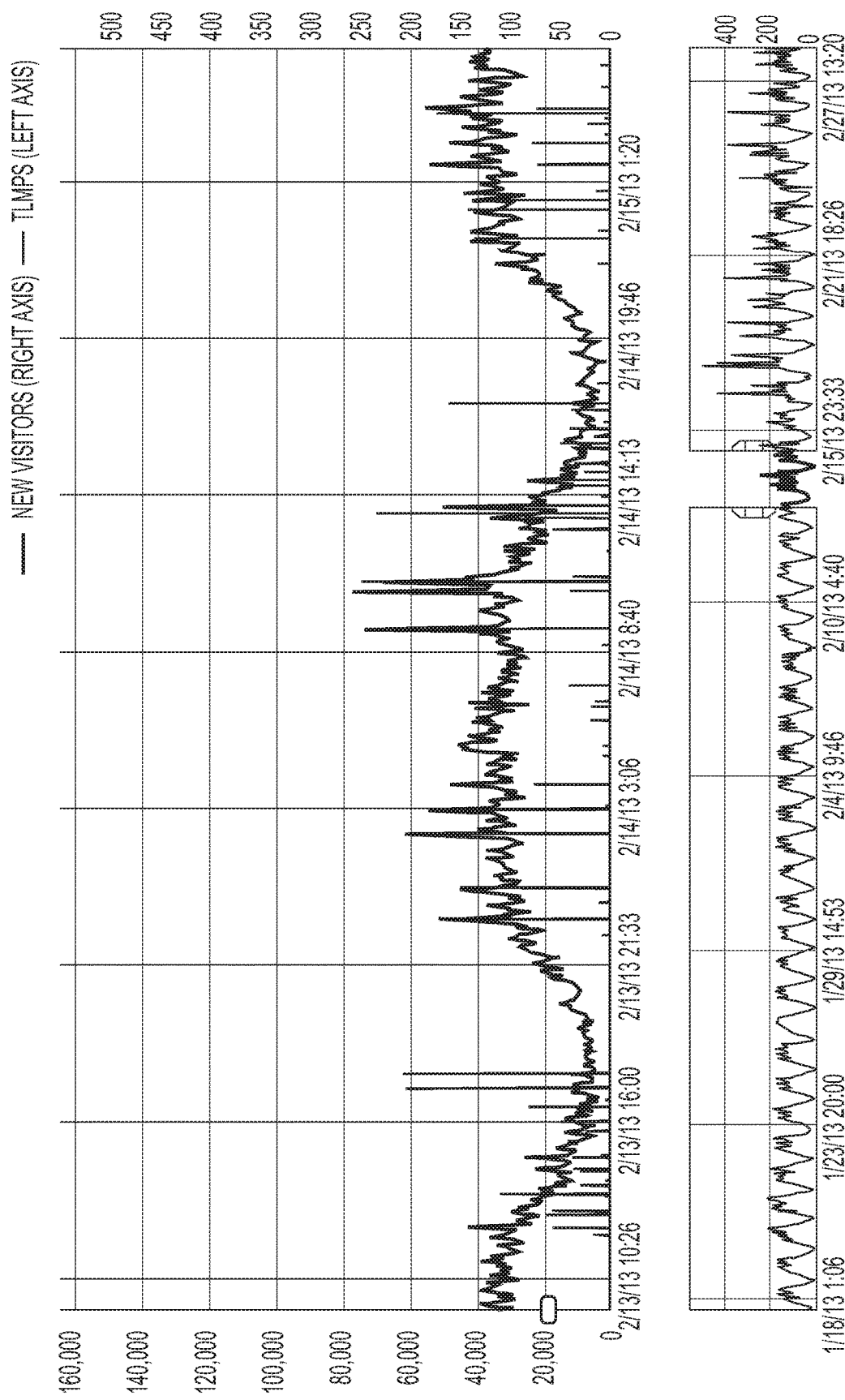
Figure 3E:
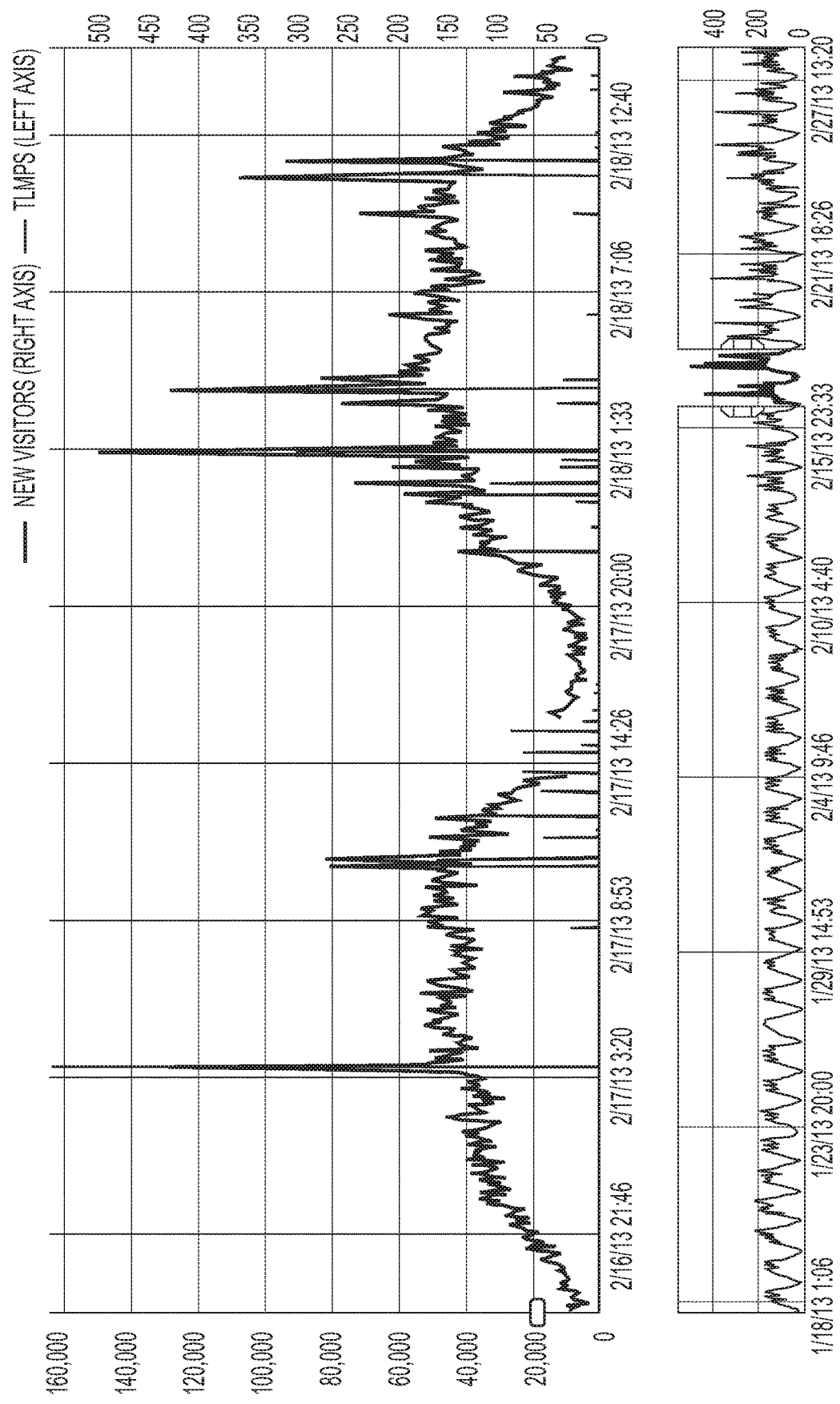

FIGS. 3A-3E depict web activity versus television advertisement airings during a national campaign. In this embodiment, aggregated data from advertiser web logs may be represent as 5 minute time buckets. FIG. 3A provides new visitor web activity using 5 minute time intervals and national geography, from Jan. 20, 2013 to Feb. 25, 2013. The time series may become more spikey around Feb. 11, 2013. The reason for the spikes may be seen in close-up in FIG. 3B, which provides a zoomed in time scale. As shown in FIG. 3C, when revealing TV media, that the airings that are producing the spikes may line up with the web spikes. FIG. 3D depicts web spikes during around Feb. 18, 2013 national advertisement campaign. FIG. 3E provides a targeted impression aligned with web spikes in a time series.

Web Spike Alignment Interactive User Interface

The web spike alignment may be displayed in an interactive user interface (also referred to as a "web spike explorer"). The web spike alignment display may enable a user to drag forward and backward in time, to zoom, switch on or off airing impressions or targeted impressions. When the web spike alignment display shows impressions along with web activity, the web spike alignment display may be able to show a match between ad airings and web activity.

The web spike explorer may also be used to create a near-real-time application. The web spike explorer may be combined with a broadcast media tracking services (e.g., Kantar BVS, MediaMonitors, etc.) and web traffic analytics services/weblog processing systems (e.g., Google Analytics, web log processing) to produce a display that is able to show airings, web activity, and provide updates close to real-time. The web spike explorer may also show upcoming airings and overlay predicted web activity changes. One embodiment of web spike explorer may include a countdown clock to a next broadcast airing.

Attributing Web Activity to Advertising Events

The durability of web spikes may allow for these web effects to be used to build a television conversion tracking system for TV effectiveness reporting and optimization. In order to build such a system, properties, as described above may be used. Specifically, observed web activity $W(T,G)$ can divided into two parts: (a) the web activity due to the television airing $f(I(M(T,G)))$, plus (b) background web activity that would have occurred anyway $W_{NoTV}(T,G)$, as represented by the formula $$W(T,G) = f(M(I(T,G))) + W_{NoTV}(T,G)$$

which may be rearranged as:

$$f(I(M(T,G))) = W(T,G) - W_{NoTV}(T,G)$$

When estimating the total effects of television, the exact parametric functional form of f does not have to be identified. The exact parametric functional form of f may be a complex function, require a large number of factors, and involve complex interactions. For attribution purposes, $W_{NoTV}(T,G)$ (the background web activity that would have occurred without TV), may be estimated. Once estimated, for every time-period and geography (T and G), an attributed television estimate using the formula above may be calculated. In other words, the background $W_{NoTV}(T,G)$ may be estimated and removed from observed activity to infer the activity due to TV.

Thus, the system may approach the attribution problem in as "model free" a fashion as possible and may learn what TV is not. In practice, the background traffic may tend to be more reliable to estimate than activity during TV airings, as there are many more observations of web activity and it is often periodic and predictable. TV estimates then become the observed residuals after subtraction of background, in the narrow window during TV airings when there is high signal-to-noise. Four algorithms for removal of background activity are provided below, which introduce minimal assumptions.

Instantaneous Treatment Control

The first algorithm may be an instantaneous treatment-control algorithm that works by estimating the web traffic without TV as being equal to the web traffic in the time period before the airing. In the formula provided below, the web activity control period y indicates how many periods of time prior to the present may be used to create an average for web activity (e.g., y=1). Additionally, the algorithm requires there to have been no media airings during z time-periods prior to the present (e.g., z=1), the exclusion window. This ensures that the previous web activity is not being elevated by an earlier media event.

$$W_{NoTV}(T, G) = \begin{cases} \frac{1}{y}\sum_{t=1}^{y} W(T-t, G): \text{ if } \sum_{t=1}^{z} I(M(T-t, G)) = 0 \\ UNDEF: \text{ otherwise} \end{cases}$$

By using the web activity prior to the airing as the no TV baseline, the treatment when TV was applied may be close in time to the control, and the environmental conditions, including day-hour-minute traffic levels, of the website should be very similar in these two cases. Therefore, any change in web visits may be likely to have been caused by the TV airing.

This algorithm has an advantage of being robust when faced with real-world problems such as bots. Bots crawl various pages, and then may not be seen again for some time. This may cause significant problems when estimating models of web activity, since global models, such as regression, may be severely disrupted by what appears to be large amounts of web traffic.

However, because web activity immediately prior to the airing may be close in time to time of airing, it may be likely that the bot will be present and generating a similar inflation during both time buckets T and T−1. Therefore, if we have:

$$f(I(T,G)) = W(T,G) + BOT(T,G) - (W(T-1,G) + BOT(T-1,G))$$

If $BOT(T-1,G) = BOT(T,G)$, then the estimate will not be affected. This may be likely to be true in many cases because bot activity is correlated in time.

Day-Hour-Minute Modeled Subtraction

The second algorithm may be day-hour-minute modeled subtraction, which works by building an expectation for the day-hour-minute bucket for web activity on the website when TV is not present. One method may be to take an average for an day-of-week-bucket, hour-of-day-bucket, and a minute-bucket when a media airing has not occurred within the last z time-periods prior to the day-hour observation.

$$W_{NoTV}(T, G) = E[W(Y, G)]: \sum_{t=1}^{z} I(M(Y-t, G)) =$$

$$0 \wedge DD(Y) = DD(T) \wedge HH(Y) = HH(T) \wedge MM(Y) = MM(T)$$

$$W_{NoTV}(T, G) = UNDEF; \text{ otherwise}$$

Where DD(Y) is the day-of-week for time bucket Y, HH(Y) is the hour of day of time-bucket Y, MM(Y) is the minute bucket for Y, and E[ ] is the mean. For 7 days, 24 hours and 0 minute buckets, this may be equivalent to defining 168 day-hour 1-0 dummy variables in a regression model that is trying to predict the non-TV background web activity.

The day-hour-minute subtraction algorithm may be a global model. The algorithm may be susceptible to problems including: (a) in-time trends in web activity (for example, if a website's traffic is growing, then the method may incorrectly begin to estimate more activity due to television); (b) bot activity, which may cause outliers to pull the numbers out; and (c) transient background changes due to interference from other TV airings from the same campaign. Nevertheless, for well-spaced airings the algorithm may be effective.

Instantaneous with Dynamic Pre-Periods

A third algorithm may be "dynamic pre-periods," which rather than excluding an airing if there is activity in the last z time buckets, instead, attempts to assemble a baseline using as many periods of data that are possible, up to the next airings in the past, or z, whichever is later. Therefore, if there was an airing $M_1$ a 45 minutes in the past and another $M_2$ 15 minutes in the past, and the maximum time window z is 30, then this algorithm may take the time period 14 minutes in the past until 1 minute in the past as the baseline, as shown in the following formula:

$$W_{NoTV}(T, G) = \frac{1}{y}\sum_{t=1}^{y} W(T-t, G)$$

Where y=max(PrevAiring(M(T,G)), z), and PrevAiring is the most recent airing preceding M.

The dynamic pre-period algorithm may be effective in attributing a larger number of airings than the instantaneous treatment control algorithm with exclusion periods. However, the variable baseline period may introduce some endogeneity because an airing at 5 minutes ago, 10 minutes ago, and 30 minutes ago may each retain a different degree of residual lift. Thus, a baseline level when the most recent airing is 5 minutes ago may be higher, than when the most recent airing is 30 minutes ago. Since the baseline may be contaminated with a different degree of historical lift on each airing, error may be introduced in measuring the effect of television. The uniform exclusion period method may be able to minimize baseline lift by selecting a large exclusion period, and also not having a changing amount of baseline lift.

Handling Simultaneous Airings

When two or more airings simultaneously occur within the same time period, two potential airings may have caused the spike. Thus, a question may be which airing should take credit. There are two methods of handling this case: (a) set the airing attribution to missing because attribution is unclear, or (b) attempt to apportion credit.

Although the above-described system is preferred to be as "model-free" as possible, a useful heuristic for partial attribution is to apply credit in proportion to each airing's television impressions as a percentage of total.

Thus, let $S=\{M_i\}$ be the set of airings which are regarded as airing simultaneously and f(S) be the estimated TV effect for the group of airings. If the full attribution method is used we set the estimate to undefined, as follows:

$$f(M_i)=UNDEF$$

Using the this simultaneous airings method, individual airing TV effects may be estimated as follows:

$$f(M_i) = \frac{I(M_i)}{\sum_{i} I(M_i)} f(S)$$

For example, a total web traffic estimated as due to television may be f=100. Also, assume there were three airings with 100, 700, and 200 impressions, respectively, each occurred at exactly the same time. Thus, the middle airing would receive 70% of the credit.

The simultaneous airings method may prove to be useful in practice, when larger time buckets are need to be used due to web tracking constraints. For example, when 15 minute buckets are used, many more times airings may "collide" with other airings in the same bucket.

However, this method may be problematic if the airings vary widely in targeting quality. For example, the first airing may reach the ideal target, whereas the second might be running in the middle of the early hours of the morning when none of the target are watching. As a result, the method may introduce some error to the attribution results. However, the benefit of this method is that it enables more airings to be attributed and minimizes the number of factors introduced.

Alternatives may be available. For example, targeted impressions may be used for credit assignment above, such as timp($M_i$) instead of I($M_i$). In this example, assignments may tend to be more accurate. However, in creating a targeting landscape (discussed in more detail below) and in order to target effectively, an estimated web attribution without knowledge of targeting may be used. Additionally, it is also possible to use cost to allocate credit, but accuracy may decrease.

Combined Algorithm

In one embodiment, a combine algorithm may be used. For example, the day-hour-minute subtraction and instantaneous treatment control algorithm may be combined. Further, other algorithms may be combined with one or both of the day-hour-minute subtraction and instantaneous treatment control algorithm.

Web Spike Algorithm Call

An example call to attribute a web spike is below:
exec Web.Attribution
110575,—sourcekey/advertiser
98,—jobid; batch of airings being attributed NULL,—measureid; if NULL then do all measures
0,—webspikecurvebymarket,—1==do by market, 0==aggregate to marketmaster=169
1,—webtimewindow, 1==1 minute
30,—lowermediaexclusiontimewindow minutes
30,—uppermediaexclusiontimewindow minutes
60,—webspikelowerwindow minutes
60,—webspikeupperwindow minutes
1,—fullattribution=1 means attribute all using the simultaneous airings algorithm. 0 means only attribute singletons
1001,—minimpressions; do not show results for airings with <1001 impressions
1,—1-minairings; do not show results for airings<1
'2015-01-01',—baseline period start for the month-day-hour algorithm
'2015-02-01',—baseline period end for the month-day-hour algorithm
30,
60,
1—offset in minutes;

The above may apply a small adjustment to a t0 time of the airing. Most airings may be listed with their respective start times. When working with 1 minute or lower time buckets, sampling a time of the airing may be too early to sample a peak web response. Most traffic may reach a website within 13 seconds after the end of the TV airing. This may mean that the 43rd second is the peak activity. Thus, instead of sampling the 0 second, sample the 1 minute. For lower time buckets, this adjustment may be needed to the airing start time to ensure that the peak may be sampled.

Diagnostic: Spike Percentage

One diagnostic measure that may help calculate an effect size of a web spike is to measure a percentage change in web activity compared to a baseline at a range of times before and after an ad airing. Once all media airings that meet the various parameters described above have been found, the diagnostic measure may be calculated as follows:

(Time-Before-Webspike,MeasureID,Delta Web Response,Average-Measure-Value, PercentChange)

Where Time-before-webspike may be a time in seconds prior to TV airings, MeasureID may be a web measure (e.g. visitors, homepage new visitors), Delta Web Response may be an average change in web traffic, and AverageMeasureValue may be an average for the measure.

Table 2, as shown below, provides a variety of traffic classes and the impact of television on that traffic. Delta over base may be equal to the highest reading divided by the mean reading. PercentChange (shown below) or Percent increase over base may be the measure's value divided by base activity, where base activity is equal to the preceding reading in the y minutes prior to the airing, and where no other airing occurs within those y minutes. In Table 2, additional traffic during a 5 minute airing is web traffic in native units that was generated during the TV airing. Percentage increase over a base is the during-airing reading divided by base activity. Base activity is equal to the reading in the 30 minutes prior to the airing, and where no other airing occurs within those 30 minutes. tImp Correlation is the correlation coefficient between the metric and TV airing's targeted impressions, which may produce a more accurate measure since the other metrics do not account for targeting. Increase per million impressions ("wpmm") is the change in the web traffic multiplied by one million divided by number of television impressions. Mean and Var are the mean and variance of the web traffic in native units. A p-value is shown based on a t-test for the instantaneous spike percentage change, during the time of airing, compared to the percentage changes of differences around baseline activity. % of events shows the web traffic as a percentage of all web traffic. Some web traffic categories may have high spike response from infrequent events.

$$PercentChange = 100 \cdot \frac{\sum W(T, G) - W_{NoTV}(T, G)}{\sum W_{NoTV}(T, G)}$$

MeanAdditionalTraffic=PercentChange*MeanUnits

A p-value is shown based on comparison of the activity during the spike compared to a normal distribution of differences around baseline activity.

In order to measure web spikes quantitatively, several measurements for web spike magnitude are provided in Table 2 below. Web metrics that are more filtered may be able to better identify the impact of the television airing.

TABLE 2

| Metric | Mean Units | Var Units | % of events | tImp Corr. | Delta per base unit per mill (Inc per mill. Imps wpmm) | Percent Change (% 5 min. inc. over base w 30 min. excl.) | Mean addtl. traffic during 5 min of TV airing |
|---|---|---|---|---|---|---|---|
| New home mobile | 5.1 | 34 | 2% | 0.069 | 9.64 | 75.6% | 3.9 |
| New home direct | 34.6 | 446 | 11% | 0.057 | 2.45 | 34.4% | 11.9 |
| Mobile | 23.4 | 188 | 7% | 0.055 | 2.95 | 34.1% | 8.0 |
| New home | 58.7 | 1,035 | 18% | 0.055 | 2.14 | 30.7% | 18.0 |
| Home Page | 58.7 | 1,035 | 18% | 0.055 | 2.14 | 30.7% | 18.0 |
| Direct To Site | 53.2 | 617 | 17% | 0.052 | 1.65 | 25.3% | 13.5 |
| No Referrer | 53.2 | 617 | 17% | 0.052 | 1.65 | 25.3% | 13.5 |
| Tablet | 14.9 | 101 | 5% | 0.035 | 1.64 | 24.0% | 3.6 |
| New Visitors | 164.3 | 5,889 | 52% | 0.035 | 0.89 | 14.8% | 24.3 |
| Unique Visitors | 262.2 | 15,565 | 83% | 0.033 | 0.62 | 10.9% | 28.6 |
| Visits | 291.6 | 19,930 | 92% | 0.028 | 0.59 | 10.2% | 29.7 |
| SEM | 54.6 | 866 | 17% | 0.023 | 0.67 | 9.1% | 5.0 |
| Desktop | 126.0 | 3,663 | 40% | 0.027 | 0.46 | 7.8% | 9.8 |
| SEO | 36.8 | 458 | 12% | 0.016 | 0.46 | 7.3% | 2.7 |
| Existing Visitors | 97.9 | 2,569 | 31% | 0.028 | 0.16 | 2.8%* | 2.7 |
| Category Page | 60.6 | 980 | 19% | 0.009 | 0.25 | 2.3%* | 1.7 |
| Email | 4.8 | 61 | 1% | 0.017 | 0.36 | 1.7% (ns) | 0.1 |
| Product Page | 33.1 | 310 | 10% | 0.024 | 0.07 | 0.7% (ns) | 0.2 |
| Affiliates | 7.3 | 20 | 2% | 0.028 | 0.19 | 0.0% (ns) | 0 |
| Display | 0.7 | 1 | 0% | 0.008 | 0.23 | na | 0 |

Figure 4:
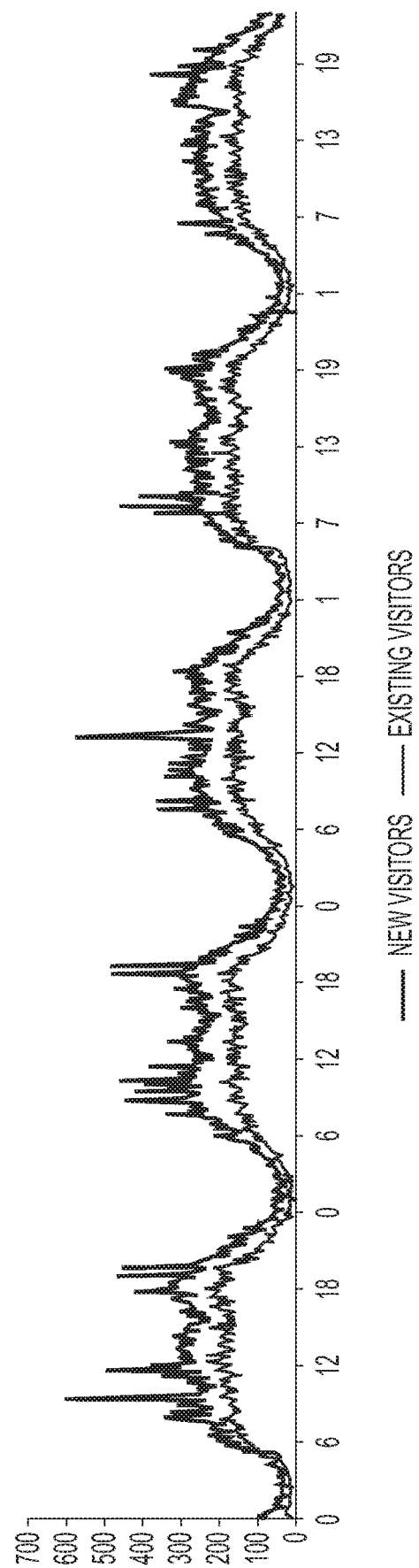
FIG. 4 provides a graphical view of new visitors versus existing visitors, according to exemplary embodiments of the present disclosure.

*Significant $p < 0.05$; (ns) Not significant; All other metrics are significant at $p < 0.01$ FIG. 4 provides a graphical view of new visitors (upper line) versus existing visitors (lower line). The existing visitor time series is almost un-moved when there are TV airings with only a 2.8% spike which is not statistically significant (Table 2). In contrast, new cookie visitors shows distinct spikes that match TV airings that are 14.8% in magnitude and are significant. As shown in FIG. 3, web spikes may tend not to show up in Existing Visitor traffic (lower line).

Referring back to Table 2, the highest signal-to-noise ratio for any traffic category is "New Cookie Visitor traffic with Mobile User-agents that reach the Homepage." The web spike here is a dramatic 76% higher than the baseline activity (p<0.01; see Table 2 and FIG. 3). This lift occurs on 2% of the site's traffic.

Most categories of traffic show TV spikes that are statistically significant. However, three categories appear to have minimal change from TV. Only 13% of the traffic: "Email," "Product Page," and "Affiliate traffic" are largely not impacted by television (spike magnitude<=1.7%; not statistically significant). Product pages may have minimal change since these are "deep-linked pages," which would likely be reached after a search for a specific product, where-as the TV airing tends to produce branded searches and first time visitor activity to the home page. Email may have minimal change given that email campaigns occur on an episodic basis and may be likely to be uncorrelated with television advertising. Thus, the least responsive traffic to TV may be deep-linked page browsers and email responders.

Significant amounts of paid and organic search traffic may be mis-attributed. A considerable amount of paid search and organic search traffic at the time of a TV airing may be actually due to the television broadcast (see Table 2; FIG. 3). A 9.1% spike was measured on Paid Search (SEM) (p<0.01) and 7.3% on Organic Search (SEO) (p<0.01), with both increases statistically significant. These effects may be important because these are large sources of traffic, and so these lifts may translate into a large increase in traffic that can be measured as due to television.

The ability to measure effects on these digital marketing channels may be important because most conversion tracking systems on paid search may mis-attribute this traffic. A problem with current last-click attribution systems is that the search query or paid link receives 100% credit for the conversion, and often results in brand name keywords (e.g., for a company called "Physicians Mutual Insurance" a brand name keyword would be "Physicians Mutual") with thousands of conversions and cost per acquisitions of pennies. It may appear that these keywords are the most effective advertising vehicles for producing conversions, when in fact the users typing in these brand name keywords may already know of the company and are trying to navigate to a website of the company. The web spike analysis reported here may confirm that a lot of search click-throughs that are being credited to keywords, are in fact occurring due to untracked television broadcasts.

Diagnostic: Targeting Landscape and Slope Calculation

An automated targeting landscape may be generated based on the attributed web response to the set of airings. This analysis may rely on a score being assigned to each ad airing, which is referred to as a targeting score and/or tratio($M_i$). The targeting score and/or tratio may measure how well targeted an ad is.

The ad airings with their targeting scores, the resulting, attributed web responses, and the impressions associated with each ad airing may be collected. Then, the targeting scores may be segmented, such as by percentiles. For each targeting score bucket, the sum of web delta response may be calculated and divided by the sum of impressions. This information provides such parameters as tratio_ntile, measure, delta-web-response, impressions, and delta-web-response-per-impression or WPI.

In a first step, the airings with their targeting scores are collected, and all of the resulting, attributed web responses, and the impressions associated with each airing are collected. The data collected may include (Mi, measureID, tratio($M_i$), delta-web-response, impressions)

Next percentile/decile or n-tile may be calculated for the targeting scores in order to ensure the targeting scores are grouped together into n bins. For each targeting score bin, the sum of web delta response is calculated and divide by the sum of impressions, which produces the following data: (tratio_ntile, measure, sum_of_delta-web-response, impressions, sum_of_delta-web-response-per-impression).

Finally, the relationship between targeting score tratio_n-tile and delta-web-response-per-impression or WPI is estimated. This may be calculated as follows which is a weighted least squares fit mapping tratio to expected wpi, weighted by impressions.

Let x=tratio, y=WPM (web response per million impressions), and w=impressions/sum(impressions). The slope and intercept may be calculated as follows:

$$\bar{x} = \sum_i w_i x_i; \bar{y} = \sum_i w_i x_i;$$

$$\beta_1 = \frac{\sum_i w_i (x_i - \bar{x})(y - \bar{y})}{\sum_i w_i (x_i - \bar{x})^2}$$

$$\beta_0 = \bar{y} - \beta_1 \bar{x}$$

$\beta_1$ may be the slope of the linear relationship between tratio and web spike response per million. $\beta_0$ may be the intercept for the same.

Root mean squared error may then calculated for the above landscape in order to provide a measure for the quality of the resulting landscape. This may be calculated as:

$$RMSE = \sqrt{\Sigma w_i (\beta_1 x + \beta_0 - WPI)^2}$$

Figure 5:
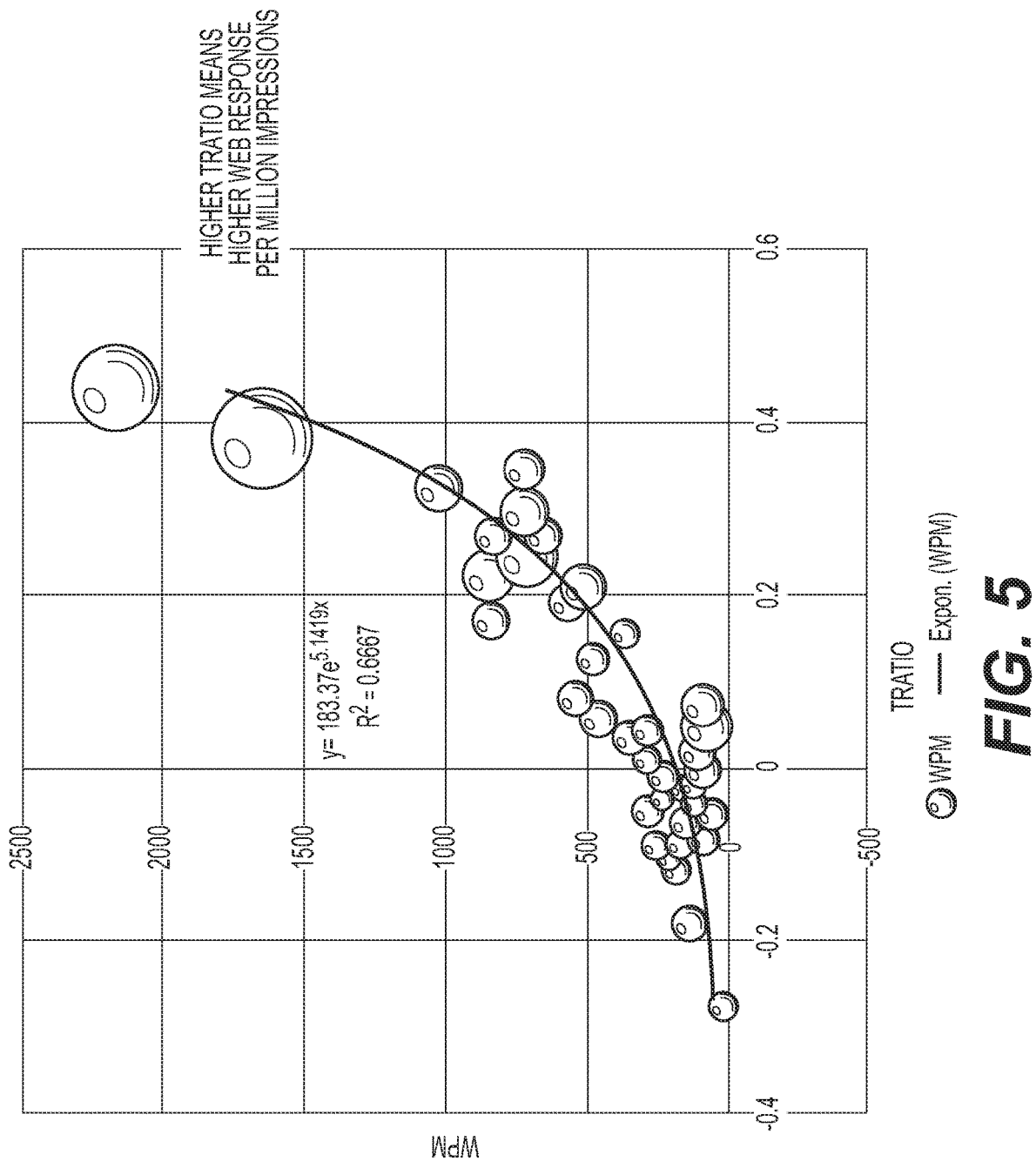
FIG. 5 depicts an example of a tratio-web spike landscape, according to exemplary embodiments of the present disclosure.

FIG. 5 depicts an example of a tratio-web spike landscape. As shown in FIG. 5, tratio is plotted on the x-axis against a web response per million impressions (WPM) on the y-axis. Tratio, as depicted, may be a measure of how targeted teach impression is. A circle size may represent the number of impressions that were tested at a given tratio level. Using the analysis of FIG. 5, an advertiser may take any airing, along with a targeting score, and may estimate the web response per million that an airing may generate if the advertiser buys it. A user may establish a desired cost per web visitor (cost per delta goal), and then, with knowledge of the impressions and tratio of the airing, may estimate a cost needed to negotiate for the airing that may achieve the goal. For example, cost=cost per delta goal*WPM(tratio (airing))/1,000,000.

Reports

A variety of reports may be generated showing the web spike results. Such reports may include a web alignment report, a web spike curve report, a web spike attribution report, a web media performance report, a web spike halo report, and/or a web spike cluster responsiveness report.

Web Spike Alignment Report

A web alignment report may show web activity and media airings that allow a user to visualize what media is running and its impact. Further, a web alignment report may show the impressions or targeted impressions associated with an ad airing. For example, as impressions increase, a web response may be expected to increase. The web alignment report may include the one or more of the following parameters datetimestamp, geography, measureid, delta web response, impressions, timpressions, airings, tratio, delta web response per impression, programname_largestairing, and/or network_largestairing.

Figure 6:
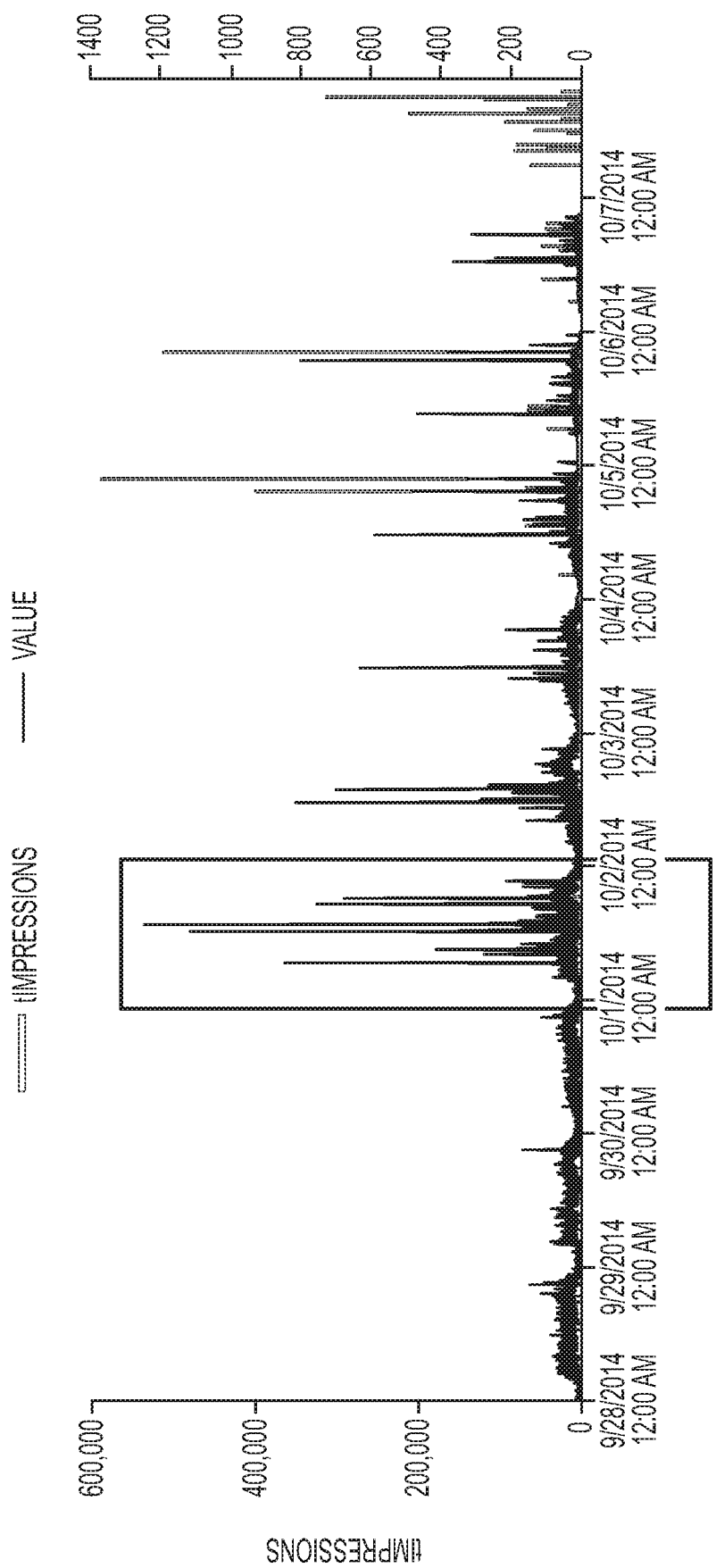
FIG. 6 depicts a web spike alignment report having a predetermined zoom, according to exemplary embodiments of the present disclosure.

FIG. 6 depicts a web spike alignment report having a predetermined zoom. As shown in FIG. 6, a web spike alignment report having a zoom of 1 may show an advertiser's web traffic and television airings. The larger spikes in web activity may be caused by television commercials. The boxed area is a region of interest that may be further zoomed in on.

Figure 7:
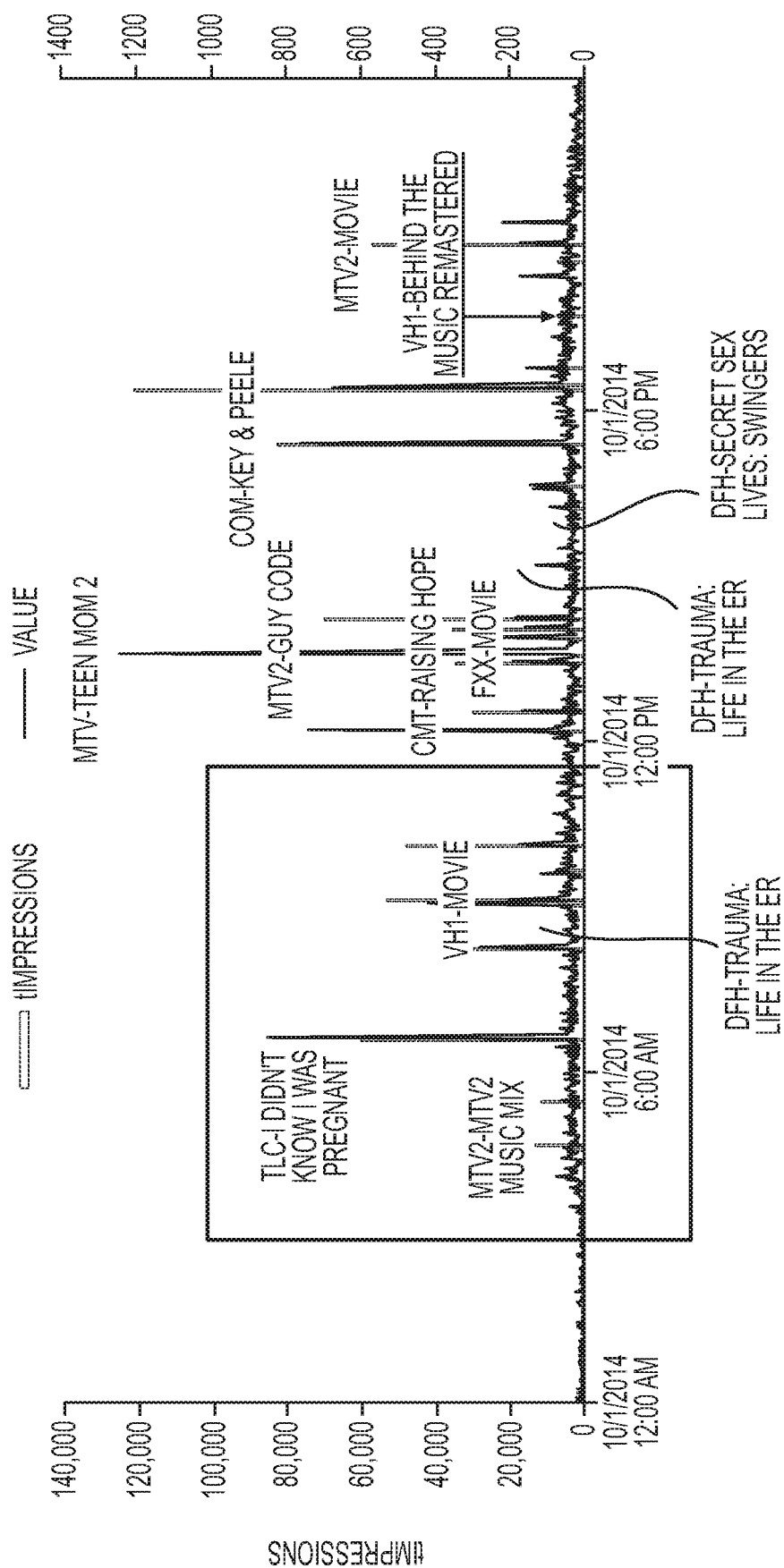
FIG. 7 depicts a web spike alignment report having a predetermined zoom, according to exemplary embodiments of the present disclosure.

FIG. 7 depicts a web spike alignment report having a predetermined zoom. As shown in FIG. 7, a web spike alignment report having a zoom of 2 may reveal that TV airings may match spikes in web activity. Television programs associated with the TV airings may be superimposed on the graph for each of interpretation. The boxed area is a region of interest that may be further zoomed in on.

Figure 8:
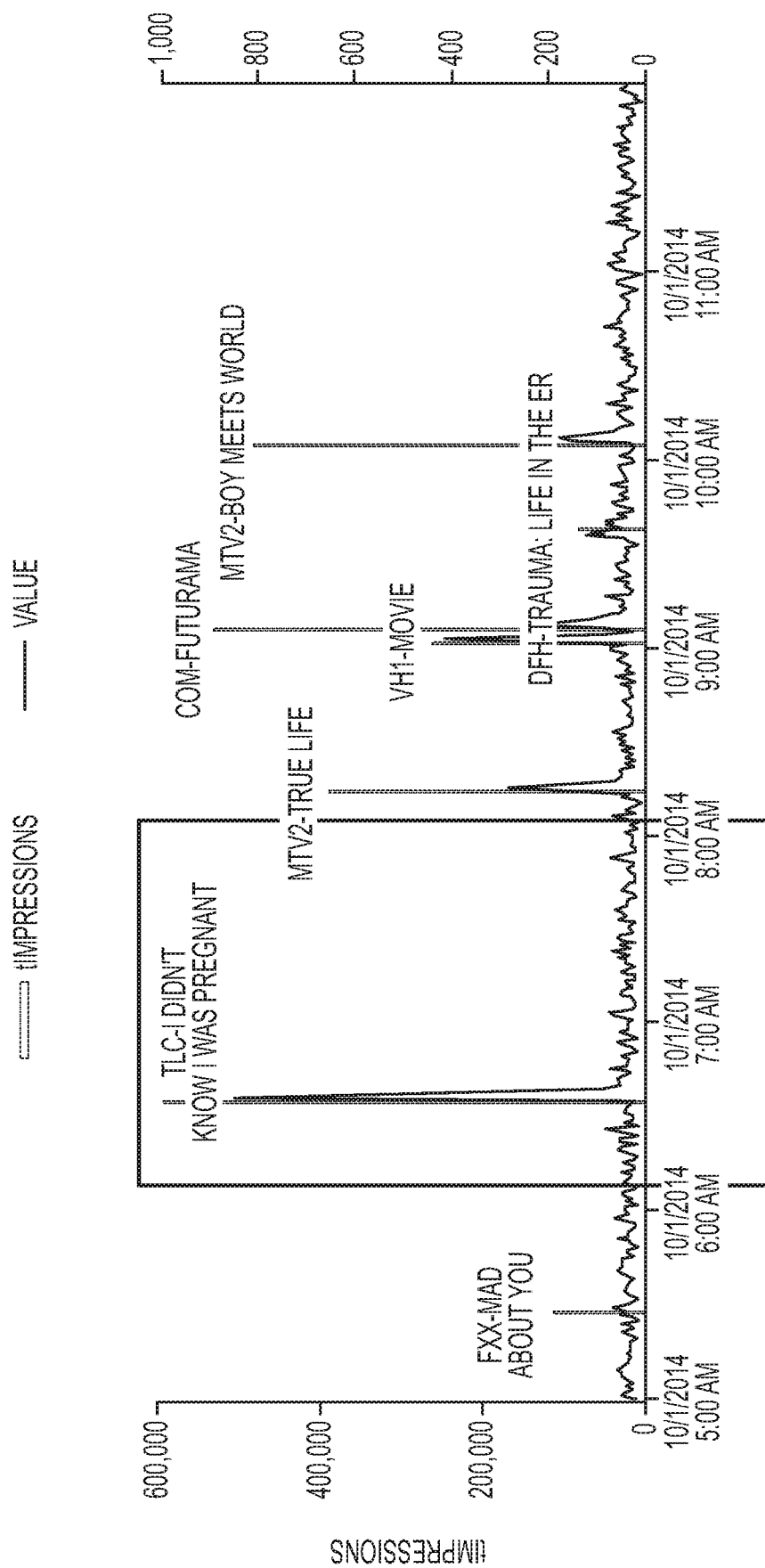
FIG. 8 depicts a web spike alignment report having a predetermined zoom, according to exemplary embodiments of the present disclosure.

FIG. 8 depicts a web spike alignment report having a predetermined zoom. As shown in FIG. 8, a web spike alignment report having a zoom of 3 may show sharp increases and exponential declines associated with web spikes. The boxed area is a region of interest that may be further zoomed in on, which is, for example, TLC's show "I didn't know I was pregnant."

Figure 9:
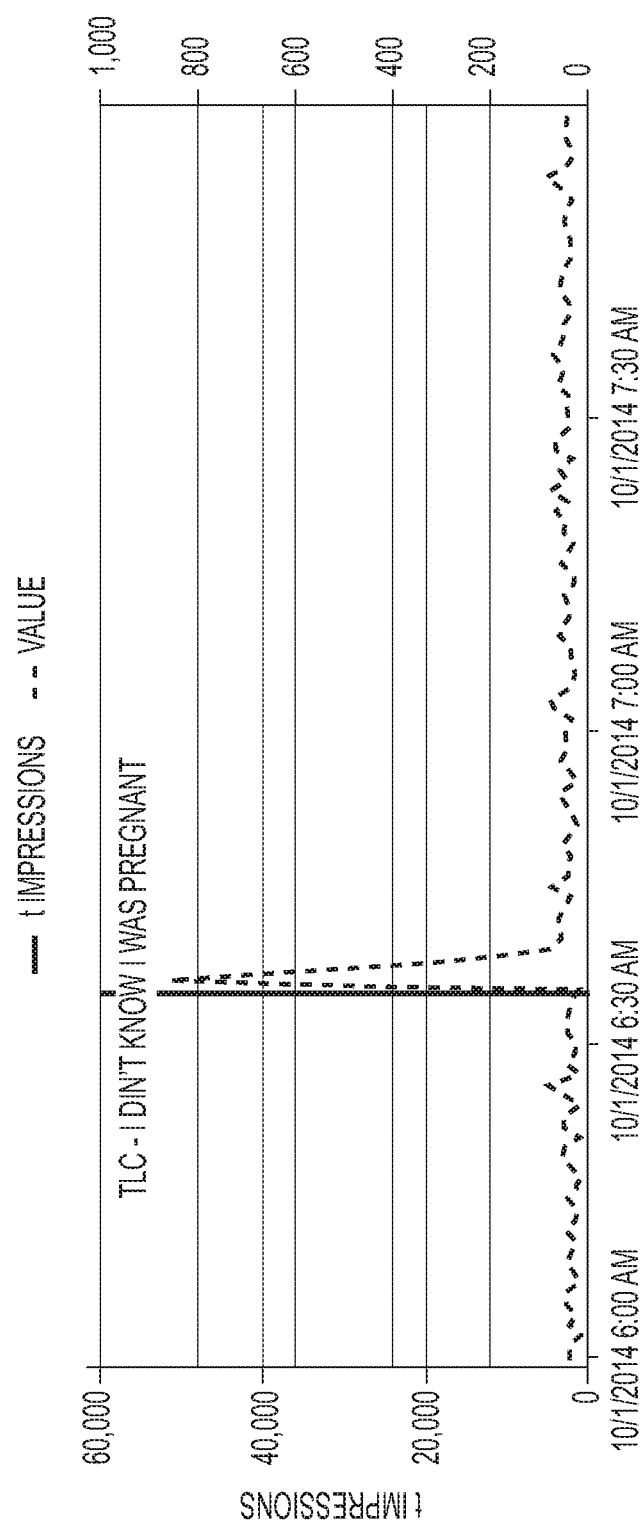
FIG. 9 depicts a web spike alignment report having a predetermined zoom, according to exemplary embodiments of the present disclosure.

FIG. 9 depicts a web spike alignment report having a predetermined zoom. As shown in FIG. 9, a web spike alignment report having a zoom of 4 may show a close-up view of a television show, such as TLC's show "I didn't know I was pregnant." The report may show the sharp increases associated with the time of the airing, and then show a decline.

Figure 10:
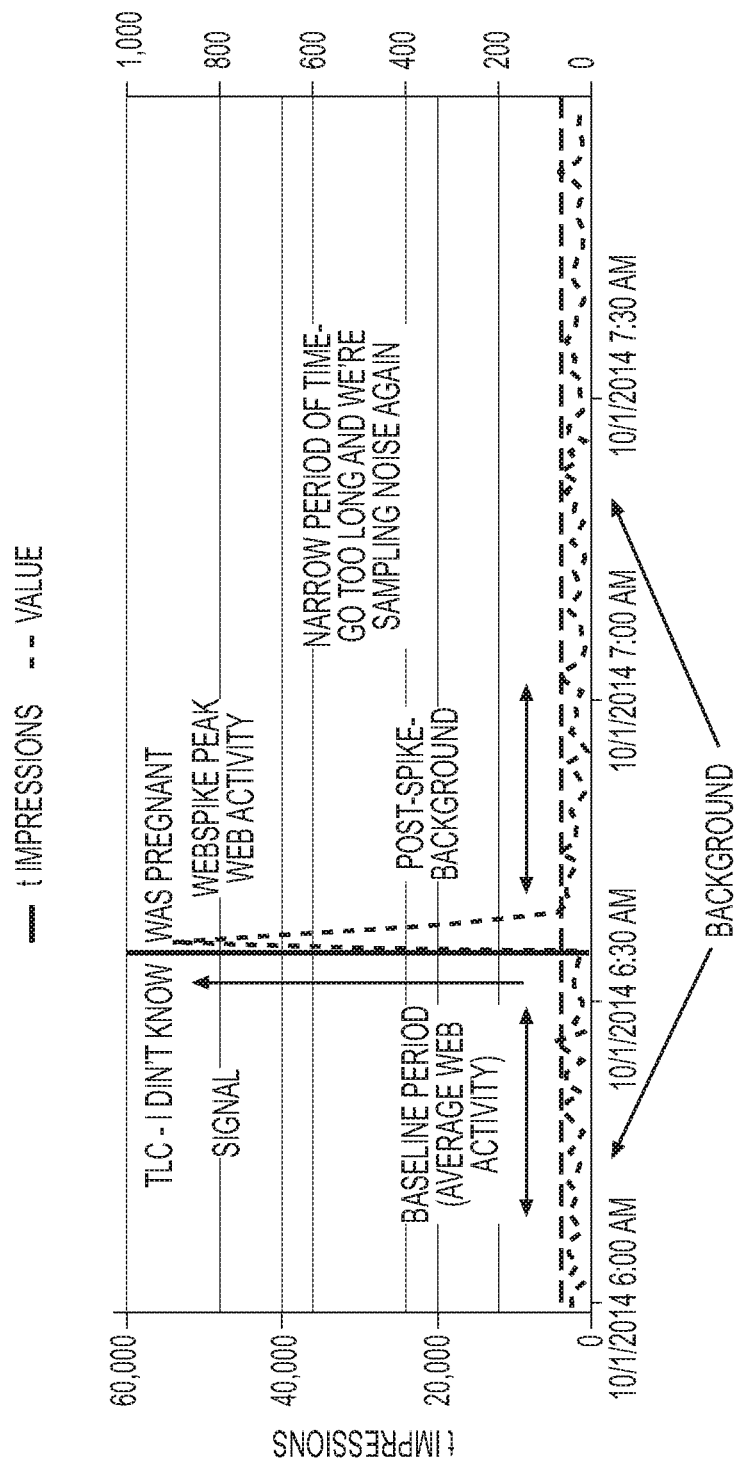
FIG. 10 depicts a web spike alignment report having a predetermined zoom and corresponding analysis, according to exemplary embodiments of the present disclosure.

FIG. 10 depicts a web spike alignment report having a predetermined zoom and corresponding analysis. As shown in FIG. 10, a web spike alignment report having a zoom of 4 may have a baseline period of average web activity leading up to a web spike peak of web activity. Then, after the web spike peak there is a decline and a post web spike background period.

Figure 11:
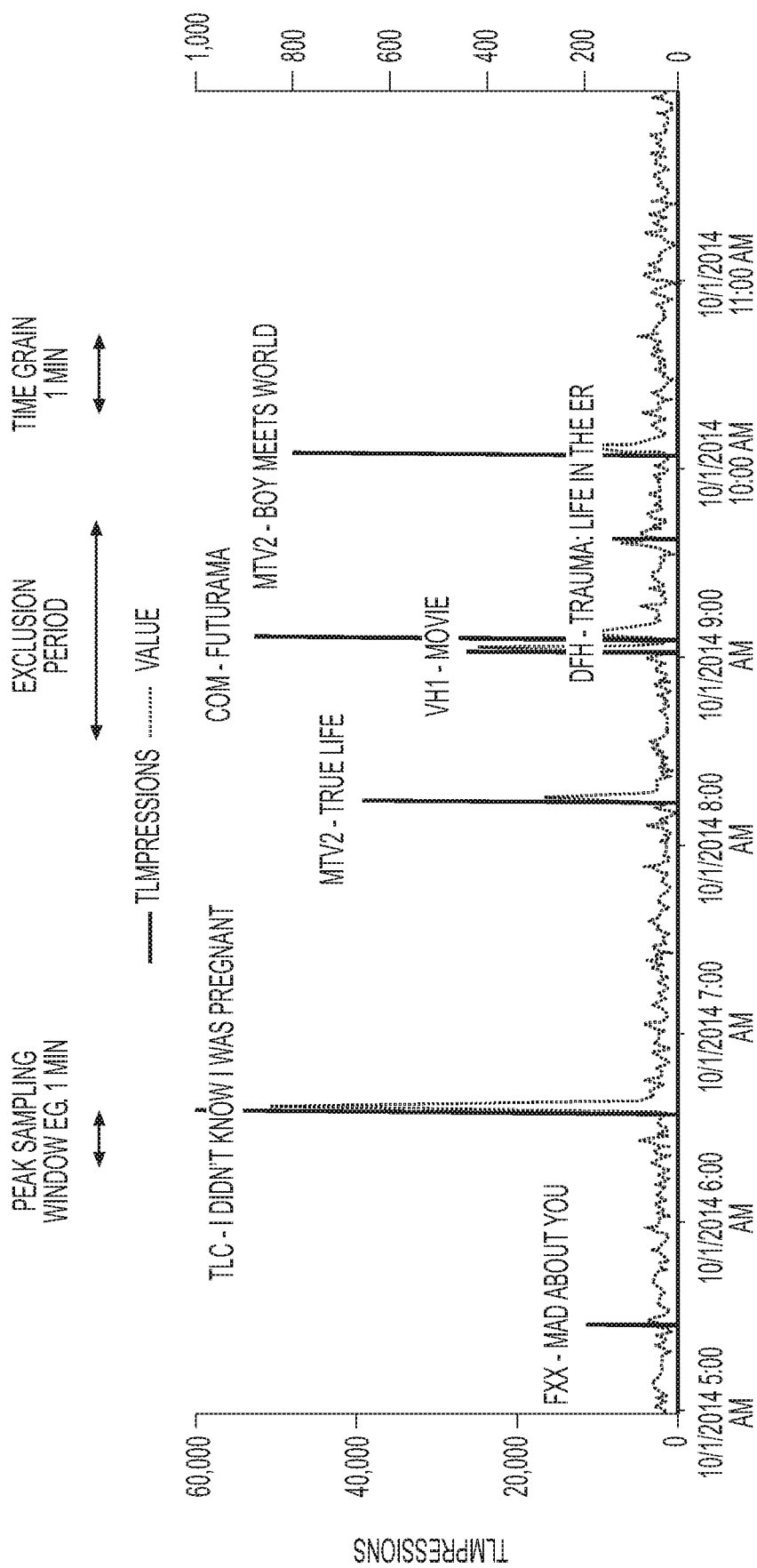
FIG. 11 depicts a web spike alignment report having a predetermined zoom and corresponding analysis, according to exemplary embodiments of the present disclosure.

FIG. 11 depicts a web spike alignment report having a predetermined zoom and corresponding analysis. As shown in FIG. 11, a web spike alignment report may have exclusion periods that provide a way of filtering out airings that may have an ambiguous and/or misleading signal. If there are airings that are too close together in time, it may not be possible to obtain a "clan" measure of the pre-airing web activity baseline. As a result, an exclusion period may be used, such as 30 minutes prior to an airing. Thus, if the exclusion period is implemented, attributing questionable web spikes may be avoided.

Web Spike Curve Diagnostic Report

A web spike curve diagnostic report may be an analysis report that shows the percentage change in web activity when an ad airing is detected. The web spike curve diagnostic report may not take into account the size of the ad airing in terms of number of impressions, and may be an imprecise measure. However, the web spike curve report does show on average the percentage change in web activity when there is an ad running. The web spike curve report may provide a rough, but easy to understand measure of how effective the ads are at driving traffic. The web spike curve report may include one or more of the following parameters time-to-spike, geography, measureid, delta web response, impressions, timpressions, airings, tratio, and/or delta web response per impression.

Table 3, as shown below, depicts an example of a web spike curve report. The web spike curve report shows that the minutes away from an ad airing versus activity in percentage higher than baseline.

TABLE 3

| Minutes after airing | New visitors | Existing visitors | New home mobile | New home | SEM | SEO | Affiliate | Direct To Site | No Referrer | Home Page | Category Page | Product Page |
|---|---|---|---|---|---|---|---|---|---|---|---|---|
| −60 | −5% | −6% | 7% | −2% | −4% | −10% | 1% | 1% | 1% | −2% | −6% | −4% |
| −55 | −4% | −5% | 7% | 0% | −4% | −5% | 1% | −1% | −1% | 0% | −5% | −7% |
| −50 | −2% | −4% | 0% | −1% | −2% | −5% | 1% | 0% | 0% | −1% | −3% | −1% |
| −45 | −1% | −4% | 0% | 0% | 0% | −5% | 1% | 2% | 2% | 0% | −2% | −1% |
| −40 | 0% | −1% | 0% | 0% | 0% | −2% | 1% | −1% | −1% | 0% | −2% | −1% |
| −35 | 0% | −1% | 0% | 1% | 0% | −2% | 1% | 0% | 0% | 1% | −2% | −1% |
| −30 | −1% | 0% | 0% | 0% | 0% | 1% | 1% | 0% | 0% | 0% | 0% | −1% |
| −25 | 1% | 1% | 0% | −1% | 1% | 1% | 1% | −4% | −4% | −1% | 0% | 2% |
| −20 | 0% | 0% | 0% | −1% | 0% | 1% | 1% | −1% | −1% | −1% | 2% | −1% |
| −15 | 0% | 2% | −9% | −1% | 1% | 1% | 1% | −1% | −1% | −1% | 0% | −1% |
| −10 | 2% | 2% | 0% | 0% | 1% | 1% | 1% | 0% | 0% | 0% | 3% | 6% |
| −5 | 3% | 3% | 0% | 1% | 2% | 3% | 1% | 2% | 2% | 1% | 3% | 2% |
| 0 | 24% | 17% | 91% | 43% | 23% | 25% | 43% | 38% | 38% | 43% | 19% | 25% |
| 5 | 4% | 4% | 0% | 5% | 3% | 3% | 1% | 3% | 3% | 5% | 5% | 2% |
| 10 | 2% | 4% | 0% | 3% | 3% | 3% | 1% | 2% | 2% | 3% | 3% | 2% |
| 15 | 3% | 3% | 0% | 1% | 3% | 3% | −14% | 2% | 2% | 1% | 3% | 2% |
| 20 | 2% | 3% | 0% | 0% | 3% | 3% | 1% | −1% | −1% | 0% | 2% | 2% |
| 25 | 2% | 1% | 0% | 1% | 1% | 3% | 1% | 0% | 0% | 1% | 2% | 2% |
| 30 | 2% | 0% | 0% | 1% | 2% | 3% | 1% | 2% | 2% | 1% | 2% | 2% |
| 35 | 0% | 0% | 0% | −2% | −1% | 1% | 1% | −1% | −1% | −2% | 2% | −1% |
| 40 | −1% | −1% | 0% | −2% | −1% | 1% | 1% | 0% | 0% | −2% | 0% | −1% |
| 45 | −1% | 0% | 0% | 1% | −1% | 1% | 1% | 2% | 2% | 1% | 0% | −4% |
| 50 | −1% | −1% | 0% | −2% | −3% | 1% | 1% | −1% | −1% | −2% | 0% | −1% |
| 55 | −2% | −3% | 0% | −2% | −1% | −2% | 1% | −1% | −1% | −2% | −2% | 2% |
| 60 | −3% | −3% | 0% | −3% | −3% | −2% | 1% | −1% | −1% | −3% | −3% | −4% |

Figure 12:
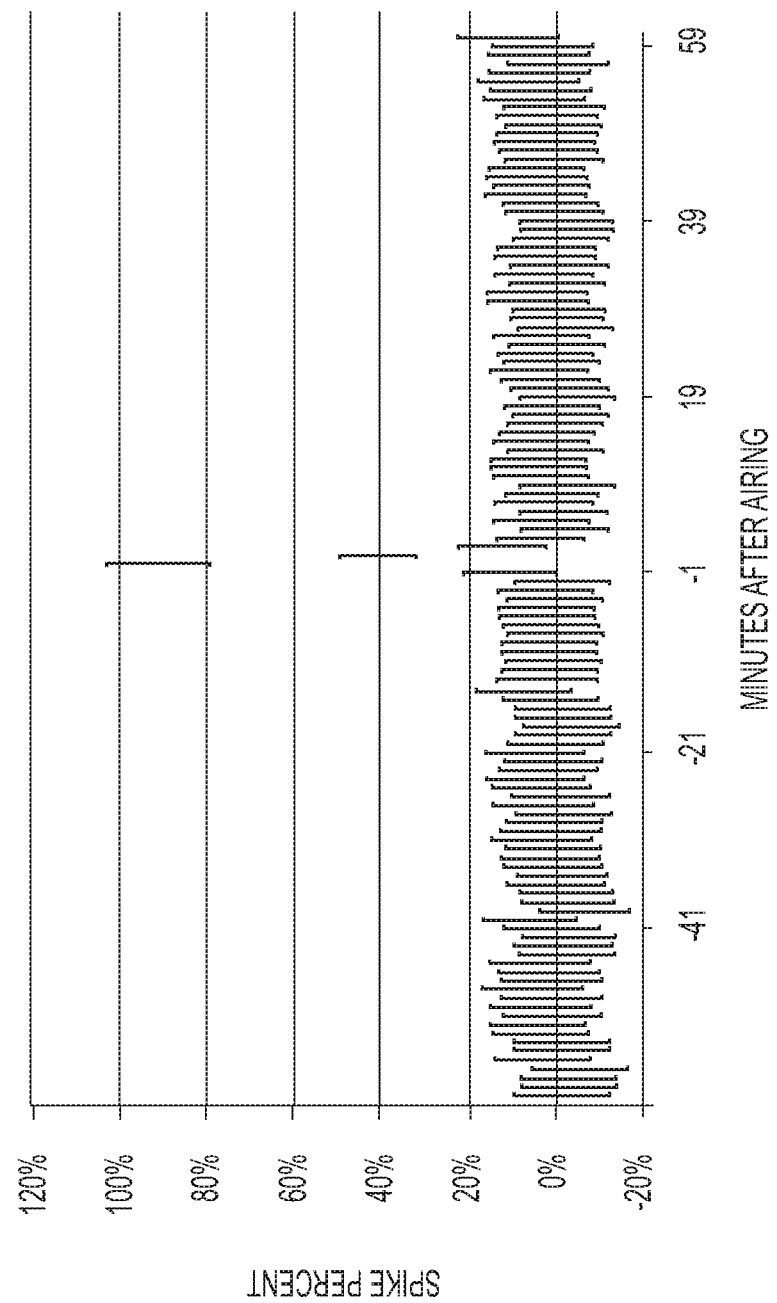
FIG. 12 depicts a web spike curve diagnostic report in graphical form, according to exemplary embodiments of the present disclosure.

FIG. 12 depicts a web spike curve diagnostic report in graphical form. As shown in FIG. 12, a percentage of web traffic changes when a television ad airs is shown. The x-axis may show the minutes before, during, and after the television ad. The y-axis may show a percentage, which is an average over all time periods (−60 minutes to +60 minutes) around a television airings. The bars on the graph represent a standard deviation.

Figure 13:
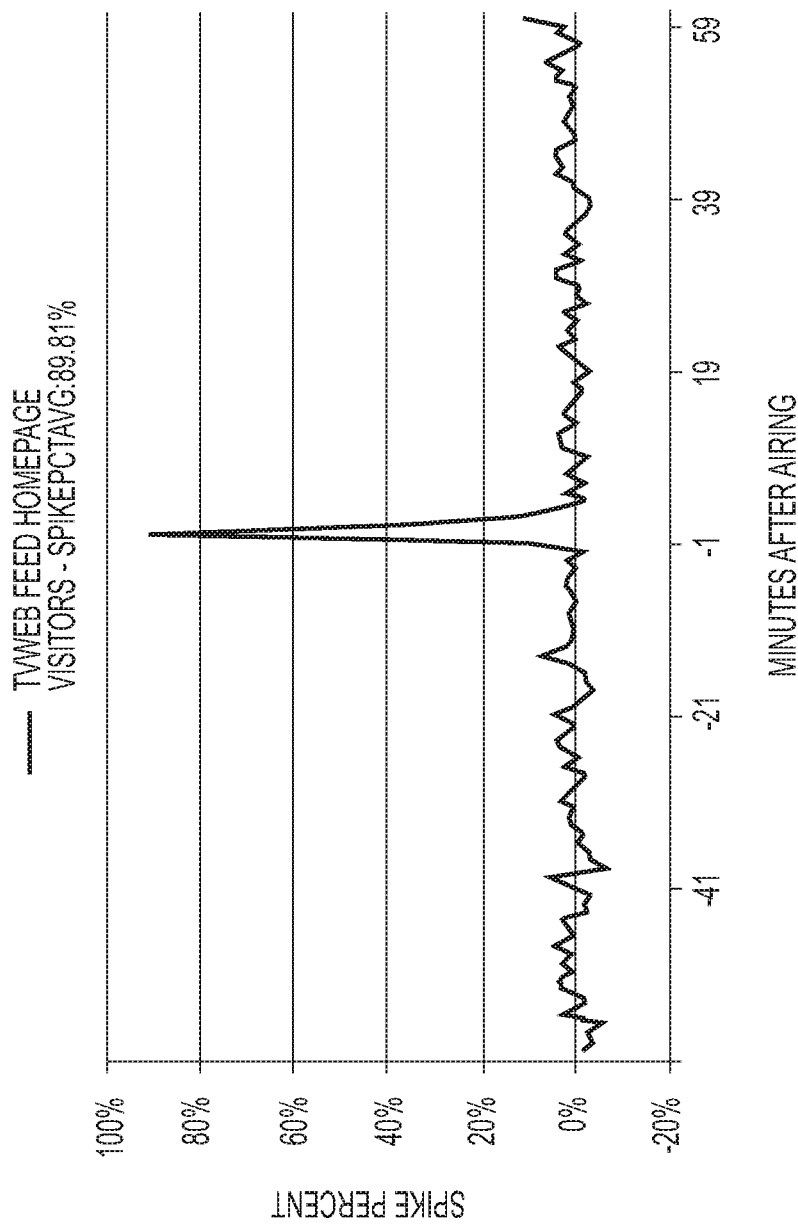
FIG. 13 depicts a web spike curve diagnostic report in graphical form, according to exemplary embodiments of the present disclosure.

FIG. 13 depicts a web spike curve diagnostic report in graphical form. As shown in FIG. 13, a percentage of web traffic changes when a television ad airs is shown. The x-axis may show the minutes before, during, and after the television ad. The y-axis may show a percentage, which is an average over all time periods (−60 minutes to +60 minutes) around a television airings.

Web Spike Airing Attribution Report

A web spike airing attribution report may provide information on the delta web response for every ad airing, which may be a main output from attribution. After the web spike airing attribution report is generated, other reports may be derived from this report. A web spike attribution report may include one or more of the following parameters panelairingid, datetimestamp, geography, measureid, delta web response, impressions, timpressions, tratio, delta web response per impression, programname, and/or network.

Table 4, as shown below, provides a web spike airing attribution report with the parameter specific airings with delta web response predictions added. The parameter WebAttributionID joins to the WebAttributionSettings, which specifies the parameters for a particular web attribution. MarketMasterid of 169 may refer to a national geography. Sourcekey of 110497 may refer to the advertiser's campaign. LastJobID may refer to a JobID for a set of airings that were tracked for the advertiser. Slope and intercept may be calculated parameters for a tratio-WPM landscape that estimates the WPM for different tratio. SpikePCTAvg may be an average change in web activity when a TV airing runs

TABLE 4

| Broadcast Airing | 1 | 2 | 3 | 4 | 5 | 6 | 7 |
|---|---|---|---|---|---|---|---|
| sourceairingid | 263786 | 263787 | 270014 | 262065 | 262075 | 270023 | 262385 |
| WebAttributionID | 1174 | 1174 | 1174 | 1174 | 1174 | 1174 | 1174 |
| MarketMasterID | 169 | 169 | 169 | 169 | 169 | 169 | 169 |
| PanelAiringID | 148065 | 148066 | 149421 | 148053 | 148054 | 149430 | 148055 |
| AirDate | Jun. 10, 2013 1:15 AM | Jun. 10, 2013 1:45 AM | Jun. 10, 2013 3:00 AM | Jun. 10, 2013 4:45 AM | Jun. 10, 2013 5:15 AM | Jun. 10, 2013 5:45 AM | Jun. 10, 2013 10:30 AM |
| AirDatePST | Jun. 9, 2013 10:15 PM | Jun. 9, 2013 10:45 PM | Jun. 10, 2013 12:00 AM | Jun. 10, 2013 1:45 AM | Jun. 10, 2013 2:15 AM | Jun. 10, 2013 2:45 AM | Jun. 10, 2013 7:30 AM |
| AirDateEST | Jun. 10, 2013 1:15 AM | Jun. 10, 2013 1:45 AM | Jun. 10, 2013 3:00 AM | Jun. 10, 2013 4:45 AM | Jun. 10, 2013 5:15 AM | Jun. 10, 2013 5:45 AM | Jun. 10, 2013 10:30 AM |
| Value | 22 | 21 | 13 | 11 | 4 | 7 | 30 |
| ValueStdev | 0 | 0 | 0 | 0 | 0 | 0 | 0 |
| Delta | 4.75 | 8 | 5.5 | 4.5 | −1.75 | −1.5 | −10.5 |
| DeltaStdev | 3.304037934 | 2.708012802 | 2.081665999 | 3.31662479 | 2.753785274 | 3.785938897 | 16.94107435 |
| DeltaPositive | 4.75 | 8 | 5.5 | 6 | 1 | 4 | 4 |
| DeltaPositiveStdev | 3.304037934 | 2.708012802 | 2.081665999 | 1.732050808 | NULL | NULL | 4.242640687 |
| WPI | −2.88281E−05 | −4.85525E−05 | −0.000180174 | −0.006 | 0.002333333 | 8.87942E−05 | 0.000312082 |
| Impressions | 164770 | 164770 | 30526 | 1000 | 1000 | 16893 | 33645 |
| TotalAirings | 1 | 1 | 1 | 1 | 1 | 1 | 1 |
| DeltaStarting | NULL | NULL | NULL | NULL | NULL | NULL | NULL |
| DeltaPositiveStarting | NULL | NULL | NULL | NULL | NULL | NULL | NULL |
| DeltaPositivePct | NULL | NULL | NULL | NULL | NULL | NULL | NULL |
| DeltaPct | NULL | NULL | NULL | NULL | NULL | NULL | NULL |
| DeltaPctStdev | 0.150183542 | 0.128952991 | 0.160128154 | 0.301511345 | 0.688446318 | 0.540848414 | 0.564702478 |
| DeltaPositivePct | 0.150183542 | 0.128952991 | 0.160128154 | 0.157459164 | NULL | NULL | 0.141421356 |
| Stdev | | | | | | | |
| TRatio | 0.07308273 | 0.07308273 | 0.31722299 | 0.40527069 | 0.40527069 | 0.31174507 | 0.38243402 |
| MatchFailure | 1 | 1 | NULL | 3 | 3 | NULL | NULL |
| PriorAiringMinutes | 300 | 30 | 75 | 105 | 30 | 30 | 285 |
| NextAiringMinutes | 30 | 75 | 105 | 30 | 30 | 285 | 30 |
| WebAttributionID | 1174 | 1174 | 1174 | 1174 | 1174 | 1174 | 1174 |
| WebAttributionAiringID | 11 | 11 | 11 | 11 | 11 | 11 | 11 |
| CreateDate | May 13, 2014 3:17 PM | May 13, 2014 3:17 PM | May 13, 2014 3:17 PM | May 13, 2014 3:17 PM | May 13, 2014 3:17 PM | May 13, 2014 3:17 PM | May 13, 2014 3:17 PM |
| LastRunDate | May 13, 2014 3:17 PM | May 13, 2014 3:17 PM | May 13, 2014 3:17 PM | May 13, 2014 3:17 PM | May 13, 2014 3:17 PM | May 13, 2014 3:17 PM | May 13, 2014 3:17 PM |
| UseForScoring | 1 | 1 | 1 | 1 | 1 | 1 | 1 |
| SourceKey | 110497 | 110497 | 110497 | 110497 | 110497 | 110497 | 110497 |
| LastJobID | 13 | 13 | 13 | 13 | 13 | 13 | 13 |
| MeasureID | 1 | 1 | 1 | 1 | 1 | 1 | 1 |
| AggregateByMarket | 0 | 0 | 0 | 0 | 0 | 0 | 0 |
| DataTimeWindow | 15 | 15 | 15 | 15 | 15 | 15 | 15 |
| LowerMediaExclusionTimeWindow | 60 | 60 | 60 | 60 | 60 | 60 | 60 |
| UpperMediaExclusionTimeWindow | 60 | 60 | 60 | 60 | 60 | 60 | 60 |
| WebSpikeCurveLowerWindow | 60 | 60 | 60 | 60 | 60 | 60 | 60 |
| WebSpikeCurveUpperWindow | 60 | 60 | 60 | 60 | 60 | 60 | 60 |
| FullAttribution | 1 | 1 | 1 | 1 | 1 | 1 | 1 |
| MinimumImpressions | 0 | 0 | 0 | 0 | 0 | 0 | 0 |
| MinimumAirings | 1 | 1 | 1 | 1 | 1 | 1 | 1 |

TABLE 4-continued

| Broadcast Airing | 1 | 2 | 3 | 4 | 5 | 6 | 7 |
|---|---|---|---|---|---|---|---|
| SpikePctAvg | 3.91 | 3.91 | 3.91 | 3.91 | 3.91 | 3.91 | 3.91 |
| Slope | 14.320 62195 | 14.320 62195 | 14.3206 2195 | 14.320 62195 | 14.320 62195 | 14.320 62195 | 14.3206 2195 |
| Intercept | 1.4720 22791 | 1.4720 22791 | 1.47202 2791 | 1.4720 22791 | 1.4720 22791 | 1.4720 22791 | 1.47202 2791 |
| SlopePositive | 8.6007 51794 | 8.6007 51794 | 8.60075 1794 | 8.6007 51794 | 8.6007 51794 | 8.6007 51794 | 8.60075 1794 |
| InterceptPositive | 20.307 65463 | 20.307 65463 | 20.3076 5463 | 20.307 65463 | 20.307 65463 | 20.307 65463 | 20.3076 5463 |
| AttributedPct | 100 | 100 | 100 | 100 | 100 | 100 | 100 |

Table 4 depicts an example of a web spike attribution report with airings running as columns and attributes including the attributed web spike delta running down the page.

Figure 14:
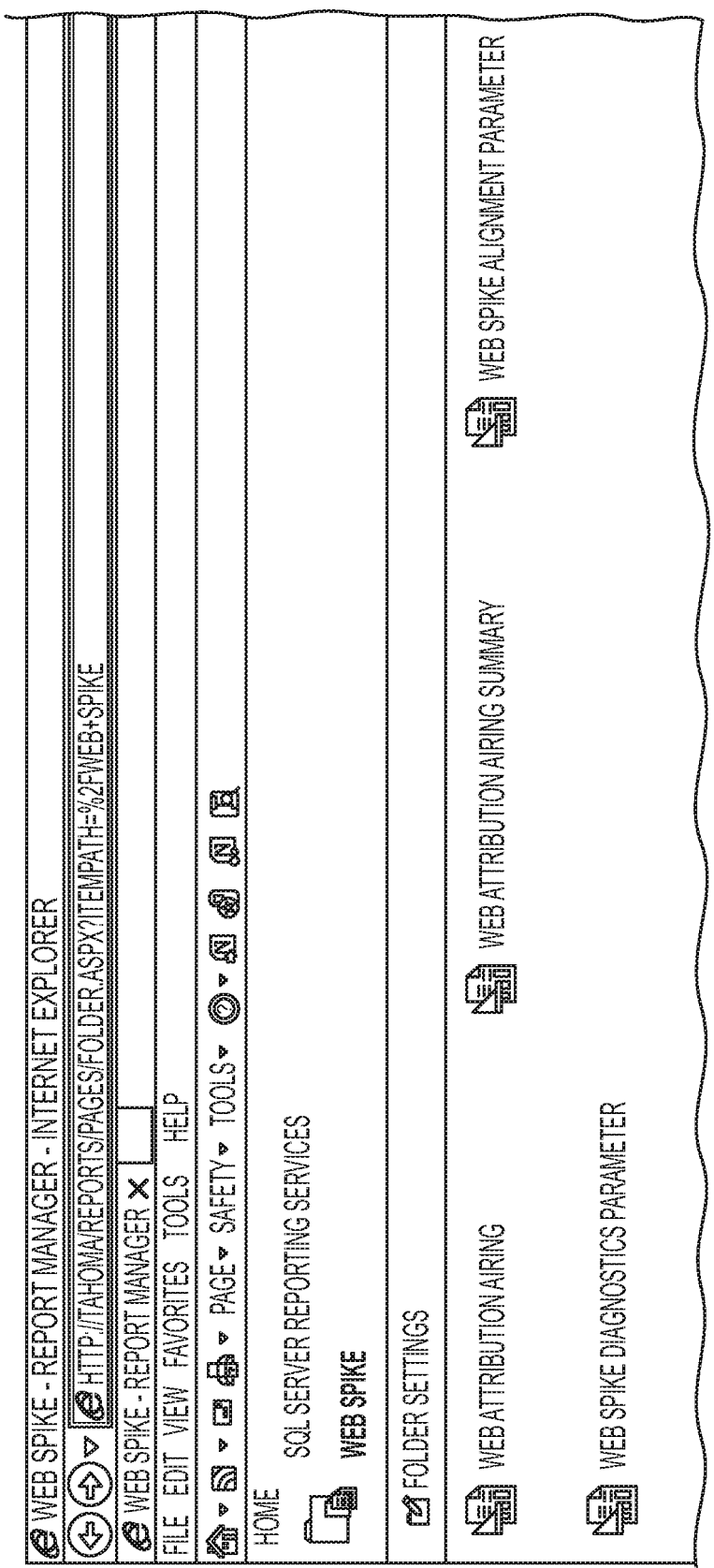
FIG. 14 depicts a graphical representation of a step involved in selecting a web spike attribution report in a graphical user interface, according to exemplary embodiments of the present disclosure.

FIG. 14 depicts a graphical representation of a step involved in selecting a web spike attribution report in a graphical user interface. As shown in FIG. 14, a user may select a "web attribution airing" report.

Figure 15:
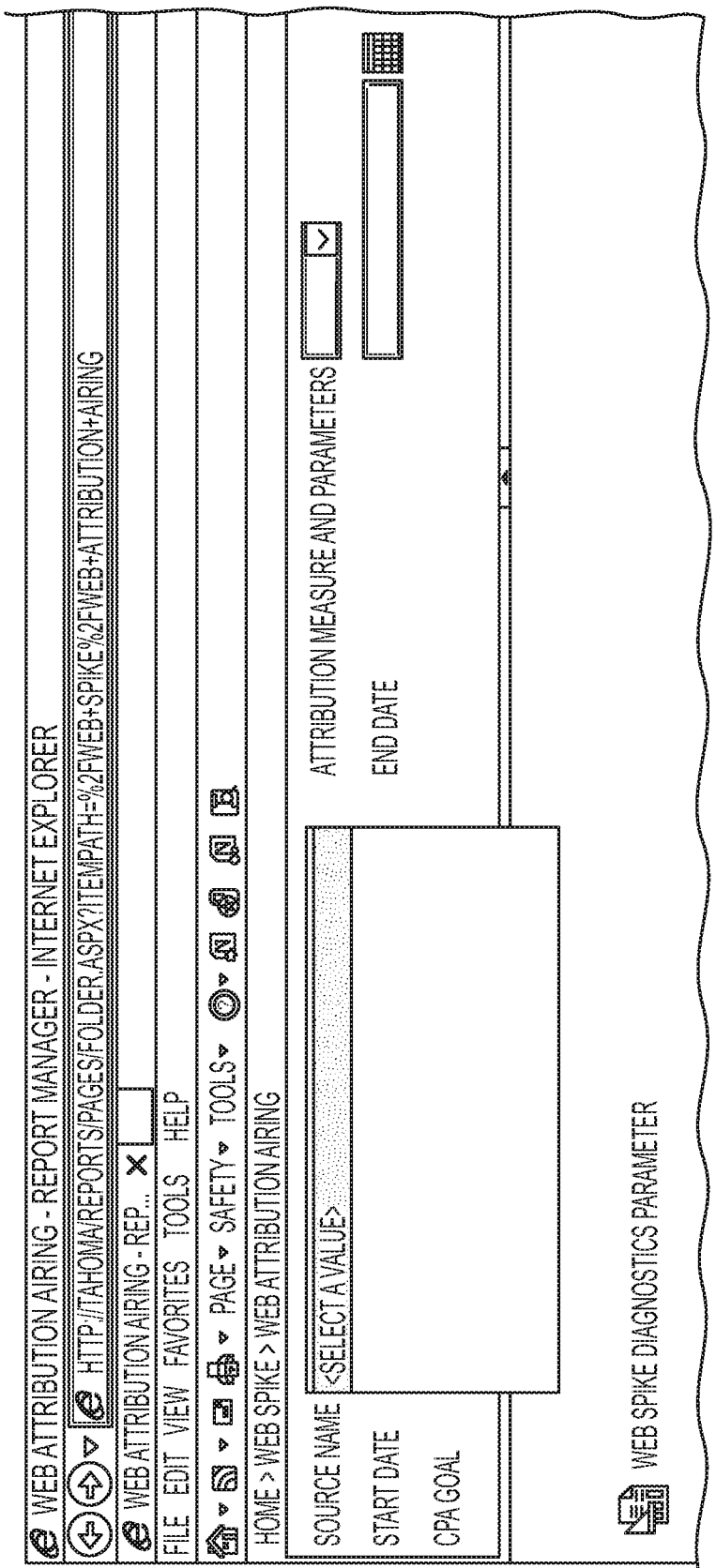
FIG. 15 depicts a graphical representation of a step involved in selecting a web spike attribution report in a graphical user interface, according to exemplary embodiments of the present disclosure.

FIG. 15 depicts a graphical representation of a step involved in selecting a web spike attribution report in a graphical user interface. As shown in FIG. 15, a user may select an advertiser for a web attribution airing report.

Figure 16:
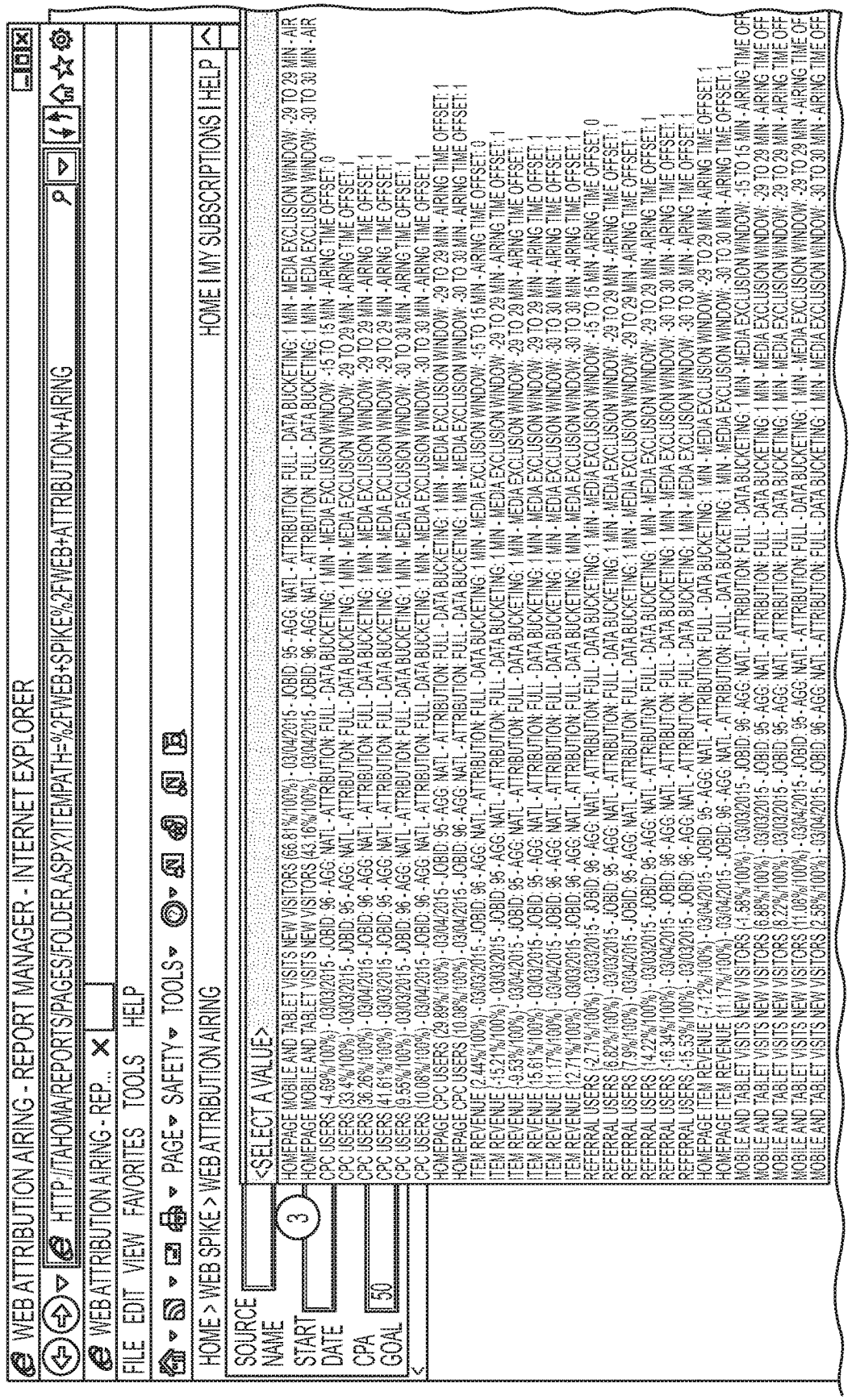
FIG. 16 depicts a graphical representation of a step involved in selecting a web spike attribution report in a graphical user interface, according to exemplary embodiments of the present disclosure.

FIG. 16 depicts a graphical representation of a step involved in selecting a web spike attribution report in a graphical user interface. As shown in FIG. 16, a user may select an attribute measure/parameters for the web attribution airing report.

Figure 17:
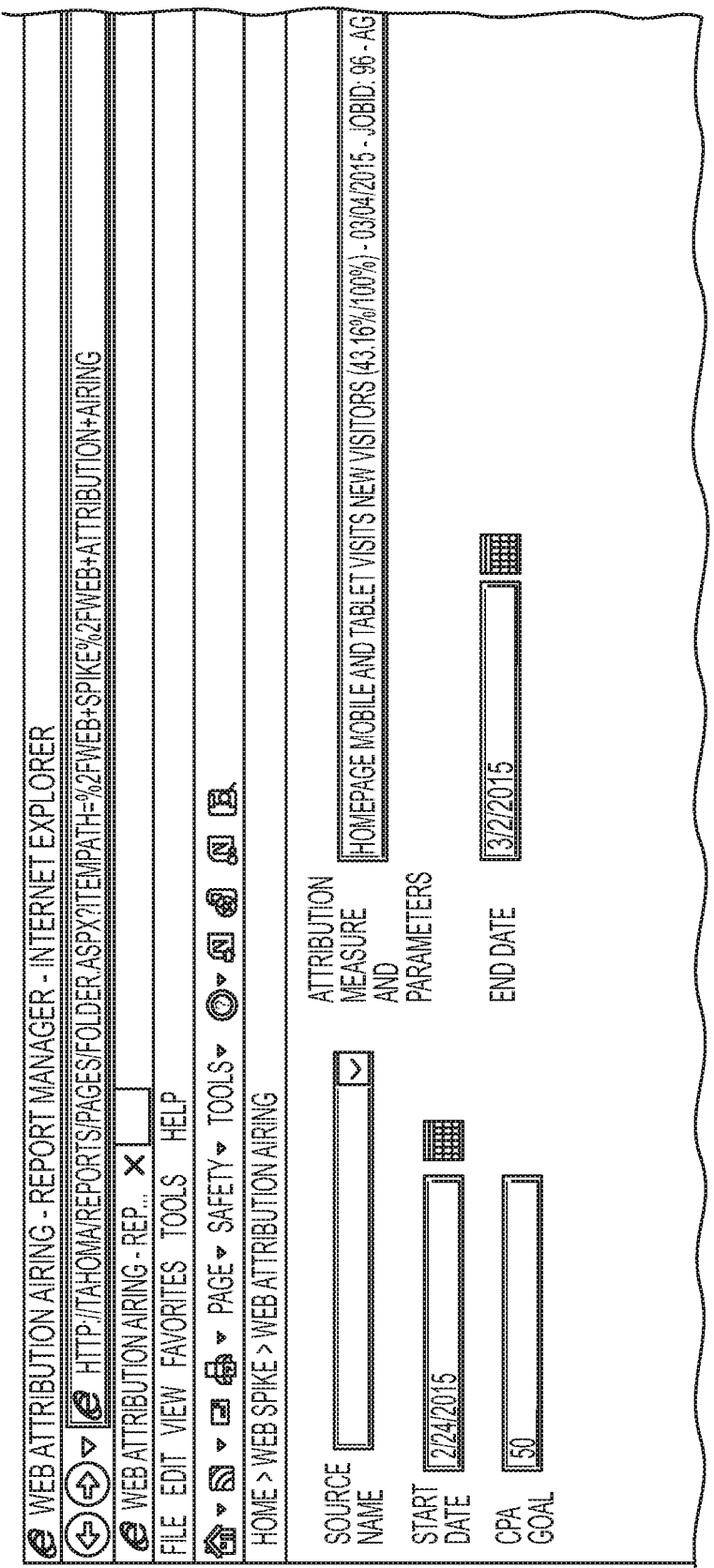
FIG. 17 depicts a graphical representation of a step involved in selecting a web spike attribution report in a graphical user interface, according to exemplary embodiments of the present disclosure.

FIG. 17 depicts a graphical representation of a step involved in selecting a web spike attribution report in a graphical user interface. As shown in FIG. 17, a user may select a start date and an end date for the web attribution airing report.

Figure 18:
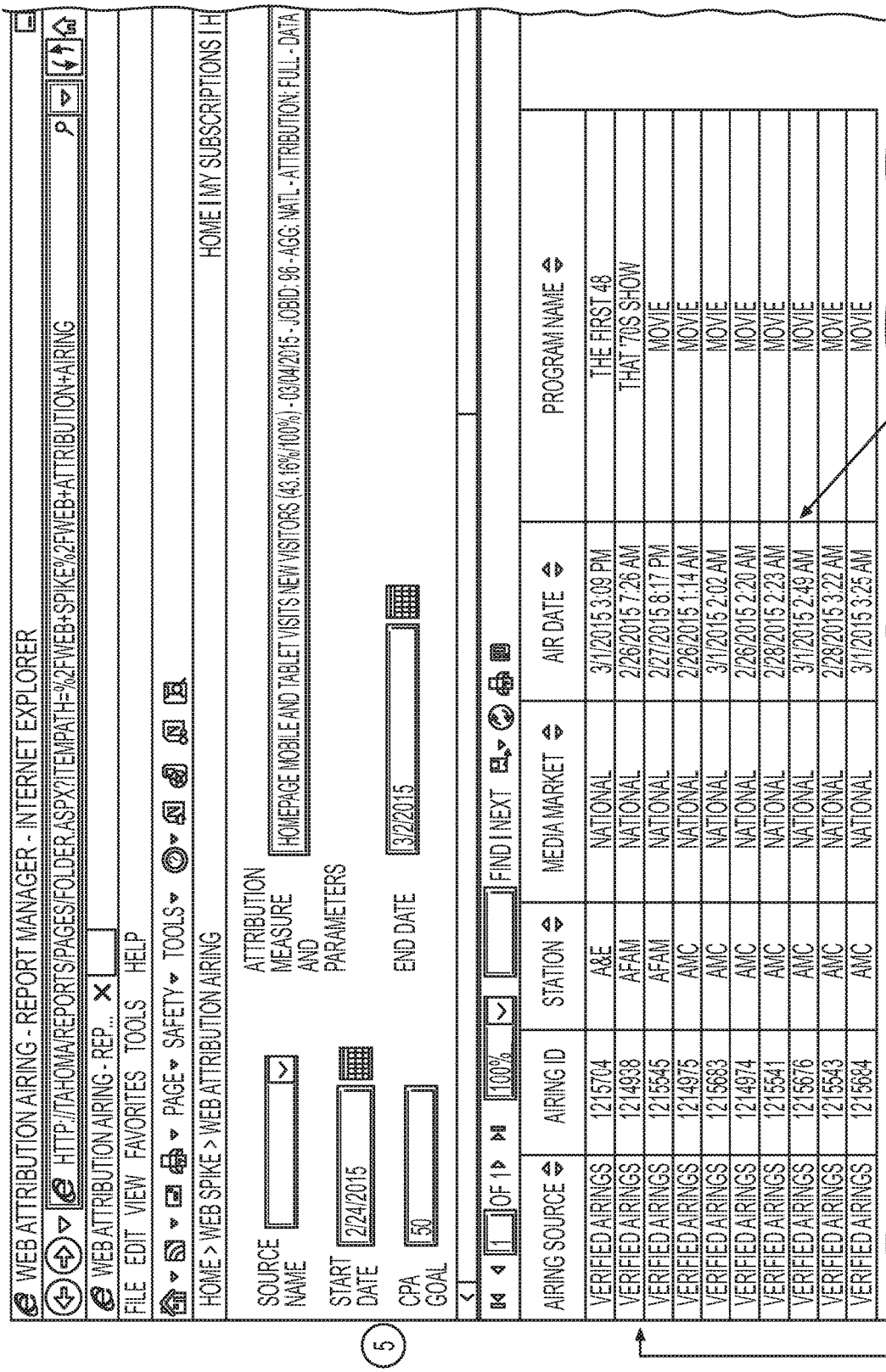
FIG. 18 depicts a graphical representation of a step involved in selecting a web spike attribution report in a graphical user interface, according to exemplary embodiments of the present disclosure.

FIG. 18 depicts a graphical representation of a step involved in selecting a web spike attribution report in a graphical user interface. As shown in FIG. 18, a user may generate the web attribution airing report. The source of the airing may be listed, along with an airing ID, a station name, a media market, an air date, and a program name.

Figure 19:
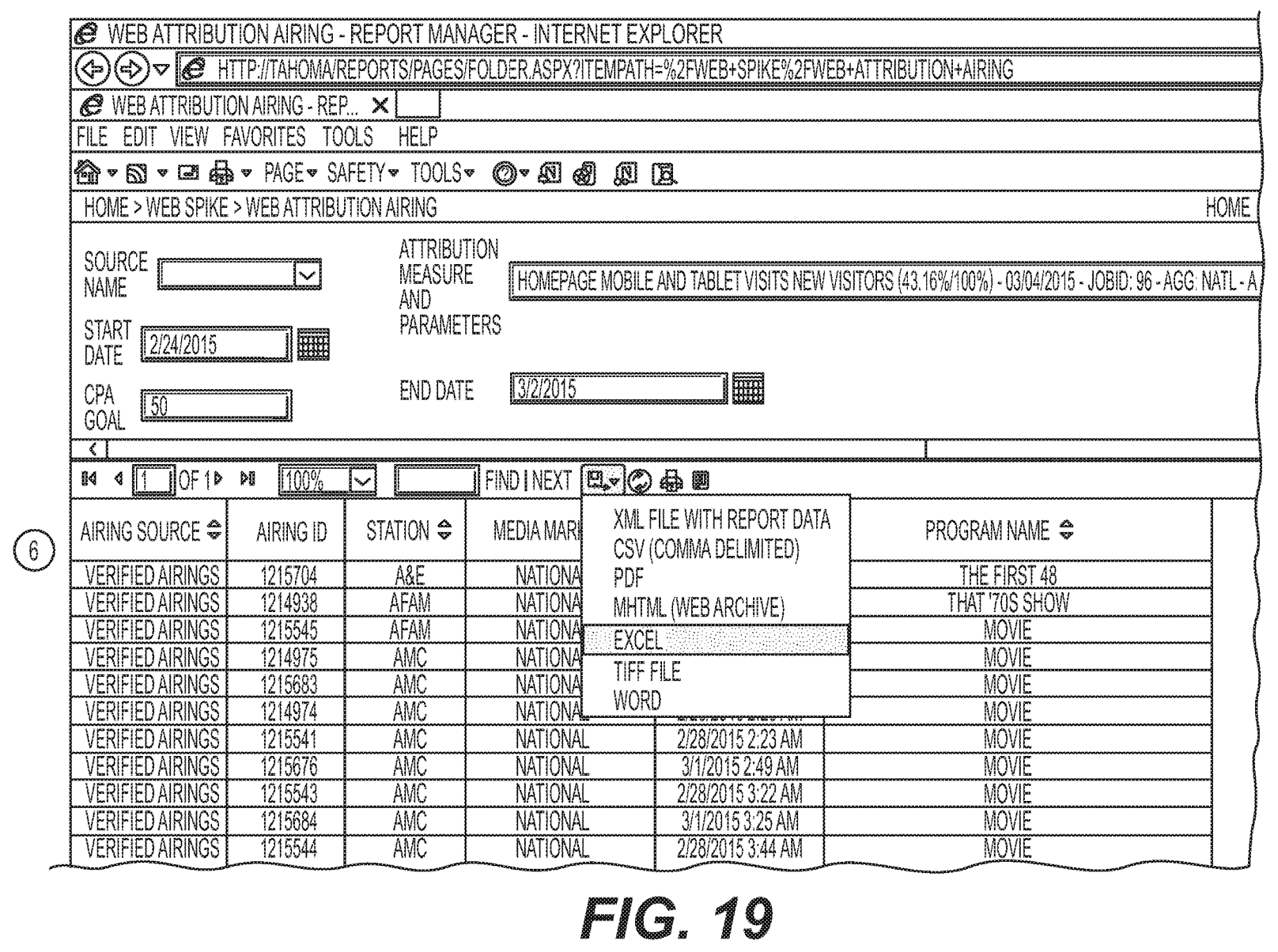

FIG. 19 depicts a graphical representation of a step involved in selecting a web spike attribution report in a graphical user interface. As shown in FIG. 19, a user may elect to export the generated the web attribution airing report to various file types. The source of the airing may be listed, along with an airing ID, a station name, a media market, an air date, and a program name.

An example command-line report may be as follows:
Monitorplus
exec Report.WebAttributionAiringOutput @WebAttributionID=N'2013', @StartDate='2014-09-30 00:00:00', @EndDate='2015-04-27 00:00:00', @CPAGoal=50

Web Spike Media Performance Report

Table 5 shown below depicts a web spike media performance report. The web spike media performance report, as provided in the table below, shows the web delta response per million impressions for television advertisements for a video game product that appeals to young males. The report may be aggregated to Station-Programs for reporting to indicate that G4-XPLAY and COM-FUTURAMA produced high web responses per impression in response to the TV ad. A web media performance report may include one or more of the following parameters measureid, delta web response, impressions, timpressions, tratio, airings, delta web response per impression, programname, and/or dimension to report. Dimension to report may be a number of categorical variables pertaining to the media including: (a) Creative (b) ProgramName, (c) DayPart, (d) Network, (e) Station-Program, (f) HourOfDay, and so on.

TABLE 5

| Row Labels | delta per imp | tratio | Airing count | delta | Impressions | $p < 0.05$ |
|---|---|---|---|---|---|---|
| ESPNU-WCC TOURNAMENT | 838.2016764 | 0.440471627 | 1 | 33 | 39370 | 4% |
| G4-X-PLAY | 292.2793384 | 0.328134431 | 2 | 13 | 131119 | 24% |
| ESQR-MILLION DOLLAR LISTING NY | 320.0682812 | 0.120060944 | 1 | 18 | 56238 | 16% |
| FS1-UFC TONIGHT | 314.7681825 | 0.519125566 | 1 | 51 | 162024 | 0% |
| ESQR-ESQ MOVIE | 314.4230337 | 0.163118645 | 1 | 21 | 66789 | 12% |
| ENN-MIKE & MIKE IN THE MORN | 106.9366281 | 0.422087641 | 2 | 4 | 115066 | 41% |
| COM-FUTURAMA | 202.3090665 | 0.521922461 | 1 | 59 | 291633 | 0% |
| ESPNU-NIT TOURNAMENT | 194.4768573 | 0.122710335 | 1 | 3 | 15426 | 43% |
| ESP2-NBA REGULAR SEASON REPEAT | 192.0629967 | 0.534514717 | 1 | 16 | 83306 | 19% |
| FS1-FOX SPORTS LIVE | 61.4362091 | 0.445594155 | 11 | 2.454545455 | 610867 | 45% |
| NFLN-NFL AM | 168.7915364 | 0.445831511 | 2 | 9 | 115679 | 31% |

Figure 20:
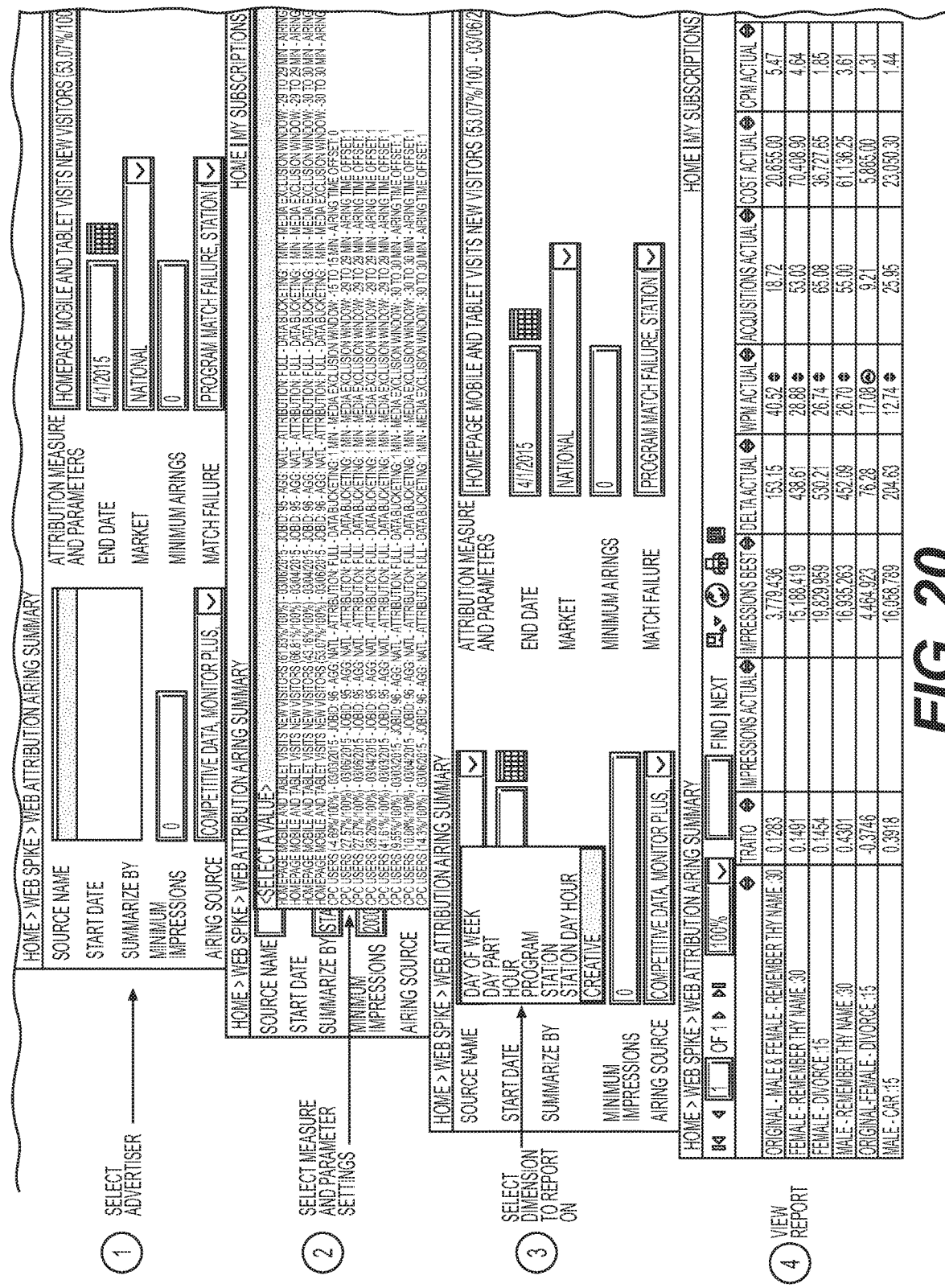
FIG. 20 depicts a graphical representation of steps involved in generating a web media performance report, according to exemplary embodiments of the present disclosure.

FIG. 20 depicts a graphical representation of steps involved in generating a web media performance report. As shown in FIG. 20, a user may select an advertiser, select a measure and parameter setting, select a dimension to report on, and view the report.

Tables 6, 7, 8, and 9, as shown below, show examples of a web media performance report with dimensions Creative, Program, Network, and Daypart.

TABLE 6

Performance by Creative

| Media Asset Pattern (copy) | WPM | Sum of airings | Sum of Delta | Sum of Cost | Sum of ImpressionsBest | Sum of Impressions | WPM Lower 95 | Cost Per Delta Estimated | Cost per Delta estimated Lower 95 |
|---|---|---|---|---|---|---|---|---|---|
| Male-Remember Thy Name: 30 | 33.39 | 220 | 934 | 95,674 | 27,986,937 | 27,855,715 | 28.97 | 102.39 | 117.98 |
| Original-Male&Female-Remember Thy Name: 30 | 32.06 | 129 | 478 | 43,252 | 14,921,599 | 13,974,512 | 26.52 | 90.42 | 109.28 |
| Female-Remember Thy Name: 30 | 28.98 | 192 | 793 | 89,069 | 27,371,567 | 27,695,223 | 24.88 | 112.30 | 130.80 |
| Female-Divorce: 15 | 26.26 | 133 | 722 | 92,585 | 27,483,424 | 28,894,854 | 21.80 | 128.27 | 154.54 |
| NULL | 43.04 | 42 | 137 | 2,084 | 3,175,603 | 1,323,532 | 30.02 | 15.25 | 21.86 |
| Original-Female-Divorce: 15 | 20.62 | 75 | 201 | 31,932 | 9,769,915 | 11,546,004 | 15.95 | 158.50 | 204.87 |
| Male-Car: 15 | 14.71 | 143 | 288 | 66,682 | 19,556,226 | 21,719,899 | 12.30 | 231.86 | 277.32 |
| Original-Male-Car: 15 | 13.98 | 26 | 29 | 3,339 | 2,041,528 | 1,672,426 | 8.60 | 117.02 | 190.08 |

TABLE 7

Performance by DayPart

| Media Asset Pattern (copy) | WPM | Sum of airings | Sum of Delta | WPM Lower 95 | Cost Per Delta Estimated | Cost per Delta estimated Lower 95 | Sum of Cost | Sum of ImpressionsBest |
|---|---|---|---|---|---|---|---|---|
| Weekday-5-LateFringe | 31.82 | 201 | 1,614 | 27.42 | 145.76 | 169.14 | 235,195 | 50,713,095 |
| Weekday-6-Overnight | 11.29 | 272 | 525 | 9.95 | 224.48 | 254.75 | 117,950 | 46,522,066 |
| Weekday-1-Morning | 12.69 | 273 | 360 | 11.19 | 265.61 | 301.35 | 95,609 | 28,363,300 |
| Weekday-2-Daytime | 31.20 | 558 | 2,772 | 28.61 | 115.09 | 125.51 | 319,022 | 88,832,808 |
| Weekday-3-EarlyFringe | 36.57 | 245 | 1,898 | 31.99 | 102.18 | 116.81 | 193,923 | 51,898,403 |
| Weekday-4-Prime | 31.95 | 241 | 4,339 | 27.92 | 153.51 | 175.69 | 666,060 | 135,806,710 |
| Weekend-5-LateFringe | 30.48 | 91 | 813 | 24.22 | 153.80 | 193.57 | 125,013 | 26,668,497 |
| Weekend-6-Overnight | 11.92 | 122 | 290 | 9.80 | 199.42 | 242.44 | 57,871 | 24,351,323 |
| Weekend-1-Morning | 13.45 | 110 | 158 | 10.94 | 305.09 | 375.21 | 48,284 | 11,762,487 |

TABLE 7-continued

Performance by DayPart

| Media Asset Pattern (copy) | WPM | Sum of airings | Sum of Delta | WPM Lower 95 | Cost Per Delta Estimated | Cost per Delta estimated Lower 95 | Sum of Cost | Sum of ImpressionsBest |
|---|---|---|---|---|---|---|---|---|
| Weekend-2-Daytime | 38.43 | 186 | 1,910 | 32.90 | 115.95 | 135.41 | 221,443 | 49,699,898 |
| Weekend-3-EarlyFringe | 43.61 | 170 | 2,319 | 37.06 | 101.47 | 119.42 | 235,280 | 53,162,555 |
| Weekend-4-Prime | 34.81 | 99 | 1,764 | 27.95 | 130.05 | 161.95 | 229,434 | 50,685,407 |

TABLE 8

Performance by Network

| Media Asset Pattern (copy) | WPM | Sum of airings | Sum of Delta | WPM Lower 95 | Cost Per Delta Estimated | Cost per Delta estimated Lower 95 | Sum of Cost | Sum of ImpressionsBest |
|---|---|---|---|---|---|---|---|---|
| SPK | 54.61 | 120 | 1,902 | 44.84 | 57.69 | 70.26 | 109,732 | 34,830,867 |
| A&E | 53.42 | 10 | 180 | 20.31 | 65.70 | 172.81 | 11,847 | 3,375,555 |
| TRU | 51.28 | 215 | 1,680 | 44.43 | 94.87 | 109.51 | 159,418 | 32,768,287 |
| FX | 46.93 | 95 | 1,023 | 37.49 | 123.51 | 154.60 | 126,335 | 21,797,404 |
| COM | 44.37 | 98 | 1,105 | 35.58 | 125.63 | 156.64 | 138,825 | 24,906,028 |
| VH1 | 43.92 | 196 | 1,146 | 37.77 | 70.99 | 82.54 | 81,335 | 26,089,713 |
| LIFE | 36.79 | 164 | 1,520 | 31.16 | 103.18 | 121.82 | 156,835 | 41,318,306 |
| MTV | 33.67 | 118 | 1,037 | 27.59 | 226.66 | 276.56 | 235,148 | 30,813,823 |
| AMC | 33.57 | 171 | 2,457 | 28.54 | 101.90 | 119.86 | 250,364 | 73,180,640 |
| BET | 32.31 | 20 | 160 | 18.15 | 135.00 | 240.33 | 21,585 | 4,947,878 |
| TBS | 31.47 | 53 | 1,331 | 22.99 | 244.25 | 334.23 | 325,058 | 42,294,566 |
| TLC | 30.91 | 17 | 189 | 16.22 | 168.88 | 321.91 | 31,993 | 6,128,819 |
| CMT | 30.32 | 225 | 1,142 | 26.36 | 76.21 | 87.67 | 87,057 | 37,668,946 |

TABLE 9

Performance by Program

| Media Asset Pattern (copy) | WPM | Sum of airings | Sum of Delta | WPM Lower 95 | Cost Per Delta Estimated | Cost per Delta estimated Lower 95 | Sum of Cost | Sum of ImpressionsBest |
|---|---|---|---|---|---|---|---|---|
| NBATV-OPEN COURT | 706.37 | 1 | 70 | — | 10.97 | 99,999,999.00 | 765 | 98,707 |
| CENT-SINGLE LADIES (SERIES) | 422.53 | 2 | 14 | — | 9.71 | 99,999,999.00 | 138 | 33,569 |
| CENT-COSBY SHOW | 386.64 | 2 | 40 | — | 7.94 | 99,999,999.00 | 319 | 103,811 |
| VH1C-GUNS N ROSES LIVE FROM O2 | 246.69 | 1 | 8 | — | 16.47 | 99,999,999.00 | 126 | 31,032 |
| VH1C-BON JOVI IN CONCERT | 200.99 | 1 | 2 | — | 21.69 | 99,999,999.00 | 33 | 7,463 |
| VH1C-ENTOURAGE | 160.31 | 2 | 7 | — | 26.16 | 99,999,999.00 | 173 | 41,268 |
| FUSE-CHRONICLES, THE | 154.83 | 1 | 4 | — | 14.16 | 99,999,999.00 | 61 | 27,616 |
| ESP2-COLLEGE BASKETBALL LIVE | 142.58 | 1 | 10 | — | 145.43 | 99,999,999.00 | 1,395 | 67,267 |
| TRU-STORAGE HUNTERS | 109.55 | 1 | 14 | — | 21.80 | 99,999,999.00 | 311 | 130,074 |

TABLE 9-continued

Performance by Program

| Media Asset Pattern (copy) | WPM | Sum of airings | Sum of Delta | WPM Lower 95 | Cost Per Delta Estimated | Cost per Delta estimated Lower 95 | Sum of Cost | Sum of ImpressionsBest |
|---|---|---|---|---|---|---|---|---|
| VH1C-DOWNLOAD FESTIVAL 2014 | 109.18 | 1 | 1 | — | 26.51 | 99,999,999.00 | 22 | 7,713 |
| FUSE-TOP 100 HOUSE PARTY SONGS | 99.25 | 1 | 3 | — | 25.77 | 99,999,999.00 | 84 | 32,839 |
| MTV-FRESH PRINCE OF BEL-AIR | 99.17 | 1 | 14 | — | 60.05 | 99,999,999.00 | 863 | 145,001 |
| CENT-CSI: NY | 91.29 | 3 | 5 | — | 14.10 | 99,999,999.00 | 65 | 50,699 |
| TRU-SOUTH BEACH TOW | 90.83 | 6 | 67 | 18.15 | 32.62 | 163.24 | 2,173 | 733,451 |
| VH1-BLACK INK CREW 3 | 90.02 | 12 | 233 | 39.08 | 27.89 | 64.23 | 6,511 | 2,593,470 |
| TRU-BAIT CAR | 89.47 | 1 | 9 | — | 33.65 | 99,999,999.00 | 291 | 96,7384 |

Figure 21:
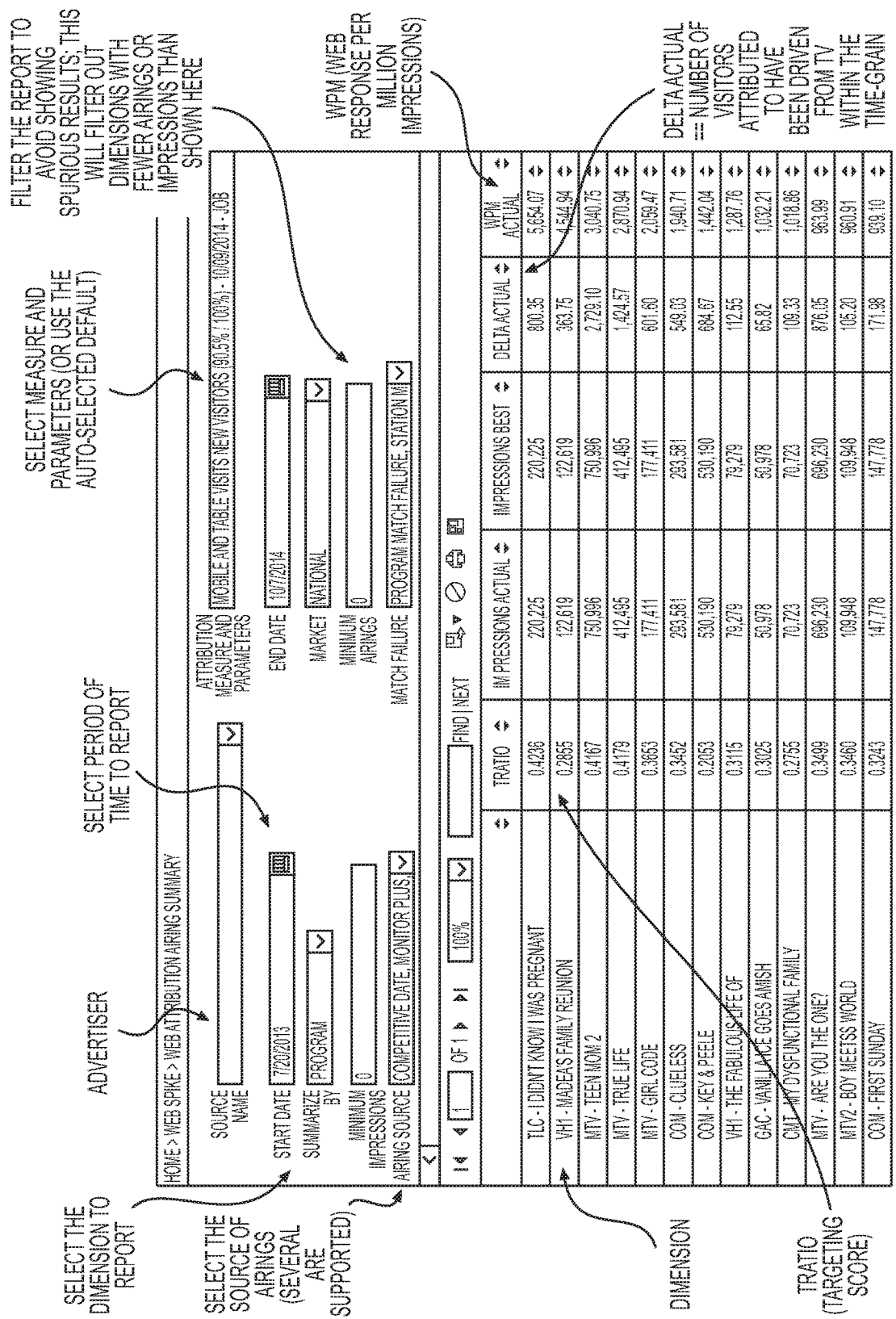
FIG. 21 depicts a screenshot of a web spike media performance report using program as a dimension, according to exemplary embodiments of the present disclosure.

FIG. 21 depicts a screenshot of a web spike media performance report using program as a dimension. The impression actual may be impressions as reported by Nielson, Rentrak, and/or another provider. The impressions actual and impressions best may take time to become available, and thus, an impressions prediction may be used.

FIG. 22 depicts a screenshot of a web spike media performance report using daypart as a dimension. FIG. 23 depicts a screenshot of a web spike media performance report using hour as a dimension. FIG. 24 depicts a screenshot of a web spike media performance report using network as a dimension. FIG. 25 depicts a screenshot of a web spike media performance report using program as a dimension. FIG. 26 depicts a screenshot of a web spike media performance report using creative as a dimension.

Web Spike Halo Report

A web spike halo report may show a "halo" of the ad airing and an ad airing's impact across multiple measures. For each measure and for a given unit change in targeting, such as how many additional web visits, sessions, searches, and so on, a halo report may be generated. A halo report may include one or both of the following parameters measureid, slope, percent change, and/or RMSE.

Slope may be calculated by parameter $\beta_1$, and may be a measure of the change in traffic per million impressions assuming a tratio of 1. This estimate may take into account the targeting and impression weight of the traffic and normalizes this out.

Percent Change may be calculated as discussed above, and may be a measure of the percentage change in traffic observed when television airing ran. The Percent Change measure may not normalized for number of impressions, but could be normalized if desired.

RMSE may be the root mean squared error for the fit that was used to calculate the slope, and may give a measure of the variability of the landscape. If the RMSE is too high, then the slope estimate may be considered unreliable or spurious. Other metrics may be used to measure fit quality including R square and so on.

Figure 27:
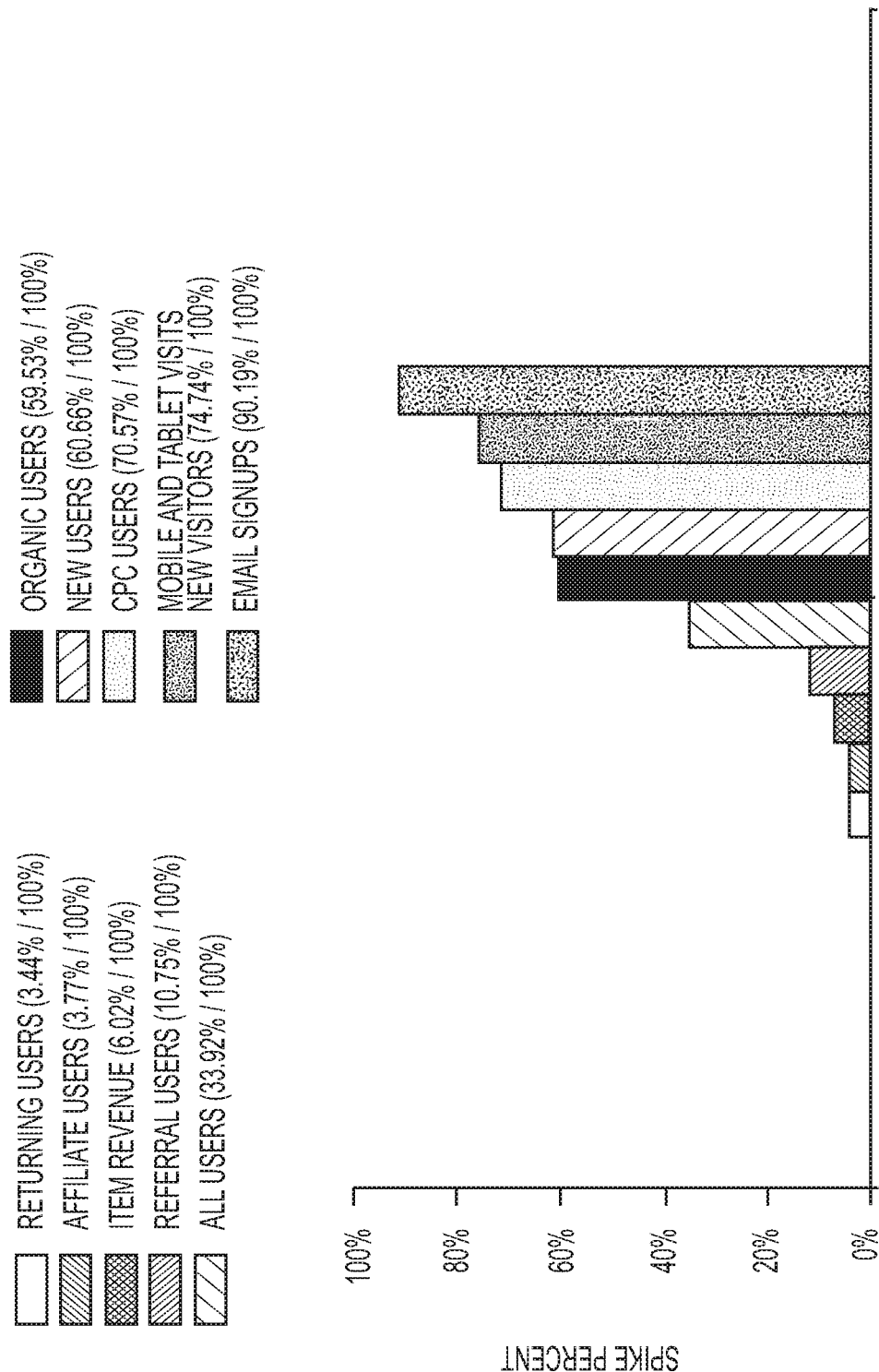
FIG. 27 depicts an example of a web spike halo report, according to exemplary embodiments of the present disclosure.

FIG. 27 depicts an example of a web spike halo report. As shown in FIG. 27, the web spike halo report analysis of web activity changes given a television commercial. Different classes of web traffic are shown with the average change in web activity. FIG. 27 shows that email signups increase the most within 1 minute of a TV airing (90%), followed by mobile and tablet visits (75%), cost per click or paid search CPC traffic (71%), and new users (61%).

Figure 28:
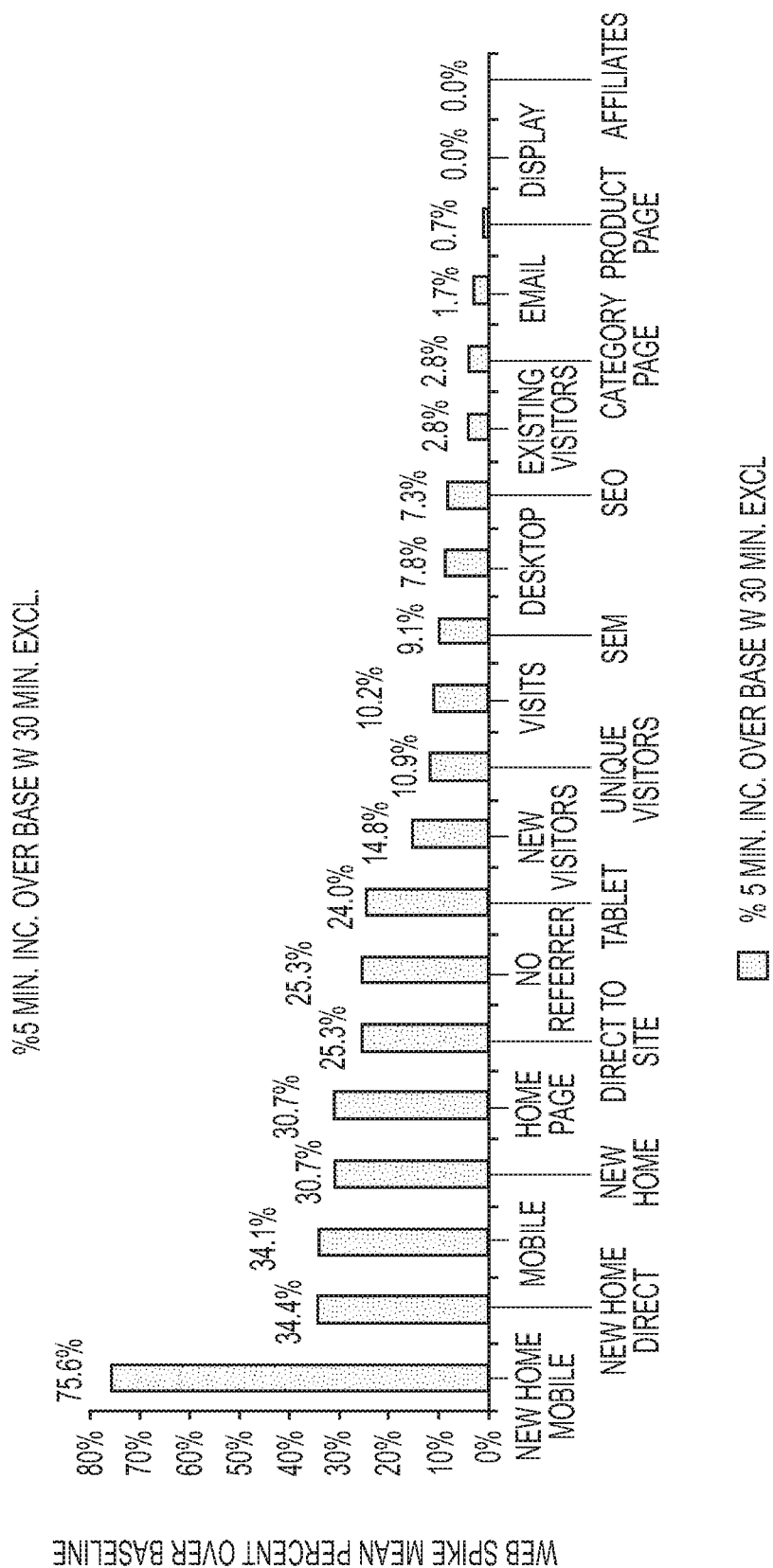
FIG. 28 depicts an example of a web spike halo report, according to exemplary embodiments of the present disclosure.

FIG. 28 depicts an example of a web spike halo report. As shown in FIG. 28, the web spike halo report analysis of web activity changes given a television commercial. The information provided in FIG. 28 is a graphical representation of the information provided in Table 2, as shown above. The graph is sorted in order of highest web response to lowest. This shows that new homepage mobile traffic produces the highest increase in traffic during a television airing, with a 76% change. Total visits increases by 10.2%. The least affected categories include email, display, and product page traffic (deep-linked pages on specific products that a user would have to navigate to).

Table 2, as shown above, also depicts an example of the halo report in table form. For example, for every 1 million impressions at tratio=1, there will be 29.7 additional visits, 28.6 additional unique visitors, 24.3 new (i.e. non-returning) visitors, 18 new homepage visits, 8 mobile visits, and 3.9 new mobile homepage visits, and 5 Search Engine Marketing referrals. Note that in terms of spike magnitude, mobile traffic may have the highest spike magnitude (around 34% in the previous figure), whereas in absolute terms there may not be very much mobile traffic, and so this only translates into 8 mobile visitors. In contrast, Visits had a very low spike magnitude, e.g., 10.2%, but translates into a high absolute amount of traffic (29.7 additional visits).

Figure 29:
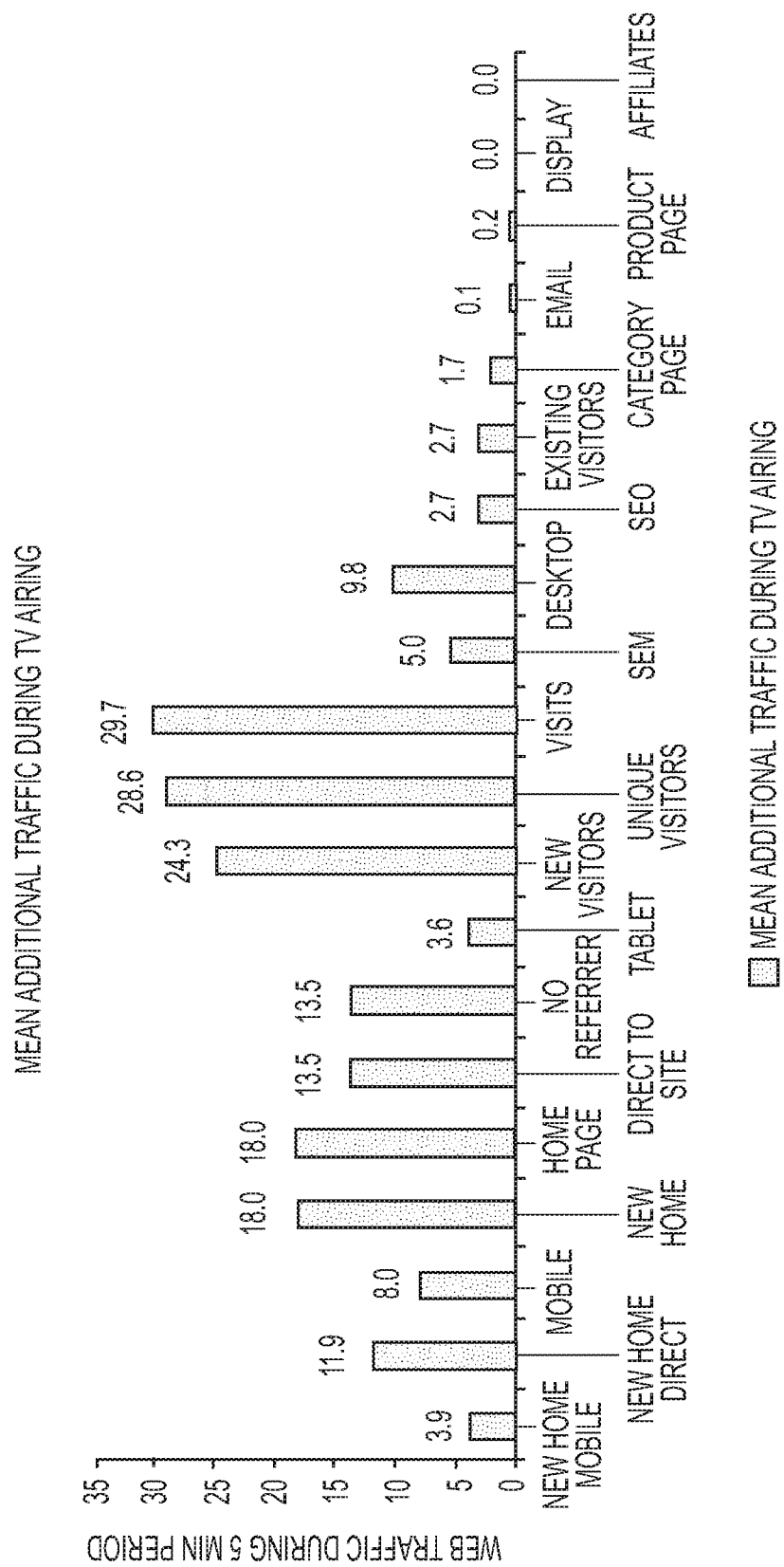
FIG. 29 depicts an example of a web spike halo report, according to exemplary embodiments of the present disclosure.

FIG. 29 depicts an example of a web spike halo report. As shown in FIG. 29, the web spike halo report is translated from FIG. 28. The percentages are translated into total traffic and shows that while the mobile traffic had the highest spike in FIG. 28, in absolute terms, visits category increased the most. In FIG. 29, for every 1 million television media impressions, total traffic generated across a wide range of traffic classes. For every 1 million impressions at tratio=1, there may be 29.7 additional visits, 28.6 additional unique visitors, 24.3 new (i.e., non-returning) visitors, 18 new homepage visits, 8 mobile visits, 3.9 new mobile homepage visits, and 5 search engine marketing referrals.

Web Spike Cluster Responsiveness Report

The same algorithm for measuring a web spike halo effect may also be used to measure the "responsiveness" of different target clusters. A cluster may be a segment of the customer population in which an advertiser may want to reach through advertising. Target clusters may be a set of persons who share certain traits. For example, targets may have a similar age, gender, income, number of children, and so on.

The quality of targeting against each segment may be first defined by a tratio score against each target. For example, if there are three clusters, then there would be three tratios reported for each airing: tratio1, tratio2, tratio3. It may then be possible to do the slope analysis on each target, slope1, slope2, slope3. These slopes may provide an estimate of how responsive each of the customer targets are to the advertiser's impressions.

Web spike cluster responsiveness reports and halo reports may include one or more of SourceKey, Slope, PercentChange, and/or RMSE.

Figure 30:
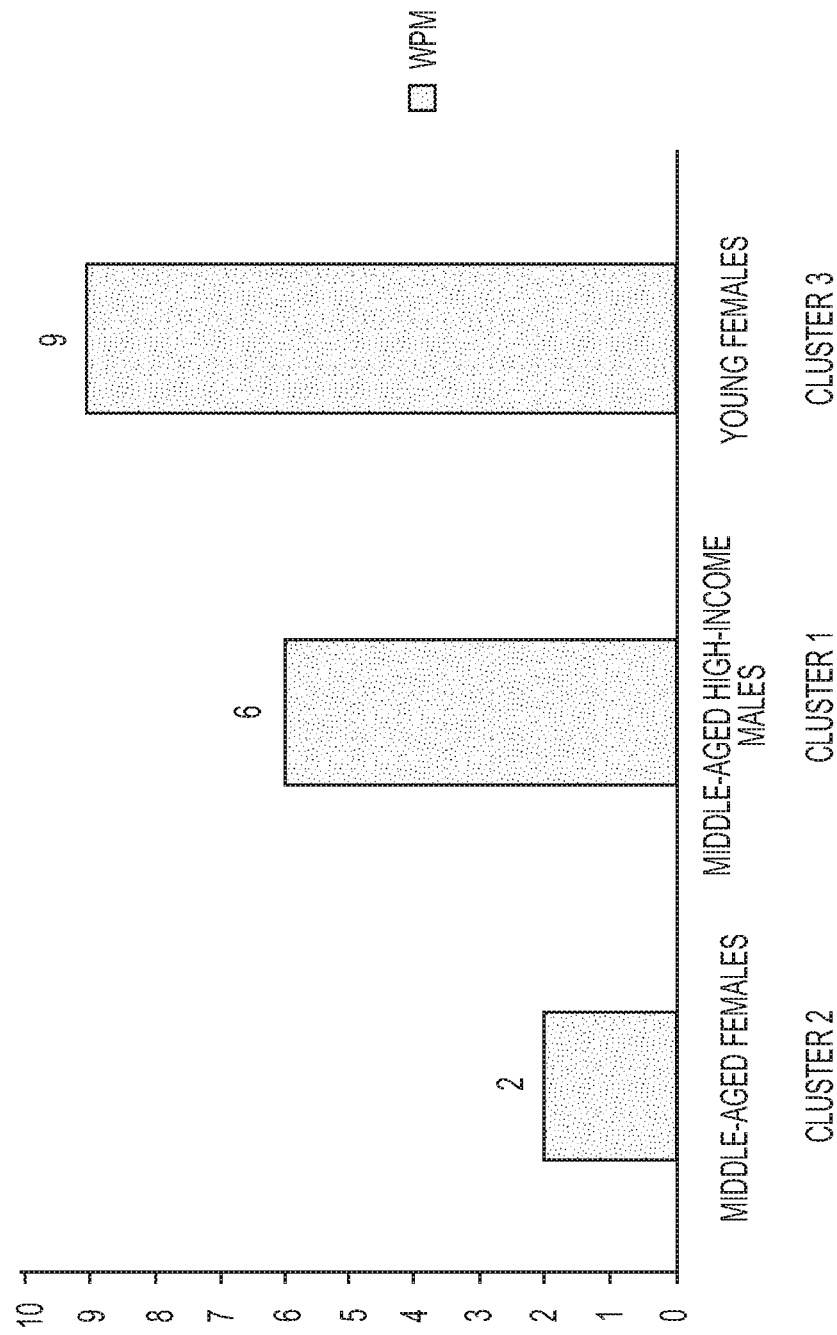
FIG. 30 depicts an example of a web spike cluster response analysis, according to exemplary embodiments of the present disclosure.

FIG. 30 depicts an example of a web spike cluster response analysis. As shown in FIG. 30, population segments may generate the best web response after targeting them with a television ad. This shows that for a particular advertiser, younger females may be far more responsive to their offer than middle-aged females. High income males may also be responsive, but not as high as the younger females. Using this information, the advertiser may focus their targeting on the younger females.

Although the web spike cluster response analysis may be similar to the web spike halo analysis, the ability to focus targeting may be extremely important in advertising. An advertiser may significantly decrease their media budget, or may move more of their marketing dollars onto segments that are responsive and interested in their offer. The above analysis can also normalize against baseline responsiveness for different segments Automatically Optimize Parameters A variety of parameters may be associated with a web attribution including one or more of a measure, a filter, a lower and/or upper exclusion window, a maximum number of airings, a maximum impression, a time grain, a full attribution, a partial attribution, and/or a geographic grain.

Measure parameters may include one or more web measure being used, such as visits, sessions, and/or unique visitors. Filter parameters may include a choice of filters, such as new visitors, direct-to-site referrals, null referrers, and/or mobile or tablet user agents. A lower and/or upper exclusion window parameter may include a time prior to an airing and/or after an airing that should be free of additional media airings and/or should meet the maximum thresholds below. A maximum number of airings parameter may include an exclusion period where there should be no more than this number of airings. A maximum impression parameter may include an exclusion period where there should be no more than this number of impressions from other media events. A time grain parameter may include 1 minute, 2 minutes, 5 minutes, 15 minutes, etc., which may be used to bucket media and web events during attribution.

A full attribution and/or a partial attribution parameter may allow simultaneous airings. If a full attribution parameter is used, simultaneous airings occurring together within a bucket may be attributed by apportioning credit based on their impressions or other criteria. If a partial attribution parameter is used, then if there are multiple simultaneous airings, the airings are not attributed.

If a geographic grain parameter is used, then airings and web activity may be aggregated to the national level. If DMA geographic grain parameter is used, then local airings may be matched with local web activity. Local web activity may be measured by performing an IP-lookup on the web traffic to classify them into different geographic areas.

Each of the above mentioned parameters may be automatically optimized. Automatic optimization may be performed through one or more of the following steps. First, several combinations of the above mentioned parameters may be defined. Then, each of the defined parameter settings may be executed and attribution results may be generated. Next, an average spike percentage may be calculated, and then, targeting landscape parameters may be calculated (e.g., slope and intercept). The sum of squared error of the landscape may then be calculated, and a percent of cases attributed may be calculated. After executing all combinations, the parameter settings that have the highest percentage web spike or lowest root mean squared error, may be selected as the optimal settings. It also may be possible for a user to set parameters, and the user may use a lower spike magnitude parameter setting if it attributes more of the airings.

Tables 10 and 11 depict parameter search results. As shown in tables 10 and 11, slope, intercept, and spikepctaverage diagnostics may be visible and may show which of the metrics and parameter settings are best.

TABLE 10

Automated Parameter Search Results

| Web-Attribution-ID | Use-For-Scoring | Source-Key | Measure-ID | Aggregate By Market | Data Time Window | Lower Media Exclusion Time Window | Upper Media Exclusion Time Window | Full-Attribution | Minimum Impressions | Minimum Airings | Spike PctAvg |
|---|---|---|---|---|---|---|---|---|---|---|---|
| 1186 | 0 | 110401 | 27 | 0 | 5 | 5 | 0 | 1 | 0 | 1 | 8.13 |
| 1187 | 0 | 110401 | 36 | 0 | 5 | 5 | 0 | 1 | 0 | 1 | 5.33 |
| 1188 | 0 | 110401 | 37 | 0 | 5 | 5 | 0 | 1 | 0 | 1 | 5.71 |
| 1189 | 0 | 110401 | 38 | 0 | 5 | 5 | 0 | 1 | 0 | 1 | 1.23 |
| 1190 | 1 | 110401 | 39 | 0 | 5 | 5 | 0 | 1 | 0 | 1 | 49.56 |
| 1191 | 0 | 110401 | 40 | 0 | 5 | 5 | 0 | 1 | 0 | 1 | 20.75 |
| 1192 | 0 | 110401 | 41 | 0 | 5 | 5 | 0 | 1 | 0 | 1 | 18.62 |
| 1193 | 0 | 110401 | 42 | 0 | 5 | 5 | 0 | 1 | 0 | 1 | 6.04 |
| 1194 | 0 | 110401 | 43 | 0 | 5 | 5 | 0 | 1 | 0 | 1 | 3.38 |
| 1195 | 0 | 110401 | 44 | 0 | 5 | 5 | 0 | 1 | 0 | 1 | 1.43 |
| 1196 | 0 | 110401 | 45 | 0 | 5 | 5 | 0 | 1 | 0 | 1 | 0.38 |
| 1197 | 0 | 110401 | 46 | 0 | 5 | 5 | 0 | 1 | 0 | 1 | −0.97 |
| 1198 | 0 | 110401 | 47 | 0 | 5 | 5 | 0 | 1 | 0 | 1 | 14.71 |

TABLE 10-continued

Automated Parameter Search Results

| | | | | | | | | | | | |
|---|---|---|---|---|---|---|---|---|---|---|---|
| 1199 | 0 | 110401 | 48 | 0 | 5 | 5 | 0 | 1 | 0 | 1 | 14.71 |
| 1200 | 0 | 110401 | 49 | 0 | 5 | 5 | 0 | 1 | 0 | 1 | 18.62 |
| 1201 | 0 | 110401 | 50 | 0 | 5 | 5 | 0 | 1 | 0 | 1 | 0.97 |
| 1202 | 0 | 110401 | 51 | 0 | 5 | 5 | 0 | 1 | 0 | 1 | 23.1 |
| 1203 | 0 | 110401 | 52 | 0 | 5 | 5 | 0 | 1 | 0 | 1 | 15.52 |
| 1204 | 0 | 110401 | 53 | 0 | 5 | 5 | 0 | 1 | 0 | 1 | 4.02 |

| Web-Attribution-ID | Slope | Intercept | Slope-Positive | Intercept Positive | Attributed Pct |
|---|---|---|---|---|---|
| 1186 | 71.5267392527873 | 39.038 | 20.0189771145764 | 71.1097526769653 | 100 |
| 1187 | 73.4298947723419 | 44.88 | 6.29416055305941 | 86.9884991806818 | 100 |
| 1188 | 74.5321986620914 | 43.611 | 15.2412042171185 | 80.0973288674321 | 100 |
| 1189 | 2.11156132415068 | 4.653 | −23.7420215200895 | 24.5104945123655 | 100 |
| 1190 | 21.6379045353731 | 10.76 | 11.4158728486788 | 17.3626216180327 | 100 |
| 1191 | 48.9899407382675 | 25.2268867653783 | 24.3027875833938 | 42.3659602587061 | 100 |
| 1192 | 63.1728920301269 | 36.2085194033426 | 31.7220337694906 | 58.5159669009066 | 100 |
| 1193 | 14.8459978589929 | 7.93651452264115 | −7.92096481836447 | 22.6648277367109 | 100 |
| 1194 | 8.20463920440668 | 3.4944112499625 | −11.7635507401761 | 16.1815419587978 | 100 |
| 1195 | 0.370726975440122 | −0.0536844232695239 | −1.26877072392682 | 1.44485559915304 | 100 |
| 1196 | −0.216353179267301 | 0.461628775126748 | −6.03572589886188 | 5.89637327881743 | 100 |
| 1197 | 1.07352182826531 | 0.150666255260131 | −0.713183104635479 | 3.22129599897471 | 100 |
| 1198 | 50.9786592731211 | 26.1006194510393 | 22.9684907708998 | 45.753036964897 | 100 |
| 1199 | 50.9786592731211 | 26.1006194510393 | 22.9684907708998 | 45.753036964897 | 100 |
| 1200 | 63.9104089917169 | 36.1424242000119 | 32.4015767815651 | 58.4550520746715 | 100 |
| 1201 | 12.4729246340856 | 0.604601187270315 | −16.2560297904869 | 18.3561290898712 | 100 |
| 1202 | 29.7023406635302 | 16.182959711954 | 10.1824920954828 | 28.7112075726408 | 100 |
| 1203 | 21.7606448925032 | 6.72759549329199 | 4.42194577731784 | 16.1540610591827 | 100 |
| 1204 | 20.5219229407963 | 16.09824709679 | −8.81328899012128 | 39.2906724829881 | 100 |

TABLE 11

Automated Parameter Search Results

| measureid | measure display | spike-pct-avg | slope | intercept | slope-positive | intercept-positive | web-attribu-tionid | last run date | use for scoring | aggre-gate by market | data-time-win-dow |
|---|---|---|---|---|---|---|---|---|---|---|---|
| 39 | New Home Mobile | 69.49 | −9.89 | 41.98 | −25.991 | 47.375 | 1385 | 2014 May 14 22:43:05 | 0 | 0 | 5 |
| 39 | New Home Mobile | 63.29 | 39.525390918181 4 | 38.93085452249 1 | 26.71 | 44.53 | 1271 | 2014 May 15 12:27:05 | 0 | 0 | 5 |
| 39 | New Home Mobile | 59.74 | 57.0711675 993503 | 34.7596662 54164 3 | 39.1374571066732 | 41.16 | 1252 | 2014 May 15 12:13:42 | 0 | 0 | 5 |
| 39 | New Home Mobile | 49.56 | 21.6379045 353731 | 10.7670927 353409 | 11.4158728486788 | 17.36 | 1190 | 2014 May 15 11:12:39 | 1 | 0 | 5 |
| 39 | New Home Mobile | 48.66 | 56.5067175 325521 | 25.3215247 590866 | 46.3683420290059 | 30.50 | 1209 | 2014 May 15 11:32:02 | 0 | 0 | 5 |
| 51 | Mobile | 31.96 | 21.0013824 830447 | 56.7687143 649657 | −68.7648680827587 | 82.1378259402728 | 1397 | 2014 May 14 22:48:06 | 0 | 0 | 5 |
| 51 | Mobile | 30.53 | 65.1868778 135764 | 58.1810850 794464 | −3.95160037991875 | 79.4309147254221 | 1283 | 2014 May 15 12:32:47 | 0 | 0 | 5 |
| 40 | New Home Direct | 29.73 | −54.23114055902 8 | 99.8869087 604818 | −134.06907897743 | 129.252838808494 | 1386 | 2014 May 14 22:43:18 | 0 | 0 | 5 |
| 51 | Mobile | 28.84 | 63.9242894 228157 | 55.3681916 546475 | 11.9340027195814 | 73.9906286662082 | 1264 | 2014 May 15 12:20:19 | 0 | 0 | 5 |

TABLE 11-continued

Automated Parameter Search Results

| 40 | New Home Direct | 28.14 | 7 103.601599 213457 | 9 83.58 33123 492095 | 38.5908166115748 | 111.970318305361 | 1272 | 2014 May 15 12:27:21 | 0 | 0 | 5 |

| measureid | lowermedia-exclusion-time-window | uppermedia-exclusion-time-window | full-attribution | minimum impressions | minimum airings |
| --- | --- | --- | --- | --- | --- |
| 39 | 120 | 0 | 0 | 0 | 1 |
| 39 | 60 | 0 | 0 | 0 | 1 |
| 39 | 30 | 0 | 0 | 0 | 1 |
| 39 | 5 | 0 | 1 | 0 | 1 |
| 39 | 5 | 0 | 0 | 0 | 1 |
| 51 | 120 | 0 | 0 | 0 | 1 |
| 51 | 60 | 0 | 0 | 0 | 1 |
| 40 | 120 | 0 | 0 | 0 | 1 |
| 51 | 30 | 0 | 0 | 0 | 1 |
| 40 | 60 | 0 | 0 | 0 | 1 |

Automated Ad Targeting Feedback Loop

Web spikes may be used to measure which networks, programs, times-of-day, and creative generate the highest response. Rather than just reporting this data, the data may be used to automatically optimize a television campaign to maximize the web site response; using a "closed feedback loop" of web spike data to automatically adjust TV targeting.

An example of an ad targeting problem may be to select media in order of value per dollar, using the following formula:

$$M_i: \max \frac{wpi(M_i)}{CPI(M_i)}$$

Where CPI ($M_i$) and wpi($M_i$) are clearing prices and media observations. CPI ($M_i$) may be obtained from the TV stations. The web spike of an upcoming airing wpi($M_i$) may be estimated. In order to estimate the performance of the airing, the airing may be broken into a series of features including station, program, and so on. For example, a future media instance, $M_i$ may be (CNN, 8 pm, "Piers Morgan," Tuesday, Dec. 12, 2012, Pod1, Pos2, 60s). The following features may be used to predict the performance: Station wpi($m_{i1}$)=(CNN), Station-Hour-Pod $m_{i2}$=(CNN, 8 pm, Pod1), Geography-Station $m_{i3}$=(National-CNN), and so on.

Table 12 depicts networks with highest web response per impression measured in a TV campaign.

TABLE 12

| Network-Day-Hour | WPI |
| --- | --- |
| DFH | 0.00231 |
| COM | 0.00217 |
| SOAP | 0.00121 |

Tables 13 and 14 depict examples of aggregated features for Station-day-hour and Station-Program. Table 13 depicts Network-Day-Hours with highest web response per impression measured in the TV campaign.

TABLE 13

| Network-Day-Hour | WPI |
| --- | --- |
| SOAP-Su-3 pm | 0.00322 |
| COM-Tu-1 pm | 0.00302 |
| DFH-Tu-11 am | 0.00289 |
| DFH-W-2 pm | 0.00273 |
| DFH-M-7 am | 0.00259 |
| COM-W-1 pm | 0.00253 |
| DFH-M-1 pm | 0.00229 |
| COM-Th-1 pm | 0.00214 |
| COM-Tu-12 pm | 0.00211 |
| DFH-Th-3 pm | 0.00206 |

Table 14 depicts Network Programs with highest web response per impression in the TV campaign.

TABLE 14

| Network-Program | WPI |
| --- | --- |
| LMN-Movie | 0.0203 |
| SOAP-Veronica Mars | 0.0147 |
| SOAP-One Tree Hill | 0.0107 |
| AMC-AMC Movie | 0.0085 |
| SOAP-Gilmore Girls | 0.0076 |
| OWN-Dr. Phil | 0.0073 |
| SOAP-General Hospital | 0.0067 |
| WGNA-Law & Order: Criminal Intent | 0.0065 |
| SOAP-Beverly Hills, 90210 | 0.0054 |
| COM-South Park | 0.0046 |

For each feature, an estimate may be created, which is equal to the average web response per impression over all historical media, as follows:

$$wpi(m) = \frac{\sum_i wpi(M_i) \cdot I(M_i)}{\sum_i \cdot I(M_i)} : m \in M_i$$

The prediction of performance for an upcoming media $M_i$ then becomes the weighted average of these historical estimates of wpi. The weights may be trained to predict future wpi.

$$wpi(M_i)^* = \sum_j \frac{w_j}{\sum_i w_i} \cdot wpi(m_j) : m \in M_i$$

For example, to score "SOAP—Beverly Hills, 90210," which has moved to a new time of Sunday at 4 pm. Historical readings may be checked, and SOAP may have an average WPI of 0.00121, and previous airings of SOAP-Beverley Hills, 90210 may produce WPI of 0.0054. The performance of SOAP-Sun-4 pm may be missing, as information for SOAP-Sun-3 pm does not match, and thus, may not be used. Pre-calculated weights of 0.25, 0.5, and 0.25 for Network, Station-Program, and Station-Day-Hour features may be calculated. Therefore, the prediction for WPI if purchasing an upcoming airing would be (0.25/0.75) *0.00121+(0.5/0.75)*0.0054+NULL=0.0040.

As new airings occur, and web spikes occur, wpi statistics may be updated for media by aggregating in the latest web spike response information, which is an estimate of $wpi(M_i)$ for upcoming buyable media.

As new airings occur, and web spikes occur, wpi statistics may be updated for media per above. Then, the media bought may be changed by re-calculating a ranking function, as follows:

$$M_i : \max \frac{wpi(M_i)}{CPI(M_i)}$$

This may reveal that the best media to buy might be SOAP—Sa—3 pm based on knowledge of the program that will be on at that time, the web response for that daypart and network. This results in a system which receives new web spike data, and optimizes what is being purchased in that campaign.

Example Embodiment

The attribution algorithms were run on a TV campaign and associated web activity from Feb. 11, 2013 to July 2013. The television campaign comprised 35,296 airings. Both attribution methods were calculated, and then compared to the web response per impression calculated using each algorithm to the targeting score of each airing as calculated using an algorithm. The comparison measures the number of buyers per million in the viewing audience. The Instantaneous model has a fit of R=0.64, day-hour subtraction with 3 hour exclusion has a fit of R=0.42, and day-hour subtraction without exclusion produces a fit of R=0.33.

Reports may be provided on the performance of different networks, day-parts and programs in generating web spikes by dividing TV-generated web activity by TV impressions.

$$wpi(M) = \frac{\sum W(T, G) - W_{NoTV}(T, G)}{I(M(T, G))}$$

The highest web-spike per impression network-programs and network-day-parts for the live TV campaign, as measured by the first algorithm as described above, are shown in Tables 13 and 14 above. The most responsive networks were Discovery Health and Fitness, SOAP and Comedy. The most responsive programs were "Veronica Mars," "One Tree Hill" and "Gilmore Girls." The product being advertised was one that appealed to higher income women who were just married or were renovating. Table 13 shows a network day-hours with a highest web response per impression measured in the TV campaign. Table 14 shows network programs with a highest web response per impression in the TV campaign.

The web response alignment graphs are suggestive. However, TV is known to have complex and long ranging effects. Thus, the question is whether web spike response could be used as a proxy to measure total TV effect?

The total TV lift should be measured. A classic method for measuring total TV effect is to run a controlled experiment. Media is applied to certain geographies, and not to control geographies. The difference in web activity between treatment and control is then measured. This is called a Matched Market Experiment, and it has been used in many previous studies to measure television effects.

In evaluation, a Matched Market Experiment was implemented by purchasing 9,748,347 impressions and 296 airings ($483 per airing) of media on the week of Feb. 11, 2014 and Mar. 4, 2013 in treatment market $G_j$=Seattle. This purchased approximately 281 Gross Rating Points per week in the targeted area. A Gross Rating Point ("GRP") is equal to 100*impressions per TV Household per area per unit time. For example, 281 GRPs per week is equal to 2.81 impressions per household per week.

An aggregated control $W(T, G_{j,CON})$ was selected and matched to this treatment and not running media as follows. The control areas were actually subjected to approximately 20 GRPs of advertising weight due to some national advertising that was unavoidable, so the comparison was 281 GRPs in treatment versus 20 GRPs in control.

$$W(T, G_{j,CON}) = \sum_{i \neq j} w_i \cdot W(T, G_i) + w_0 : \sum I(M(T, G_i)) = 0$$

Where $w_i$ were trained using data from times $T_0$ that were prior to the start of television, selected using stepwise regression to avoid over-fitting, and the model was validated against a test set that was held out in time. The parameters are shown in Table 16 below.

$$\min w_i : \sum_{T \in TRAIN} \left( W(T_0, G_j) - \sum_i w_i \cdot W(T_0, G_i) + w_0 \right)^2$$

Difference of differences can now be used to calculate the activity due to the treatment in this kind of design. The method measures the change in treatment area minus change in control area:

$$f(I(M(T,G_j))) = (W(T,G_j) - W(T_0,G_j)) - (W(T,G_{j,CON}) - W(T_0,G_{j,CON}))$$

Because an explicit, time-varying control which minimizes difference between $W(T_0, G_{j,CON})$ and $W(T_0, G_j)$ is used, the treatment and control starting terms cancel, and the difference of difference formula becomes the formula below. The results are shown in Table 15 and FIGS. 31*a*-31*f* below.

$$f(I(M(T, G_j))) = W(T, G_j) - W(T, G_{j,CON})$$

$$lift = \frac{W(T, G_j)}{W(T, G_{j,CON})} - 1$$

The result shows that web spike lift readings appear to predict total TV effect. Web Spike analysis reported 30.7% lift for Homepage, 14.8% for new visitors, and 10.2% for visits. Experimental measurement exhibits the same relationship: 58%, 27%, and 18% (see Table 15; FIGS. 31A-31F).

Another result is that the amount of lift measurable by web spike is small relative to the total effect of TV. Experiments provided measurements of an additional 3.5 conversions for every conversion generated during the campaign in the 6 months after the campaign because of elevated lift in treatment area. Web spike may be unable to detect this lift as it works on short-term effects. In addition, web spike measurements only observe a narrow time window around each airing when signal-to-noise is maximum. Based on the first algorithm, 0.69% of total web effect including residuals after 6 months were measure. Nevertheless, despite measuring only a small amount of TV's total effect, the measured signal appears to be correlated with overall TV effect.

TABLE 15

Experimental Lift versus Web Spike Lift

| Traffic | Exp % lift | web spike % lift/ base | Exp Corr metric, conversions | web spike timp corr. |
|---|---|---|---|---|
| Homepage | 57.8% | 30.7% | 0.321 | 0.079 |
| New visitors | 27.4% | 14.8% | 0.162 | 0.064 |
| Visits | 18.3% | 10.2% | 0.130 | 0.054 |

Robust measurement of web-spikes may be performed, and the information gather may be used to automatically optimize a television campaign.

Figure 31A:
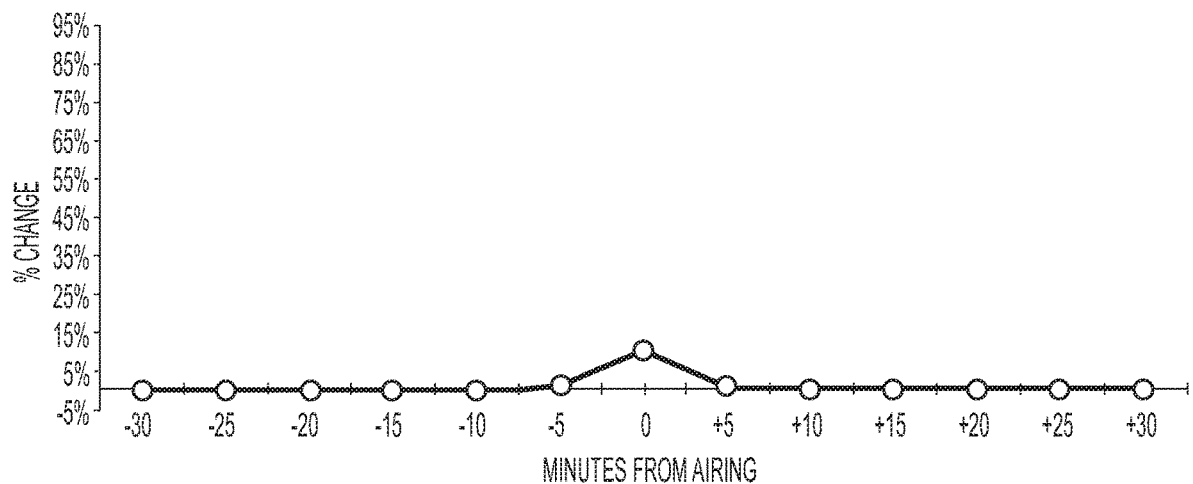
FIG. 31A shows a web spike percentage lift for a time before through a time after a TV airing with spike magnitude expressed in terms of percentage lift over average baseline activity, according to exemplary embodiments of the present disclosure.
Figure 31B:
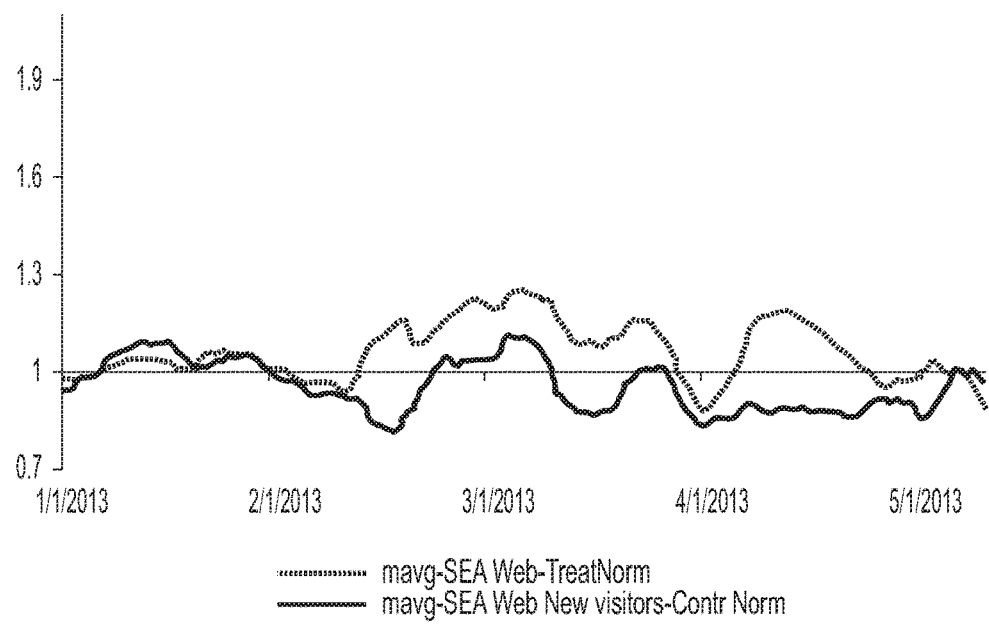
FIG. 31B shows an experimental lift measurement measured using difference of differences calculated over a treatment and control geographic area for three web metrics, according to exemplary embodiments of the present disclosure.

FIGS. 31A and 31B show visits. FIG. 31A shows a web spike percentage lift for 60 minutes before through 60 minutes after a TV airing (at minute 0) with spike magnitude expressed in terms of percentage lift over average baseline activity. FIG. 31B shows an experimental lift measurement measured using difference of differences calculated over a treatment and control geographic area for three web metrics. The time series are shown as a 7 day moving average. The control area (lighter shaded line) with web activity is normalized to 1.0, and treatment area (darker shaded line) shows activity in units of percentage over control. As web spike percentage lift increases, the experimentally measured lift increases.

Figure 31C:
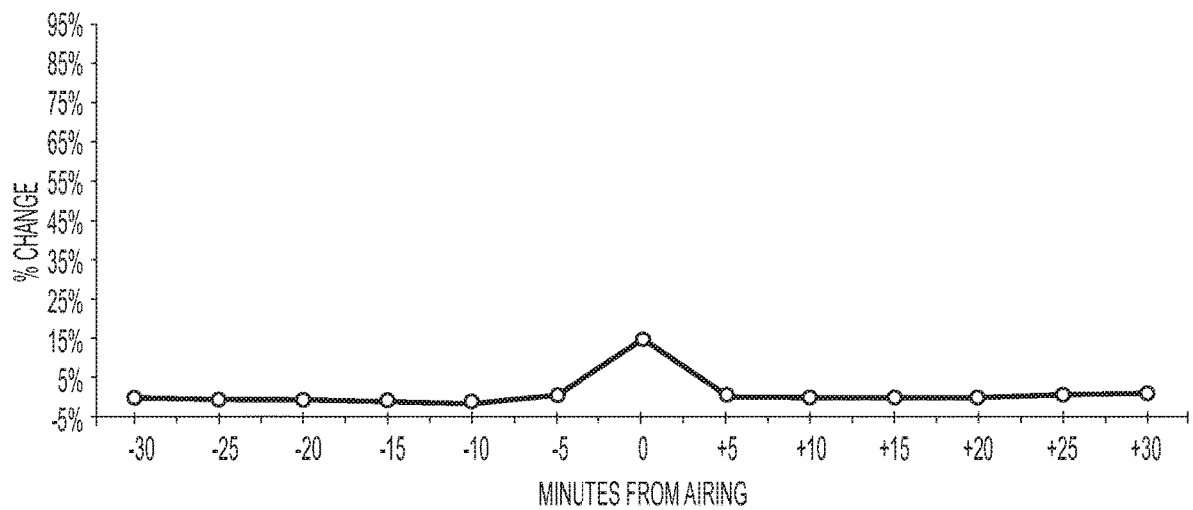
FIG. 31C shows a web spike percentage lift for a time before through a time after a TV airing with spike magnitude expressed in terms of percentage lift over average baseline activity, according to exemplary embodiments of the present disclosure.
Figure 31D:
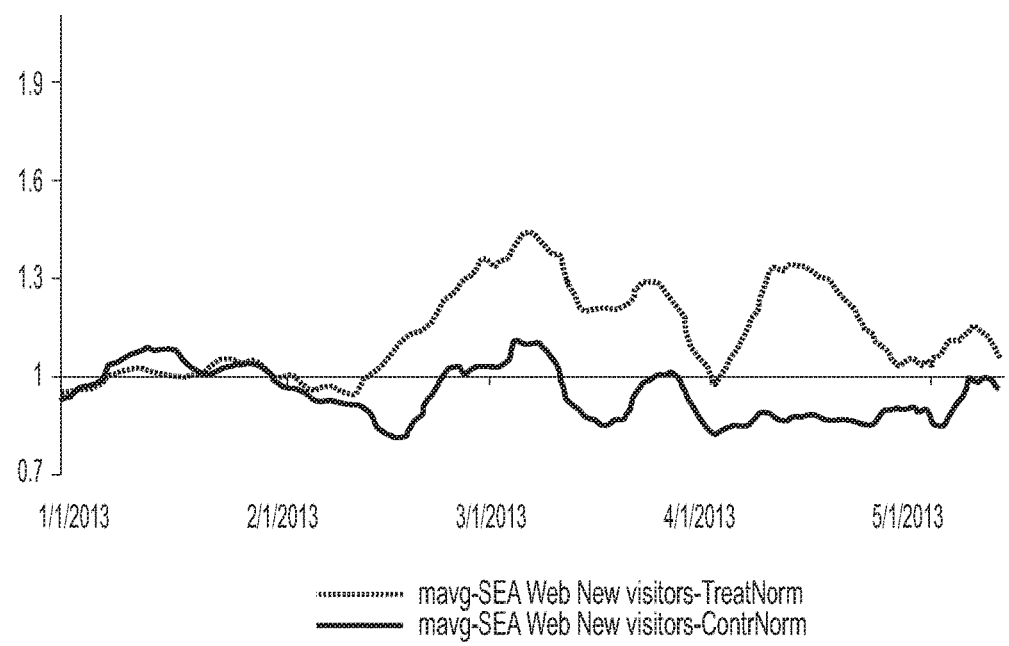
FIG. 31D shows an experimental lift measurement measured using difference of differences calculated over a treatment and control geographic area for three web metrics, according to exemplary embodiments of the present disclosure.

FIGS. 31C and 31D show new visitors. FIG. 31C shows a web spike percentage lift for 60 minutes before through 60 minutes after a TV airing (at minute 0) with spike magnitude expressed in terms of percentage lift over average baseline activity. FIG. 31D shows an experimental lift measurement measured using difference of differences calculated over a treatment and control geographic area for three web metrics. The time series are shown as a 7 day moving average. The control area (lighter shaded line) with web activity is normalized to 1.0, and treatment area (darker shaded line) shows activity in units of percentage over control. As web spike percentage lift increases, the experimentally measured lift increases.

Figure 31E:
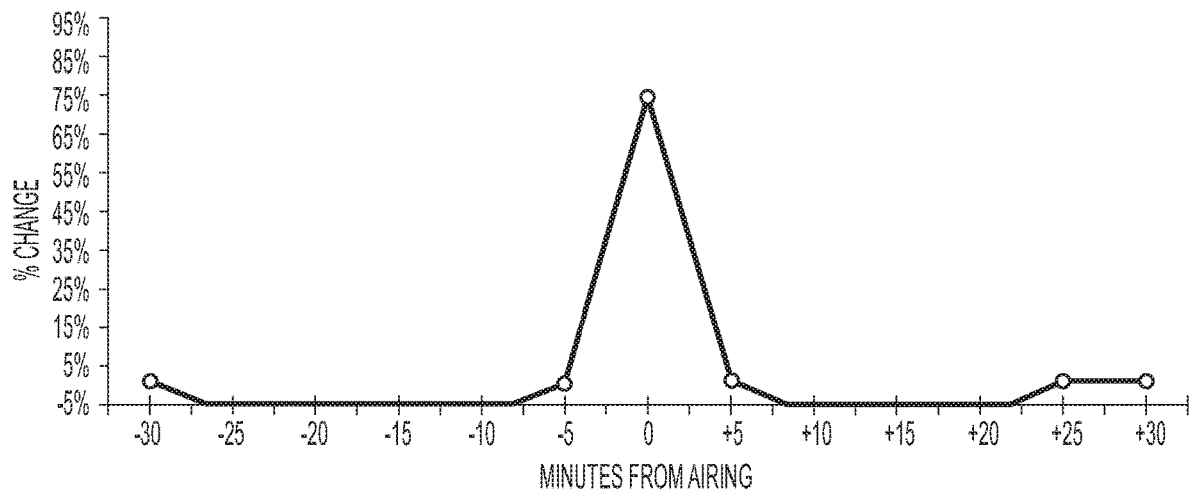
FIG. 31E shows a web spike percentage lift for a time before through a time after a TV airing with spike magnitude expressed in terms of percentage lift over average baseline activity, according to exemplary embodiments of the present disclosure.
Figure 31F:
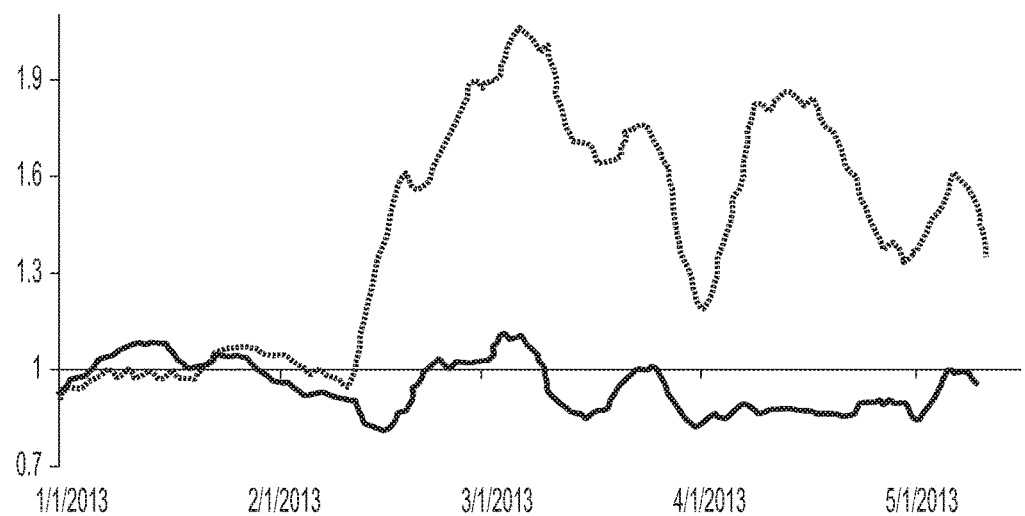
FIG. 31F shows an experimental lift measurement measured using difference of differences calculated over a treatment and control geographic area for three web metrics, according to exemplary embodiments of the present disclosure.

FIGS. 31E and 31F show new visitors to a homepage from mobile devices. FIG. 31E shows a web spike percentage lift for 60 minutes before through 60 minutes after a TV airing (at minute 0) with spike magnitude expressed in terms of percentage lift over average baseline activity. FIG. 31F shows an experimental lift measurement measured using difference of differences calculated over a treatment and control geographic area for three web metrics. The time series are shown as a 7 day moving average. The control area (upper, lighter shaded line) with web activity is normalized to 1.0, and treatment area (lower, darker shaded line) shows activity in units of percentage over control. As web spike percentage lift increases, the experimentally measured lift increases.

Figure 32:
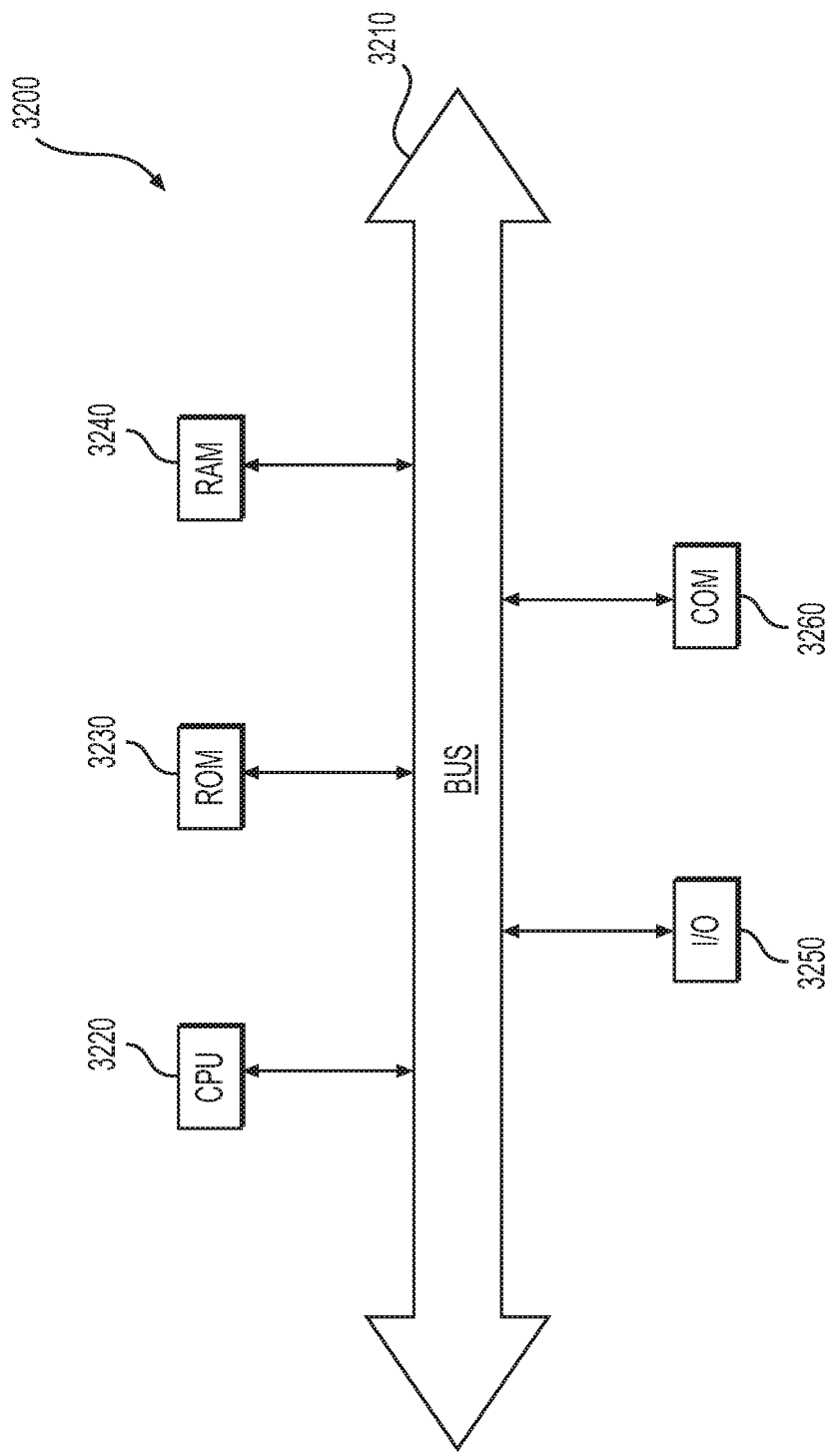
FIG. 32 is a simplified functional block diagram of a computer that may be configured as a device or server for executing the methods, according to exemplary embodiments of the present disclosure.

FIG. 32 is a simplified functional block diagram of a computer that may be configured as a client, agent, or server for executing the method described above, according to exemplary an embodiment of the present disclosure. Specifically, in one embodiment, as shown in FIG. 32, any of servers and/or systems implementing the above-described disclosure may be an assembly of hardware 3200 including, for example, a data communication interface 3260 for packet data communication. The platform may also include a central processing unit ("CPU") 3220, in the form of one or more processors, for executing program instructions. The platform typically includes an internal communication bus 3210, program storage, and data storage for various data files to be processed and/or communicated by the platform such as ROM 3230 and RAM 3240, although the system 3200 often receives programming and data via network communications 3270. The server 3200 also may include input and output ports 3250 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for web spike attribution, the method comprising:
    storing filtered website request data comprising a subset of website request data filtered to include at least one of null referrers, previously-uncookied visitors, and traffic not having a search query referrer;
    measuring, by a server, a change in the filtered website request data for a time period during a television broadcast event compared to a time period prior to the television broadcast event; and
    attributing the change in the filtered website request data to the television broadcast event based on a calculated probability that the change in the filtered website request data is due to the television broadcast event.

2. The method of claim 1, further comprising:
    determining, by the server, a number of impressions due to the television broadcast event based on the change in the filtered website request data; and
    generating, by the server, a report on the change in the filtered website request data and the number of impressions.

3. The method of claim 2, further comprising:
    determining, by the server, a change in the filtered website request data per impressions performance based on the media data, the media data including one or more of a network, a day, an hour, a program, and a geography; and
    generating, by the server, a report on the change in the filtered website request data per impressions performance based on at least one of the network, the day, the hour, the program, and the geography.

4. The method of claim 1, further comprising:
    filtering, by the server, the filtered website request data to increase signal-to-noise based on an IP-geographic lookup to establish the geographic origin of website request traffic.

5. The method of claim 1, further comprising:
    determining, by the server, a number of impressions due to the television broadcast event based on the filtered website request data for the time period during the television broadcast event and the filtered website request data for the time period prior to the television broadcast event;
    determining, by the server, a change in the filtered website request data per impressions performance based on the media data, the media data including one or more of a network, a day, an hour, a program, and a geography; and
    determining, by the server, a targeting score of the television broadcast event based on the number of impressions and the change in the filtered website request data per impressions.

6. The method of claim 5, further comprising:
    generating, by the server, a purchase recommendation based on the targeting score of the television broadcast event.

7. The method of claim 1, further comprising:
    determining, by the server, a number of impressions due to the television broadcast event based on the filtered website request data for the time period during the television broadcast event and the filtered website request data for the time period prior to the television broadcast event; and
    determining, by the server, a change in the filtered website request data per impressions performance based on the media data, the media data including a plurality of a network, a day, an hour, a program, and a geography.

8. A system for web spike attribution, the system comprising:
    a data storage device that stores instructions for web spike attribution; and
    a processor configured to execute the instructions to perform a method including:
        storing filtered website request data comprising a subset of website request data filtered to include at least one of null referrers, previously-uncookied visitors, and traffic not having a search query referrer;
        measuring a change in the filtered website request data for a time period during a television broadcast event compared to a time period prior to the television broadcast event; and
        attributing the change in the filtered website request data to the television broadcast event based on a calculated probability that the change in the filtered website request data is due to the television broadcast event.

9. The system of claim 8, wherein the processor is further configured to execute the instructions to perform the method including:
    determining, by the server, a number of impressions due to the television broadcast event based on the change in the filtered website request data; and
    generating, by the server, a report on the change in the filtered website request data and the number of impressions.

10. The system of claim 9, wherein the processor is further configured to execute the instructions to perform the method including:
    determining, by the server, a change in the filtered website request data per impressions performance based on the media data, the media data including one or more of a network, a day, an hour, a program, and a geography; and
    generating, by the server, a report on the change in the filtered website request data per impressions performance based on at least one of the network, the day, the hour, the program, and the geography.

11. The system of claim 8, wherein the processor is further configured to execute the instructions to perform the method including:
    filtering, by the server, the change in the filtered website request data to increase signal-to-noise based on an IP-geographic lookup to establish the geographic origin of website request traffic.

12. The system of claim 8, wherein the processor is further configured to execute the instructions to perform the method including:
> determining, by the server, a number of impressions due to the television broadcast event based on the change in the filtered website request data for the time period during the television broadcast event and the change in the filtered website request data for the time period prior to the television broadcast event;
> determining, by the server, a change in the filtered website request data per impressions performance based on the media data, the media data including one or more of a network, a day, an hour, a program, and a geography; and
> determining, by the server, a targeting score of the television broadcast event based on the number of impressions and the change in the filtered website request data per impressions.

13. The system of claim 12, wherein the processor is further configured to execute the instructions to perform the method including:
> generating, by the server, a purchase recommendation based on the targeting score of the television broadcast event.

14. The system of claim 8, wherein the processor is further configured to execute the instructions to perform the method including:
> determining, by the server, a number of impressions due to the television broadcast event based on the filtered website request data for the time period during the television broadcast event and the filtered website request data for the time period prior to the television broadcast event; and
> determining, by the server, a filtered website request data per impressions performance based on the media data, the media data including a plurality of a network, a day, an hour, a program, and a geography.

15. A non-transitory machine-readable medium storing instructions that, when executed by a computing system, causes the computing system to perform a method for web spike attribution, the method including:
> storing filtered website request data comprising a subset of website request data filtered to include at least one of null referrers, previously-uncookied visitors, and traffic not having a search query referrer;
> measuring, by a server, a change in the filtered website request data for a time period during a television broadcast event compared to a time period prior to the television broadcast event; and
> attributing the change in the filtered website request data to the television broadcast event based on a calculated probability that the change in the filtered website request data is due to the television broadcast event.

16. The non-transitory machine-readable medium of claim 15, the method further comprising:
> determining, by the server, a number of impressions due to the television broadcast event based on the change in the filtered website request data; and
> generating, by the server, a report on the change in the filtered website request data and the number of impressions.

17. The non-transitory machine-readable medium of claim 15, the method further comprising:
> filtering, by the server, the filtered website request data to increase signal-to-noise based on an IP-geographic lookup to establish the geographic origin of website request traffic.

18. The non-transitory machine-readable medium of claim 15, the method further comprising:
> determining, by the server, a number of impressions due to the television broadcast event based on the filtered website request data for the time period during the television broadcast event and the filtered website request data for the time period prior to the television broadcast event;
> determining, by the server, a change in the filtered website request data per impressions performance based on the media data, the media data including one or more of a network, a day, an hour, a program, and a geography; and
> determining, by the server, a targeting score of the television broadcast event based on the number of impressions and the change in the filtered website request data per impressions.

19. The non-transitory machine-readable medium of claim 18, the method further comprising:
> generating, by the server, a purchase recommendation based on the targeting score of the television broadcast event.

20. The non-transitory machine-readable medium of claim 15, the method further comprising:
> determining, by the server, a number of impressions due to the television broadcast event based on the filtered website request data for the time period during the television broadcast event and the filtered website request data for the time period prior to the television broadcast event; and
> determining, by the server, a change in the filtered website request data per impressions performance based on the media data, the media data including a plurality of a network, a day, an hour, a program, and a geography.

* * * * *